(12) United States Patent
Okiyama

(10) Patent No.: US 12,464,230 B2
(45) Date of Patent: Nov. 4, 2025

(54) CONTROL DEVICE, CONTROL METHOD, AND PROGRAM

(71) Applicant: FUJIFILM Corporation, Tokyo (JP)

(72) Inventor: Kazuya Okiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 157 days.

(21) Appl. No.: 17/819,849

(22) Filed: Aug. 15, 2022

(65) Prior Publication Data

US 2023/0067825 A1    Mar. 2, 2023

(30) Foreign Application Priority Data

Aug. 31, 2021    (JP) .................... 2021-141808

(51) Int. Cl.
*H04N 23/661* (2023.01)
*H04N 23/667* (2023.01)

(52) U.S. Cl.
CPC .......... *H04N 23/661* (2023.01); *H04N 23/667* (2023.01)

(58) Field of Classification Search
CPC ............................ H04N 23/661; H04N 23/667
USPC ......................................................... 348/505
See application file for complete search history.

(56) References Cited

U.S. PATENT DOCUMENTS

| | | | | |
|---|---|---|---|---|
| 2012/0281101 A1* | 11/2012 | Fujinawa | ............... | H04N 5/772 348/207.1 |
| 2014/0313341 A1* | 10/2014 | Stribling | ............. | H04N 23/632 348/157 |
| 2015/0229826 A1* | 8/2015 | Ikeda | ................... | H04N 23/651 348/211.3 |
| 2016/0239946 A1* | 8/2016 | Naruse | ....................... | G06T 5/10 |
| 2020/0314323 A1* | 10/2020 | van Geel | ............... | H04N 23/90 |
| 2022/0078350 A1* | 3/2022 | Kanma | ................ | H04N 23/661 |

FOREIGN PATENT DOCUMENTS

| | | |
|---|---|---|
| JP | 2003-324649 A | 11/2003 |
| JP | 2006-238020 A | 9/2006 |
| JP | 2010-004464 A | 1/2010 |
| JP | 2012-099889 A | 5/2012 |
| JP | 2013-162190 A | 8/2013 |
| JP | 2019-153986 A | 9/2019 |

OTHER PUBLICATIONS

"Notice of Reasons for Refusal" Office Action issued in JP 2021-141808; mailed by the Japanese Patent Office on Mar. 25, 2025.

* cited by examiner

*Primary Examiner* — Michael E Teitelbaum
(74) *Attorney, Agent, or Firm* — Studebaker Brackett PLLC

(57) ABSTRACT

A control device establishes a communication connection to a plurality of imaging apparatuses and includes a memory, and a processor. The memory stores an imaging condition to be set in each of the plurality of imaging apparatuses. The processor is configured to acquire a first imaging condition set in the first imaging apparatus, store the first imaging condition in the memory, and set a third imaging condition in a second imaging apparatus based on the first imaging condition stored in the memory or a second imaging condition stored in the memory.

20 Claims, 32 Drawing Sheets

CONTROL DEVICE, CONTROL METHOD, AND PROGRAM

CROSS-REFERENCE TO RELATED APPLICATIONS

The present application claims priority under 35 U.S.C. § 119 to Japanese Patent Application No. 2021-141808 filed on Aug. 31, 2021. Each of the above application is hereby expressly incorporated by reference, in its entirety, into the present application.

BACKGROUND OF THE INVENTION

1. Field of the Invention

The disclosed technology relates to a control device, a control method, and a program.

2. Description of the Related Art

JP2013-162190A discloses an imaging assistance device that connects a computer to a plurality of imaging apparatuses and comprises a screen which displays information related to remote imaging, a screen which displays a live view for each of the plurality of imaging apparatuses, and a screen which displays a result of combining live view images obtained from the plurality of imaging apparatuses with a high dynamic range. The imaging assistance device includes a section that displays the live view, a section that displays the result of combining the live view images obtained from the plurality of imaging apparatuses with the high dynamic range, and a section that can change imaging setting for the plurality of imaging apparatuses in accordance with setting of the high dynamic range in setting the high dynamic range by one operation performed by an imaging person.

JP2006-238020A discloses a digital camera system consisting of a plurality of digital cameras each having an imaging function of imaging a subject and a wireless communication function of performing wireless communication, in which a network can be constructed by using at least one digital camera as a host and using each of the other digital cameras as a slave. The host digital camera transmits each control signal related to an imaging operation at the same time to each slave digital camera for which a link is established through the network among the slave digital cameras. A control related to the imaging operation is performed on each slave digital camera based on each control signal transmitted from the host digital camera at the same time.

JP2012-099889A discloses a camera that is communicably connected to one or more other cameras and can exchange an image with the other camera. The camera comprises a display portion that displays an image, a communication portion that communicates information including image data and control data with the other camera, a display control portion that controls the display of the image on the display portion, an operation control portion that detects various operation instructions, and an imaging control portion that controls imaging. The display control portion displays a live view image transmitted from the other camera and received by the communication portion on the display portion. The imaging control portion selects one or more cameras as an imaging target camera based on an instruction from a user in a state where the live view image received by the communication portion is displayed on the display portion, and outputs an imaging instruction to the other camera among the selected imaging target cameras through the communication portion.

SUMMARY OF THE INVENTION

As an example, one embodiment according to the disclosed technology provides a control device, a control method, and a program that can reflect a first imaging condition set in a first imaging apparatus or a second imaging condition stored in a memory on a third imaging condition set in a second imaging apparatus.

A first aspect according to the disclosed technology is a control device that establishes a communication connection to a plurality of imaging apparatuses, the control device comprising a memory, and a processor, in which the memory stores an imaging condition to be set in each of the plurality of imaging apparatuses, and the processor is configured to acquire a first imaging condition set in a first imaging apparatus, store the first imaging condition in the memory, and set a third imaging condition in a second imaging apparatus based on the first imaging condition stored in the memory or a second imaging condition stored in the memory.

A second aspect according to the disclosed technology is the control device according to the first aspect, in which the first imaging condition and/or the second imaging condition includes a plurality of first setting items, and the processor is configured to acquire first imaging situation information that is information related to an imaging situation of the second imaging apparatus, and select a first setting item to be applied to the second imaging apparatus as the third imaging condition from the plurality of first setting items in accordance with the first imaging situation information.

A third aspect according to the disclosed technology is the control device according to the second aspect, in which the first imaging situation information includes at least any of first vibration information that is information related to an effect of vibration on the second imaging apparatus, first external apparatus connection information that is information related to a connection situation of an external apparatus to the second imaging apparatus, or first image recording operation information that is information related to an image recording operation of the second imaging apparatus.

A fourth aspect according to the disclosed technology is the control device according to the second or third aspect, in which the first imaging situation information includes at least any of first positional information that is information related to a position of the second imaging apparatus, first subject information that is information related to a subject corresponding to the second imaging apparatus, first light source information that is information related to a light source corresponding to the second imaging apparatus, first network connection information that is information related to a connection situation of a network to the second imaging apparatus, first type information that is information related to a type of the second imaging apparatus, first lens information that is information related to a lens mounted in the second imaging apparatus, first battery information that is information related to a battery mounted in the second imaging apparatus, first temperature information that is information related to a temperature of the second imaging apparatus, first installation state information related to an installation state of the second imaging apparatus, or first image information that is information based on an image obtained by imaging the first imaging apparatus and the second imaging apparatus by a third imaging apparatus.

A fifth aspect according to the disclosed technology is the control device according to any one of the second to fourth aspects, in which the first imaging situation information includes information related to an imaging situation of the first imaging apparatus.

A sixth aspect according to the disclosed technology is the control device according to any one of the second to fifth aspects, in which the processor is configured to acquire the first imaging situation information in a case where the imaging situation of the second imaging apparatus is changed.

A seventh aspect according to the disclosed technology is the control device according to any one of the first to sixth aspects, in which the processor is configured to acquire the first imaging condition in a case where the first imaging condition set in the first imaging apparatus and/or an imaging situation of the first imaging apparatus is changed.

An eighth aspect according to the disclosed technology is the control device according to any one of the first to seventh aspects, in which the first imaging condition and/or the second imaging condition includes a plurality of second setting items, and the processor is configured to acquire first imaging scene information that is information related to an imaging scene imaged by the second imaging apparatus, and select a second setting item to be applied to the second imaging apparatus as the third imaging condition from the plurality of second setting items in accordance with the first imaging scene information.

A ninth aspect according to the disclosed technology is the control device according to any one of the first to eighth aspects, in which the second imaging condition includes a third setting item set based on an imaging scene imaged by the second imaging apparatus.

A tenth aspect according to the disclosed technology is the control device according to any one of the first to ninth aspects, in which the processor is configured to acquire second imaging situation information that is information related to an imaging situation of each of the plurality of imaging apparatuses, classify the plurality of imaging apparatuses into two or more groups based on the second imaging situation information, and set a fourth imaging condition for each group.

An eleventh aspect according to the disclosed technology is the control device according to the tenth aspect, in which the second imaging situation information includes at least any of second vibration information that is information related to an effect of vibration on each of the plurality of imaging apparatuses, second external apparatus connection information that is information related to a connection situation of an external apparatus to each of the plurality of imaging apparatuses, second image recording operation information that is information related to an image recording operation of each of the plurality of imaging apparatuses, second positional information that is information related to a position of each of the plurality of imaging apparatuses, second subject information that is information related to a subject corresponding to each of the plurality of imaging apparatuses, second light source information that is information related to a light source corresponding to each of the plurality of imaging apparatuses, second network connection information that is information related to a connection situation of a network to each of the plurality of imaging apparatuses, second type information that is information related to a type of each of the plurality of imaging apparatuses, second lens information that is information related to a lens mounted in each of the plurality of imaging apparatuses, second battery information that is information related to a battery mounted in each of the plurality of imaging apparatuses, second temperature information that is information related to a temperature of each of the plurality of imaging apparatuses, second installation state information related to an installation state of each of the plurality of imaging apparatuses, or second image information that is information obtained from an image obtained by imaging the plurality of imaging apparatuses by a fourth imaging apparatus.

A twelfth aspect according to the disclosed technology is the control device according to any one of the first to eleventh aspects, in which the first imaging condition set in the first imaging apparatus includes a plurality of fourth setting items, and the processor is configured to acquire only information set for a fourth setting item to be applied to the second imaging apparatus as the third imaging condition among the plurality of fourth setting items.

A thirteenth aspect according to the disclosed technology is the control device according to any one of the first to twelfth aspects, in which the second imaging condition is a condition set based on the first imaging condition.

A fourteenth aspect according to the disclosed technology is the control device according to any one of the first to thirteenth aspects, in which the processor is configured to acquire at least one of first information that is information related to the first imaging apparatus, or second information related to the second imaging apparatus, and prohibit setting of the third imaging condition in the second imaging apparatus based on the first imaging condition stored in the memory or the second imaging condition stored in the memory in a case where at least one of the first information or the second information satisfies a predetermined condition.

A fifteenth aspect according to the disclosed technology is a control device that establishes a communication connection to a plurality of imaging apparatuses, the control device comprising a memory, and a processor, in which the memory stores an imaging condition to be set in each of the plurality of imaging apparatuses, and the processor is configured to acquire a first imaging condition set in a first imaging apparatus, store the first imaging condition in the memory, and set a third imaging condition in a second imaging apparatus based on at least any first setting item of a plurality of first setting items included in the first imaging condition stored in the memory.

A sixteenth aspect according to the disclosed technology is a control method comprising communicating with a plurality of imaging apparatuses, acquiring a first imaging condition set in a first imaging apparatus, storing the first imaging condition in a memory, and setting a third imaging condition in a second imaging apparatus based on the first imaging condition stored in the memory or a second imaging condition stored in the memory.

A seventeenth aspect according to the disclosed technology is a program causing a computer to execute a process comprising communicating with a plurality of imaging apparatuses, acquiring a first imaging condition set in a first imaging apparatus, storing the first imaging condition in a memory, and set a third imaging condition in a second imaging apparatus based on the first imaging condition stored in the memory or a second imaging condition stored in the memory.

DESCRIPTION OF THE PREFERRED EMBODIMENTS

Hereinafter, an example of embodiments of a control device, a control method, and a program according to the disclosed technology will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation IC stands for "Integrated Circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation HDD stands for "Hard Disk Drive". The abbreviation EEPROM stands for "Electrically Erasable and Programmable Read Only Memory". The abbreviation SRAM stands for "Static Random Access Memory". The abbreviation DRAM stands for "Dynamic Random Access Memory". The abbreviation I/F stands for "Interface". The abbreviation USB stands for "Universal Serial Bus". The abbreviation CMOS stands for "Complementary Metal Oxide Semiconductor". The abbreviation CCD stands for "Charge Coupled Device". The abbreviation EL stands for "Electro Luminescence". The abbreviation UI stands for "User Interface". The abbreviation GNSS stands for "Global Navigation Satellite System". The abbreviation GPS stands for "Global Positioning System". The abbreviation HDMI (registered trademark) stands for "High-Definition Multimedia Interface". The abbreviation OIS stands for "Optical Image Stabilization". The abbreviation BIS stands for "Body Image Stabilization". The abbreviation EIS stands for "Electronic Image Stabilization".

In the description of the present specification, "coincidence" refers to coincidence in a sense of not only being completely coincident but also including an error that is generally allowed in the technical field to which the disclosed technology belongs, and that does not contradict the gist of the disclosed technology.

First Embodiment

First, a first embodiment of the disclosed technology will be described.

Figure 1:
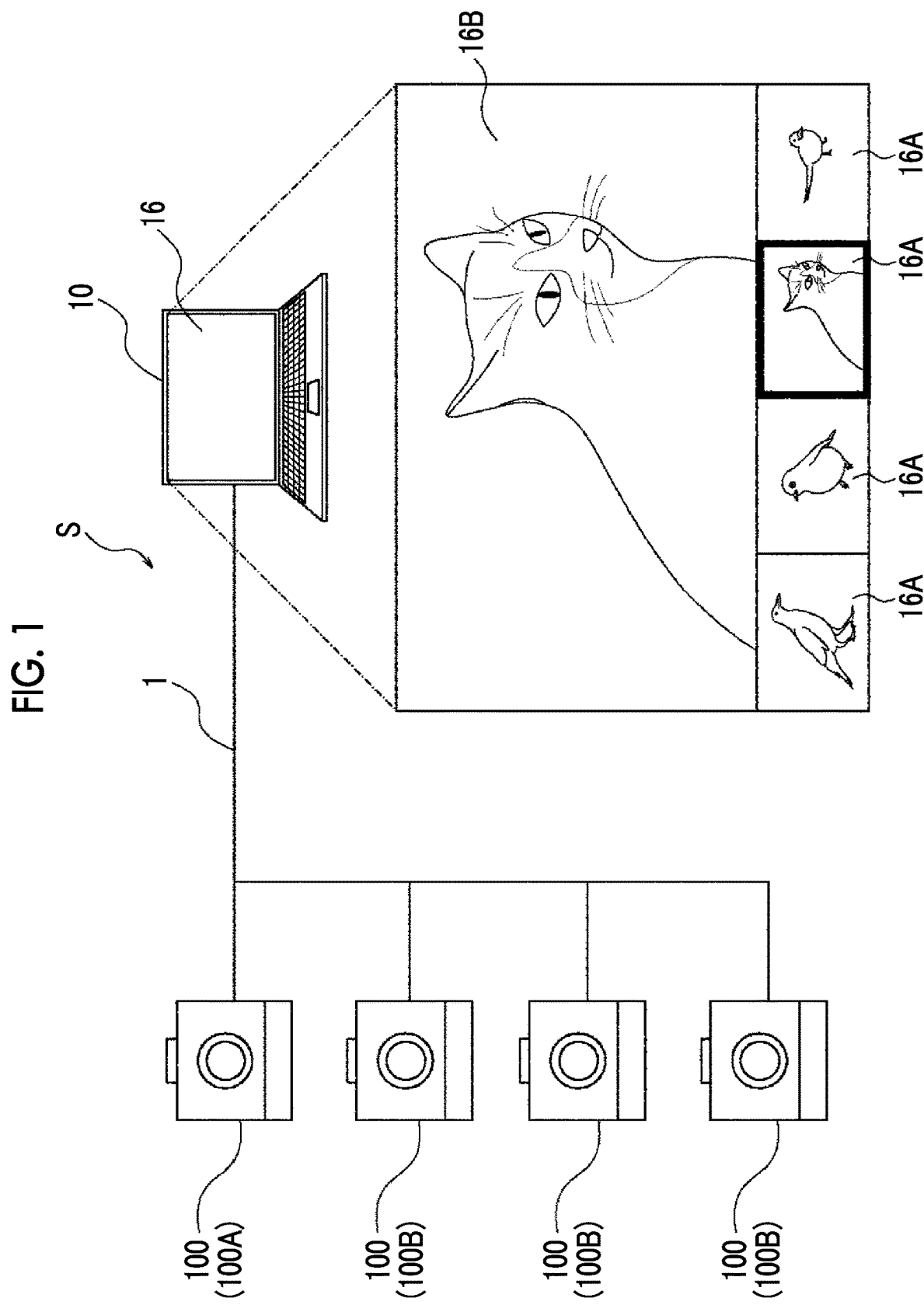
FIG. 1 is a block diagram illustrating an example of an imaging system according to a first embodiment.

As illustrated in FIG. 1 as an example, an imaging system S comprises a control device 10 and a plurality of imaging apparatuses 100. The control device 10 is a device for controlling the plurality of imaging apparatuses 100. The control device 10 is an example of a "control device" according to the embodiment of the disclosed technology. The control device 10 can establish a communication connection to each of the plurality of imaging apparatuses 100 through a network 1. The network 1 may be wired or wireless.

In the example illustrated in FIG. 1 as an example, while a laptop personal computer is illustrated as the control device 10, the disclosed technology is not limited thereto. For example, the control device 10 may be various computer devices such as a desktop personal computer, a tablet terminal, a smart device (for example, a smartphone), or a wearable terminal.

In addition, the control device 10 is not limited to a personal computer and may be a server. The server may be a mainframe or may be an external server implemented by cloud computing. In addition, the server may be an external server implemented by network computing such as fog computing, edge computing, or grid computing.

The plurality of imaging apparatuses 100 are apparatuses for imaging a common subject or each of a plurality of different subjects. In the example illustrated in FIG. 1, while four imaging apparatuses 100 are illustrated, the disclosed technology is not limited thereto. The number of the plurality of imaging apparatuses 100 may be any number greater than or equal to two. Hereinafter, as an example, an example in which the number of the plurality of imaging apparatuses 100 is four will be described.

In the example illustrated in FIG. 1 as an example, while a digital camera is illustrated as the imaging apparatus 100, the disclosed technology is not limited thereto. For example, a terminal apparatus (for example, a tablet terminal, a smart device, or a wearable terminal) functioning as the imaging apparatus 100 may be used. In addition, the digital camera as the imaging apparatus 100 may be various digital cameras such as a compact digital camera, a mirrorless single-lens reflex camera, or a digital single-lens reflex camera. The digital camera may be a lens-interchangeable digital camera or a stationary lens digital camera. In addition, the imaging apparatus 100 may be a digital camera in which an accessory such as a grip is connected to a digital camera body. In addition, a communication I/F of the imaging apparatus 100 may be mounted in the digital camera body or may be mounted in the accessory.

In addition, the imaging apparatus 100 may be various cameras such as a visible light camera, a near-infrared camera, a video camera, or a television camera. In addition, the imaging apparatus 100 may be a digital camera incorporated in various electronic apparatuses such as a cell observation apparatus, an ophthalmic observation apparatus, or a surgical microscope. The plurality of imaging apparatuses 100 may be identical imaging apparatuses 100 or different imaging apparatuses 100.

The control device 10 can set any imaging apparatus 100 of the plurality of imaging apparatuses 100 as a main imaging apparatus 100 and the remaining imaging apparatuses 100 of the plurality of imaging apparatuses 100 as sub-imaging apparatuses 100 in accordance with an instruction provided from a user or various processing executed inside the control device 10. Hereinafter, in a case where the plurality of imaging apparatuses 100 need to be described by distinguishing between the main imaging apparatus 100 and the sub-imaging apparatuses 100, the main imaging apparatus 100 will be referred to as a main imaging apparatus 100A, and the sub-imaging apparatuses 100 will be referred to as sub-imaging apparatuses 100B. The main imaging apparatus 100A is an example of a "first imaging apparatus" according to the embodiment of the disclosed technology. The sub-imaging apparatuses 100B are an example of a "second imaging apparatus" according to the embodiment of the disclosed technology.

Image data obtained by imaging performed by the plurality of imaging apparatuses 100 is transmitted to the control device 10. The control device 10 comprises a display 16. The control device 10 displays a plurality of images 16A and an image 16B on the display 16 based on the received image data. The plurality of images 16A are images obtained by imaging performed by each of the plurality of imaging apparatuses 100. The image 16B is an image selected by the user among the plurality of images 16A. As an example, the plurality of images 16A are displayed in a row in a lower portion of the display 16. In addition, the image 16B is displayed on the display 16 in a larger size than each image 16A.

Figure 2:
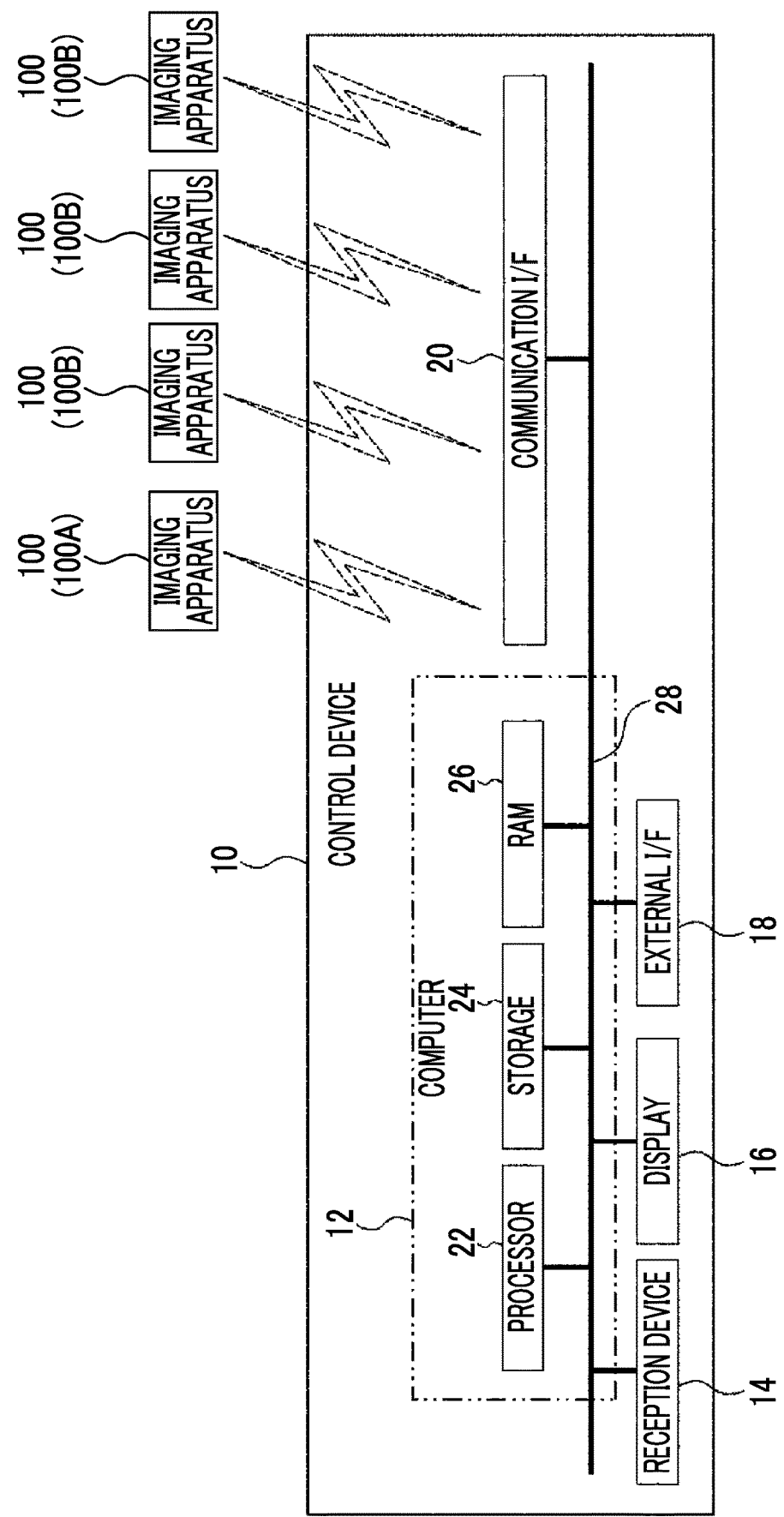
FIG. 2 is a block diagram illustrating an example of a control device according to the first embodiment.

As illustrated in FIG. 2 as an example, the control device 10 comprises a computer 12, a reception device 14, the display 16, an external I/F 18, and a communication I/F 20.

The computer 12 comprises a processor 22, a storage 24, and a RAM 26. The computer 12 is an example of a "computer" according to the embodiment of the disclosed technology. The processor 22, the storage 24, the RAM 26, the reception device 14, the display 16, the external I/F 18, and the communication I/F 20 are connected to a bus 28. In the example illustrated in FIG. 2, while one bus is illustrated as the bus 28 for convenience of illustration, a plurality of buses may be used. The bus 28 may be a serial bus or may be a parallel bus including a data bus, an address bus, a control bus, and the like.

For example, the processor 22 includes a CPU and controls the entire control device 10. Here, while an example in which the processor 22 includes a CPU is illustrated, this is merely an example. For example, the processor 22 may include a CPU and a GPU. In this case, for example, the GPU operates under control of the CPU and executes image processing. The processor 22 is an example of a "processor" according to the embodiment of the disclosed technology.

The storage 24 is a non-volatile storage device that stores various programs and various parameters and the like. Examples of the storage 24 include a flash memory (for example, an EEPROM and an SSD) and an HDD. The flash memory and the HDD are merely an example. A magnetoresistive memory and/or a ferroelectric memory may be used instead of the flash memory and/or the HDD or together with the flash memory and/or the HDD. As will be described later, the storage 24 can store an imaging condition to be set in each of the plurality of imaging apparatuses 100. The storage 24 is an example of a "memory" according to the embodiment of the disclosed technology.

The RAM 26 is a memory in which information is temporarily stored, and is used as a work memory by the processor 22. Examples of the RAM 26 include a DRAM and/or an SRAM.

The reception device 14 includes a keyboard, a mouse, a touchpad, and the like and receives the instruction from the user. The display 16 displays various information (for example, an image and a text) under control of the processor 22. Examples of the display 16 include an EL display (for example, an organic EL display or an inorganic EL display). The display 16 is not limited to the EL display and may be a display of other types such as a liquid crystal display.

The external I/F 18 controls exchange of various information with an apparatus (for example, a smart device, a personal computer, a server, a USB memory, a memory card, and/or a printer) present outside the control device 10. Examples of the external I/F 18 include a USB interface. Various apparatuses (not illustrated) such as a smart device, a personal computer, a server, a USB memory, a memory card, and/or a printer are directly or indirectly connected to the USB interface.

The communication I/F 20 is communicably connected to each of the plurality of imaging apparatuses 100. The communication I/F 20 may be communicably connected to each of the plurality of imaging apparatuses 100 using a predetermined wireless communication standard or may be communicably connected to each of the plurality of imaging apparatuses 100 using a predetermined wired communication standard. Examples of the predetermined wireless communication standard include Bluetooth (registered trademark). Other wireless communication standards (for example, Wi-Fi or 5G) may be used. The communication I/F 20 controls exchange of information with each of the plurality of imaging apparatuses 100. For example, the communication I/F 20 transmits information corresponding to a request from the processor 22 to each of the plurality of imaging apparatuses 100. In addition, the communication I/F 20 receives information transmitted from each of the plurality of imaging apparatuses 100 and outputs the received information to the processor 22 through the bus 28.

Figure 3:
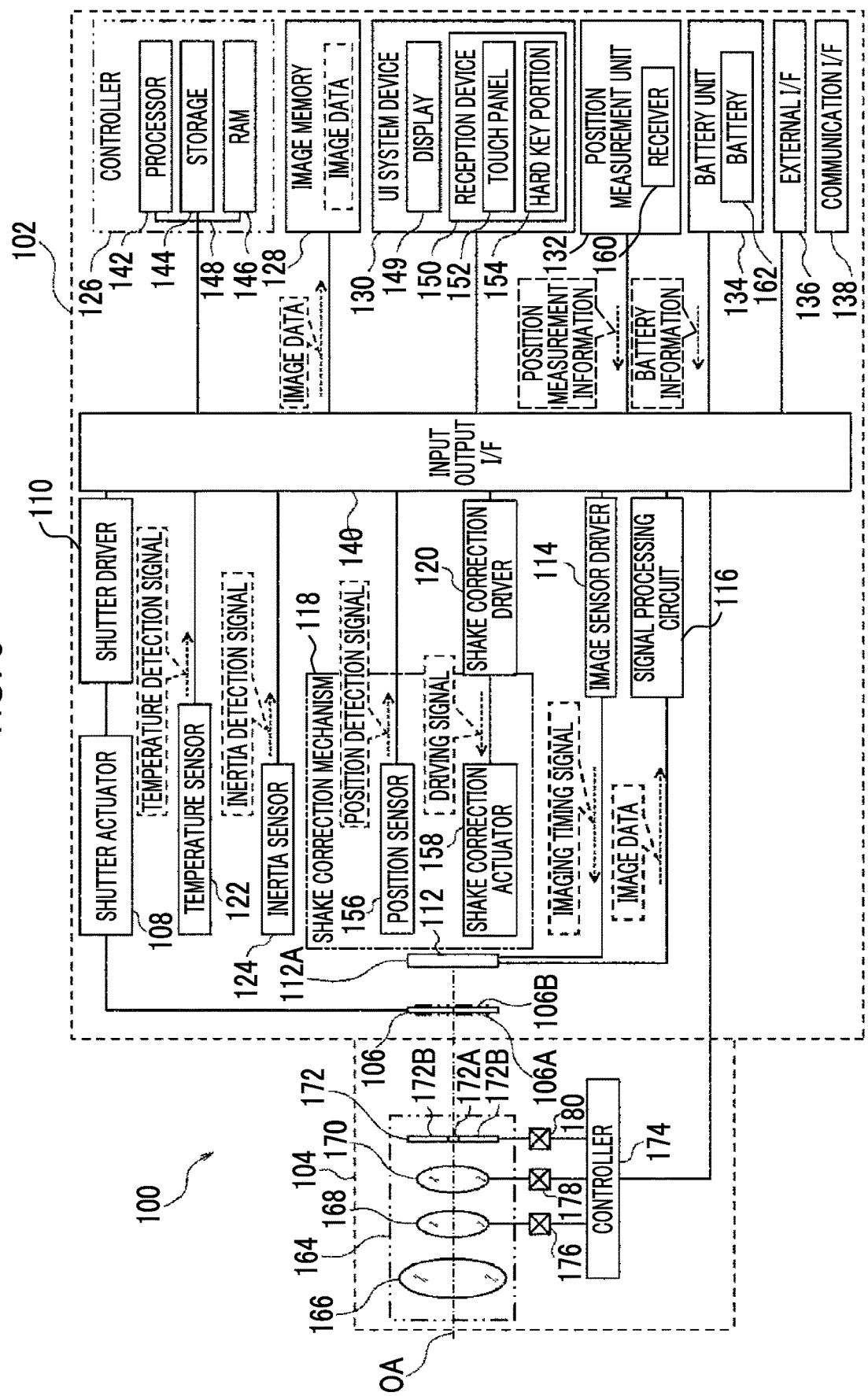
FIG. 3 is a block diagram illustrating an example of an imaging apparatus according to the first embodiment.

As illustrated in FIG. 3 as an example, the imaging apparatus 100 comprises an imaging apparatus main body 102 and a lens unit 104. The lens unit 104 is interchangeably mounted in the imaging apparatus main body 102.

The imaging apparatus main body 102 comprises a mechanical shutter 106, a shutter actuator 108, a shutter driver 110, an image sensor 112, an image sensor driver 114, a signal processing circuit 116, a shake correction mechanism 118, a shake correction driver 120, a temperature sensor 122, an inertia sensor 124, a controller 126, an image memory 128, a UI system device 130, a position measurement unit 132, a battery unit 134, an external I/F 136, a communication I/F 138, and an input-output I/F 140.

The shutter driver 110, the temperature sensor 122, the inertia sensor 124, the shake correction driver 120, the image sensor driver 114, the signal processing circuit 116, the controller 126, the image memory 128, the UI system device 130, the position measurement unit 132, the battery unit 134, the external I/F 136, and the communication I/F 138 are connected to the input-output I/F 140. In addition, a controller 174 of the lens unit 104 is connected to the input-output I/F 140.

The controller 126 comprises a processor 142, a storage 144, and a RAM 146. The processor 142, the storage 144, and the RAM 146 are connected through a bus 148, and the bus 148 is connected to the input-output I/F 140. In the example illustrated in FIG. 3, while one bus is illustrated as the bus 148 for convenience of illustration, a plurality of buses may be used. The bus 148 may be a serial bus or may be a parallel bus including a data bus, an address bus, a control bus, and the like.

The storage 144 is a non-transitory storage medium and stores various parameters and various programs. For example, the storage 144 is a flash memory (for example, an EEPROM). However, this is merely an example. An HDD or the like may be applied as the storage 144 together with the flash memory. The RAM 146 temporarily stores various information and is used as a work memory.

The processor 142 reads out a necessary program from the storage 144 and executes the read program in the RAM 146. The processor 142 controls the entire imaging apparatus 100 in accordance with the program executed in the RAM 146. In the example illustrated in FIG. 3, the shutter driver 110, the temperature sensor 122, the inertia sensor 124, the shake correction driver 120, the image sensor driver 114, the signal processing circuit 116, the controller 126, the image memory 128, the UI system device 130, the position measurement unit 132, the battery unit 134, the external I/F 136, the communication I/F 138, and the controller 174 are controlled by the processor 142.

The image sensor 112 has a light-receiving surface 112A. As an example, the image sensor 112 is a photoelectric conversion element. The image sensor 112 may be referred to as a solid-state imaging element. As an example, the image sensor 112 is arranged in the imaging apparatus main body 102 such that a center of the light-receiving surface 112A coincides with an optical axis OA of the lens unit 104.

As an example, the image sensor 112 is a CMOS image sensor. In the first embodiment, while a CMOS image sensor is illustrated as the image sensor 112, the disclosed technology is not limited thereto. For example, the disclosed technology is also established in a case where the image sensor 112 is an image sensor of other types such as a CCD image sensor.

The image sensor driver 114 is connected to the image sensor 112. The image sensor driver 114 supplies an imaging timing signal for defining a timing of imaging performed by the image sensor 112 to the image sensor 112 in accordance with an instruction from the processor 142. The image sensor 112 performs resetting, exposure, and output of an electric signal in accordance with the imaging timing signal supplied from the image sensor driver 114.

In a case where the lens unit 104 is mounted in the imaging apparatus main body 102, an image of subject light incident on an imaging lens 164 is formed on the light-receiving surface 112A by the imaging lens 164. The image sensor 112, under control of the image sensor driver 114, photoelectrically converts the subject light received by the light-receiving surface 112A and outputs an electric signal corresponding to a light quantity of the subject light to the signal processing circuit 116 as analog image data indicating the subject light. The signal processing circuit 116 generates digital image data by digitizing the analog image data.

The image memory 128 stores the image data generated by the signal processing circuit 116. That is, the signal processing circuit 116 stores the image data in the image memory 128. The processor 142 acquires the image data from the image memory 128 and executes various processing using the acquired image data.

The UI system device 130 comprises a display 149, and the processor 142 displays various information on the display 149. Examples of the display 149 include an EL display (for example, an organic EL display or an inorganic EL display). The display 149 may be a display of other types such as a liquid crystal display instead of an EL display.

In addition, the UI system device 130 comprises a reception device 150. The reception device 150 comprises a touch panel 152 and a hard key portion 154. The hard key portion 154 includes a plurality of hard keys including an instruction key, a release button, and the like. The processor 142 operates in accordance with various instructions received by the touch panel 152. Here, while the hard key portion 154 is included in the UI system device 130, the disclosed technology is not limited thereto. For example, the hard key portion 154 may be connected to the external I/F 136.

The touch panel 152 is a transmissive touch panel and is overlaid on a surface of a display region of the display 149. The touch panel 152 receives the instruction from the user by sensing a contact of an indicator such as a finger or a stylus pen. In the first embodiment, while an out-cell touch panel display in which the touch panel 152 is overlaid on the surface of the display region of the display 149 is illustrated as an example of the touch panel 152 and the display 149, this is merely an example. For example, an on-cell or in-cell touch panel display can be applied as the touch panel 152 and the display 149.

As an example, the mechanical shutter 106 is a focal plane shutter and is arranged between a stop 172 and the light-receiving surface 112A. The mechanical shutter 106 comprises a front curtain 106A and a rear curtain 106B. As an example, each of the front curtain 106A and the rear curtain 106B comprises a plurality of blades (not illustrated). The front curtain 106A is arranged closer to a subject side than is the rear curtain 106B.

The shutter actuator 108 is an actuator including a link mechanism (not illustrated), a front curtain solenoid (not illustrated), and a rear curtain solenoid (not illustrated). The front curtain solenoid is a driving source of the front curtain 106A and is mechanically coupled to the front curtain 106A through the link mechanism. The rear curtain solenoid is a driving source of the rear curtain 106B and is mechanically coupled to the rear curtain 106B through the link mechanism. The shutter driver 110 controls the shutter actuator 108 in accordance with the instruction from the processor 142.

The front curtain solenoid generates motive power under control of the shutter driver 110 and selectively performs rolling up and pulling down of the front curtain 106A by providing the generated motive power to the front curtain 106A. The rear curtain solenoid generates motive power under control of the shutter driver 110 and selectively performs rolling up and pulling down of the rear curtain 106B by providing the generated motive power to the rear curtain 106B. In the imaging apparatus 100, an exposure amount of the image sensor 112 is controlled by controlling opening and closing of the front curtain 106A and opening and closing of the rear curtain 106B by the processor 142.

For example, the temperature sensor 122 includes a linear resistor, a thermistor, a thermocouple, or an IC temperature sensor. The temperature sensor 122 detects a temperature inside the imaging apparatus 100 and outputs a temperature detection signal corresponding to the temperature inside the imaging apparatus 100.

For example, the inertia sensor 124 includes a gyro sensor and an acceleration sensor. The gyro sensor included in the inertia sensor 124 detects an angular velocity about each axis of a pitch axis, a yaw axis, and a roll axis of the imaging apparatus 100. The acceleration sensor included in the inertia sensor 124 detects an acceleration in each axis direction of the pitch axis, the yaw axis, and the roll axis of the imaging apparatus 100. The inertia sensor 124 outputs an inertia detection signal corresponding to the angular velocity about each axis of the imaging apparatus 100 and the acceleration in each axis direction.

The shake correction mechanism 118 is provided to be integrated with the image sensor 112. The shake correction mechanism 118 is a mechanism that, in a case where a shake occurs in an image obtained by imaging performed by the image sensor 112 in accordance with vibration of the imaging apparatus 100, corrects the shake of the image by moving the image sensor 112 in a direction of correcting the shake of the image.

The shake correction mechanism 118 comprises a position sensor 156 and a shake correction actuator 158. For example, the position sensor 156 comprises a hall element and a sensor magnet and detects a position in the pitch axis direction, a position in the yaw axis direction, and a position in the roll axis direction of the image sensor 112. The position sensor 156 outputs a position detection signal corresponding to the position in the pitch axis direction, the position in the yaw axis direction, and the position in the roll axis direction of the image sensor 112.

For example, the shake correction actuator 158 comprises a voice coil motor and is driven in accordance with a driving signal output from the shake correction driver 120. The shake correction actuator 158 moves the image sensor 112 in the pitch axis direction and the yaw axis direction and rotates the image sensor 112 about the roll axis. The shake correction driver 120 controls the shake correction actuator 158 in accordance with the instruction from the processor 142.

The imaging apparatus 100 comprises BIS for moving the image sensor 112 in the direction of correcting the shake as an anti-vibration function for correcting the shake. The imaging apparatus 100 may comprise OIS or EIS instead of the BIS method or may comprise an anti-vibration function in which two or more of OIS, BIS, and EIS are combined. BIS is an anti-vibration function of moving a shake correction lens comprised in the imaging lens 164 in the direction of correcting the shake. EIS is an anti-vibration function of correcting the shake by performing the image processing on the image obtained by imaging performed by the image sensor 112.

The position measurement unit 132 is a device that detects a position of the imaging apparatus 100. The position measurement unit 132 includes a receiver 160. For example, the receiver 160 receives positional information transmitted from a GNSS (for example, a GPS). The position measurement unit 132 detects the position of the imaging apparatus 100 based on the positional information received by the receiver 160 and outputs position measurement information corresponding to the position of the imaging apparatus 100.

The battery unit 134 is a device that supplies power to the entire imaging apparatus 100. The battery unit 134 includes a battery 162. The battery 162 is charged by a charger (not illustrated). The battery unit 134 outputs battery information corresponding to a remaining capacity of the battery 162.

The external I/F 136 controls exchange of various information with an apparatus (hereinafter, referred to as an "external apparatus") present outside the imaging apparatus 100. Examples of the external I/F 136 include a USB interface. The external apparatus (not illustrated) such as a smart device, a personal computer, a server, a USB memory, a memory card, and/or a printer is directly or indirectly connected to the USB interface.

The communication I/F 138 is communicably connected to the control device 10. The communication I/F 138 may be communicably connected to the control device 10 using a predetermined wireless communication standard or may be communicably connected to the control device 10 using a predetermined wired communication standard. Examples of the predetermined wireless communication standard include Bluetooth (registered trademark). Other wireless communication standards (for example, Wi-Fi or 5G) may be used. The communication I/F 138 controls exchange of information with the control device 10. For example, the communication I/F 138 transmits information corresponding to a request from the processor 142 to the control device 10. In addition, the communication I/F 138 receives information transmitted from the control device 10 and outputs the received information to the processor 142 through the bus 148.

The lens unit 104 comprises the imaging lens 164. As an example, the imaging lens 164 includes an objective lens 166, a focus lens 168, a zoom lens 170, and the stop 172. The objective lens 166, the focus lens 168, the zoom lens 170, and the stop 172 are arranged in an order of the objective lens 166, the focus lens 168, the zoom lens 170, and the stop 172 from the subject side to an imaging apparatus main body 102 side along the optical axis OA.

In addition, the lens unit 104 comprises the controller 174, a focus actuator 176, a zoom actuator 178, and a stop actuator 180. The controller 174 controls the entire lens unit 104 in accordance with an instruction from the imaging apparatus main body 102. For example, the controller 174 is a device that includes a computer including a CPU, a ROM, and a RAM. Here, while a computer is illustrated as the controller 174, this is merely an example, and a device including an ASIC, an FPGA, and/or a PLD may be applied. In addition, for example, a device implemented by a combination of a hardware configuration and a software configuration may be used as the controller 174.

The focus actuator 176 comprises a focus sliding mechanism (not illustrated) and a focus motor (not illustrated). The focus lens 168 is attached to the focus sliding mechanism in a slidable manner along the optical axis OA. In addition, the focus motor is connected to the focus sliding mechanism, and the focus sliding mechanism operates by receiving motive power of the focus motor to move the focus lens 168 along the optical axis OA.

The zoom actuator 178 comprises a zoom sliding mechanism (not illustrated) and a zoom motor (not illustrated). The zoom lens 170 is attached to the zoom sliding mechanism in a slidable manner along the optical axis OA. In addition, the zoom motor is connected to the zoom sliding mechanism, and the zoom sliding mechanism operates by receiving motive power of the zoom motor to move the zoom lens 170 along the optical axis OA.

The stop actuator 180 comprises a motive power transmission mechanism (not illustrated) and a stop motor (not illustrated). The stop 172 has an opening 172A and is configured to have a variable size of the opening 172A. The opening 172A is formed by a plurality of blades 172B. The plurality of blades 172B are coupled to the motive power transmission mechanism. In addition, the stop motor is connected to the motive power transmission mechanism, and the motive power transmission mechanism transmits motive power of the stop motor to the plurality of blades 172B. The plurality of blades 172B operate by receiving the motive power transmitted from the motive power transmission mechanism to change the size of the opening 172A. The stop 172 adjusts exposure by changing the size of the opening 172A.

The focus motor, the zoom motor, and the stop motor (none illustrated) are connected to the controller 174, and driving of each of the focus motor, the zoom motor, and the stop motor is controlled by the controller 174. In the first embodiment, a stepping motor is employed as an example of the focus motor, the zoom motor, and the stop motor. Accordingly, the focus motor, the zoom motor, and the stop motor operate in synchronization with a pulse signal based on an instruction from the controller 174.

Here, while an example in which the focus motor, the zoom motor, and the stop motor are provided in the lens unit 104 is illustrated, this is merely an example. At least one of the focus motor, the zoom motor, or the stop motor may be provided in the imaging apparatus main body 102. In addition, constituents and/or an operation method of the lens unit 104 can be changed as needed.

Figure 4:
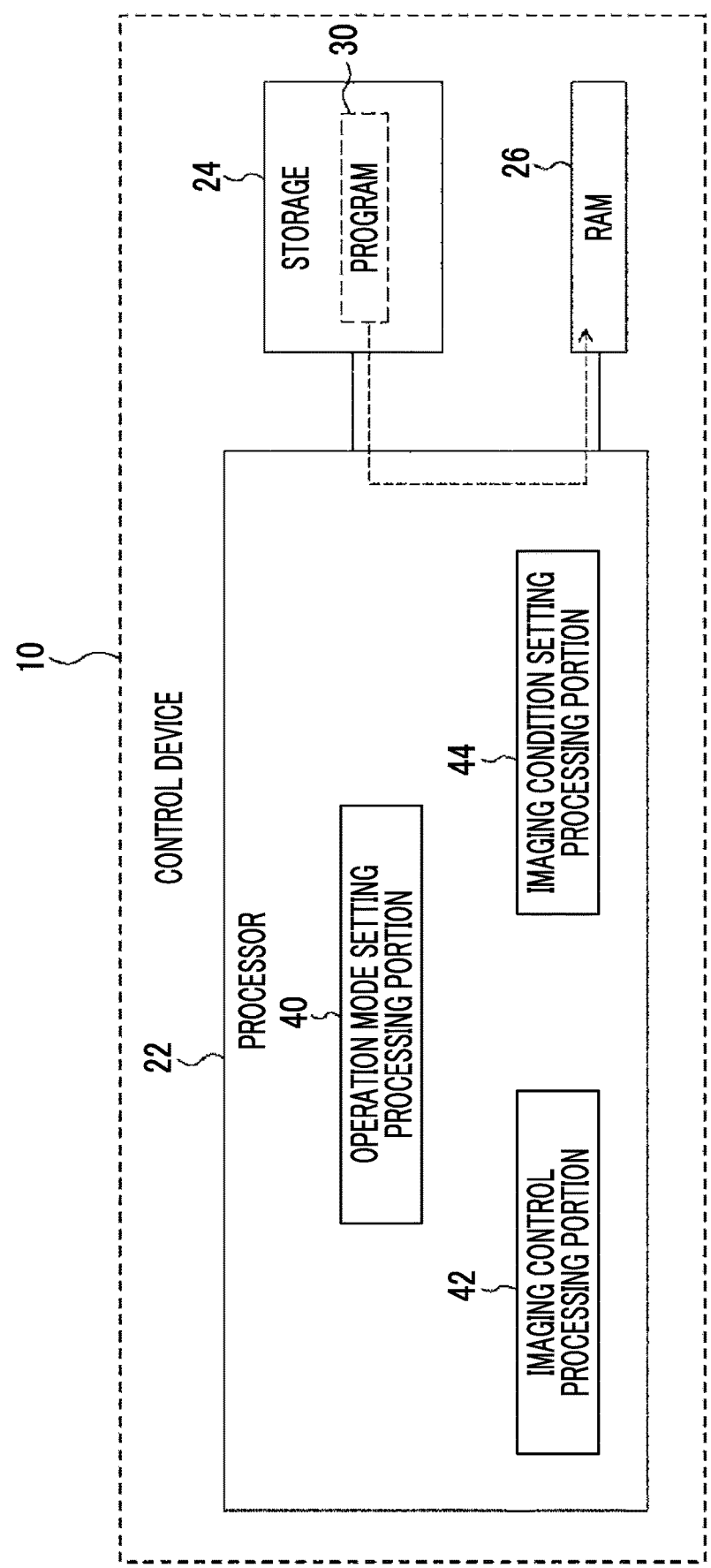
FIG. 4 is a block diagram illustrating an example of a functional configuration of the control device according to the first embodiment.

As illustrated in FIG. 4 as an example, the storage 24 of the control device 10 stores a program 30. The program 30 is an example of a "program" according to the embodiment of the disclosed technology. The processor 22 reads out the program 30 from the storage 24 and executes the read program 30 in the RAM 26. The processor 22 operates as an operation mode setting processing portion 40, an imaging control processing portion 42, and an imaging condition setting processing portion 44 by executing the program 30.

The control device 10 has an imaging control processing mode and an imaging condition setting processing mode as an operation mode. The operation mode setting processing portion 40 selectively sets the imaging control processing mode and the imaging condition setting processing mode as the operation mode of the control device 10. In a case where the operation mode of the control device 10 is set to the imaging control processing mode by the operation mode setting processing portion 40, the processor 22 operates as the imaging control processing portion 42. In a case where the operation mode of the control device 10 is set to the imaging condition setting processing mode by the operation mode setting processing portion 40, the processor 22 operates as the imaging condition setting processing portion 44.

Figure 5:
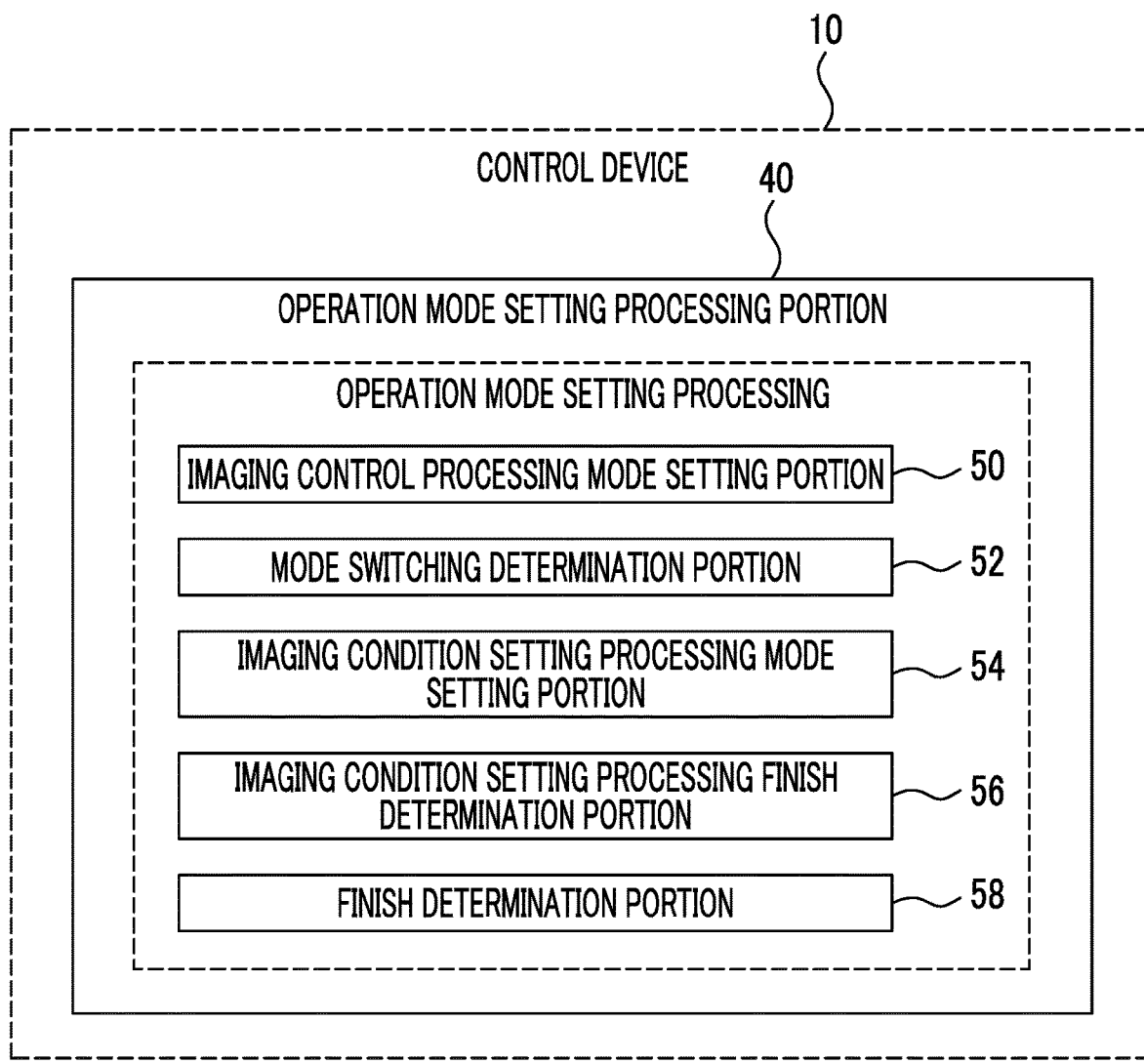
FIG. 5 is a block diagram illustrating an example of a configuration of an operation mode setting processing portion of the control device according to the first embodiment.

As illustrated in FIG. 5 as an example, the operation mode setting processing portion 40 performs operation mode setting processing of selectively setting the imaging control processing mode and the imaging condition setting processing mode as the operation mode of the control device 10. The operation mode setting processing portion 40 includes an imaging control processing mode setting portion 50, a mode switching determination portion 52, an imaging condition setting processing mode setting portion 54, an imaging condition setting processing finish determination portion 56, and a finish determination portion 58.

Figure 6:
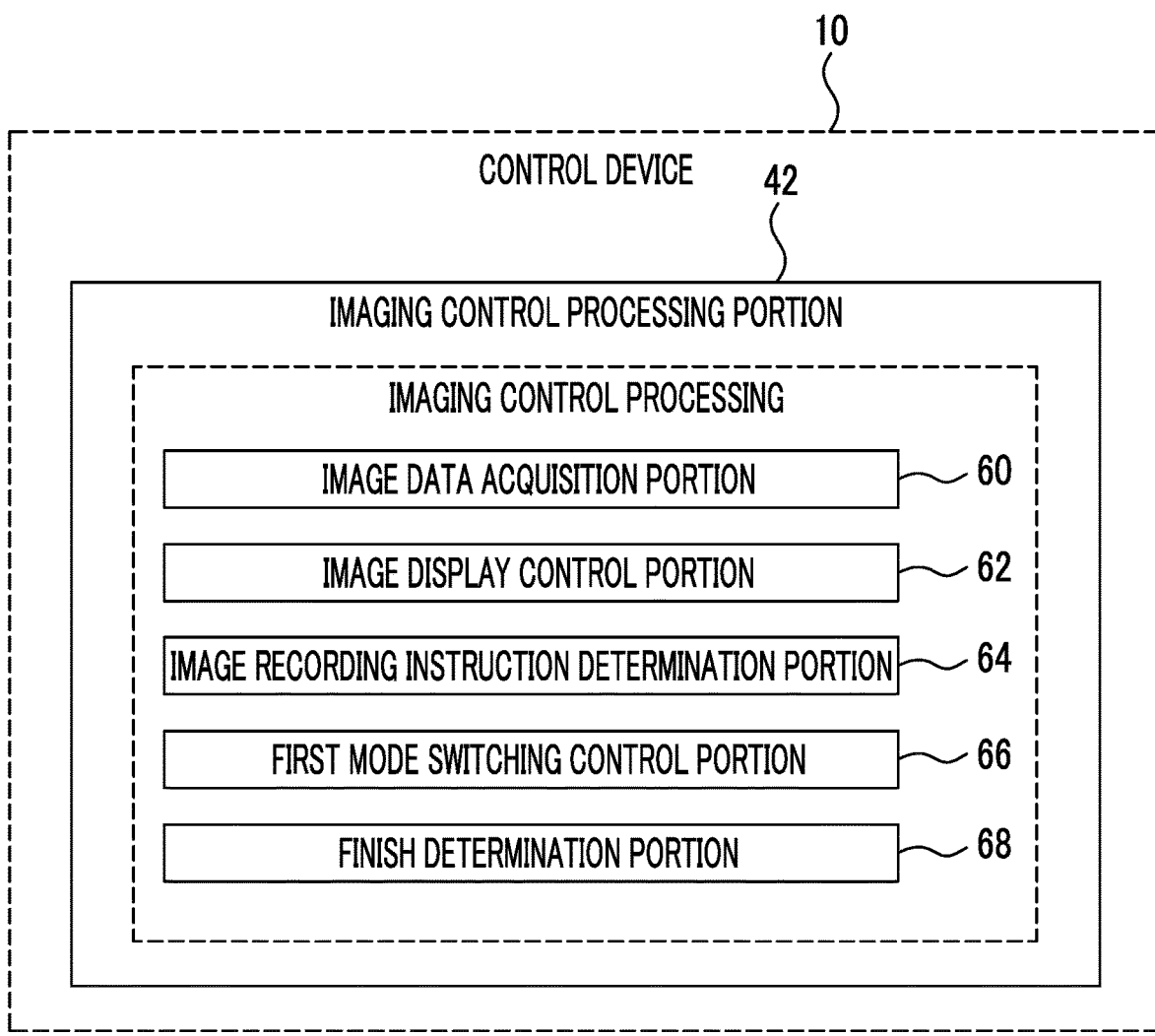
FIG. 6 is a block diagram illustrating an example of a configuration of an imaging control processing portion of the control device according to the first embodiment.

As illustrated in FIG. 6 as an example, the imaging control processing portion 42 performs imaging control processing of controlling an imaging operation of the plurality of imaging apparatuses 100. The imaging control processing is processing performed by the imaging control processing portion 42 in a case where the operation mode of the control device 10 is set to the imaging control processing mode. The imaging control processing portion 42 includes an image data acquisition portion 60, an image display control portion 62, an image recording instruction determination portion 64, a first mode switching control portion 66, and a finish determination portion 68.

Figure 7:
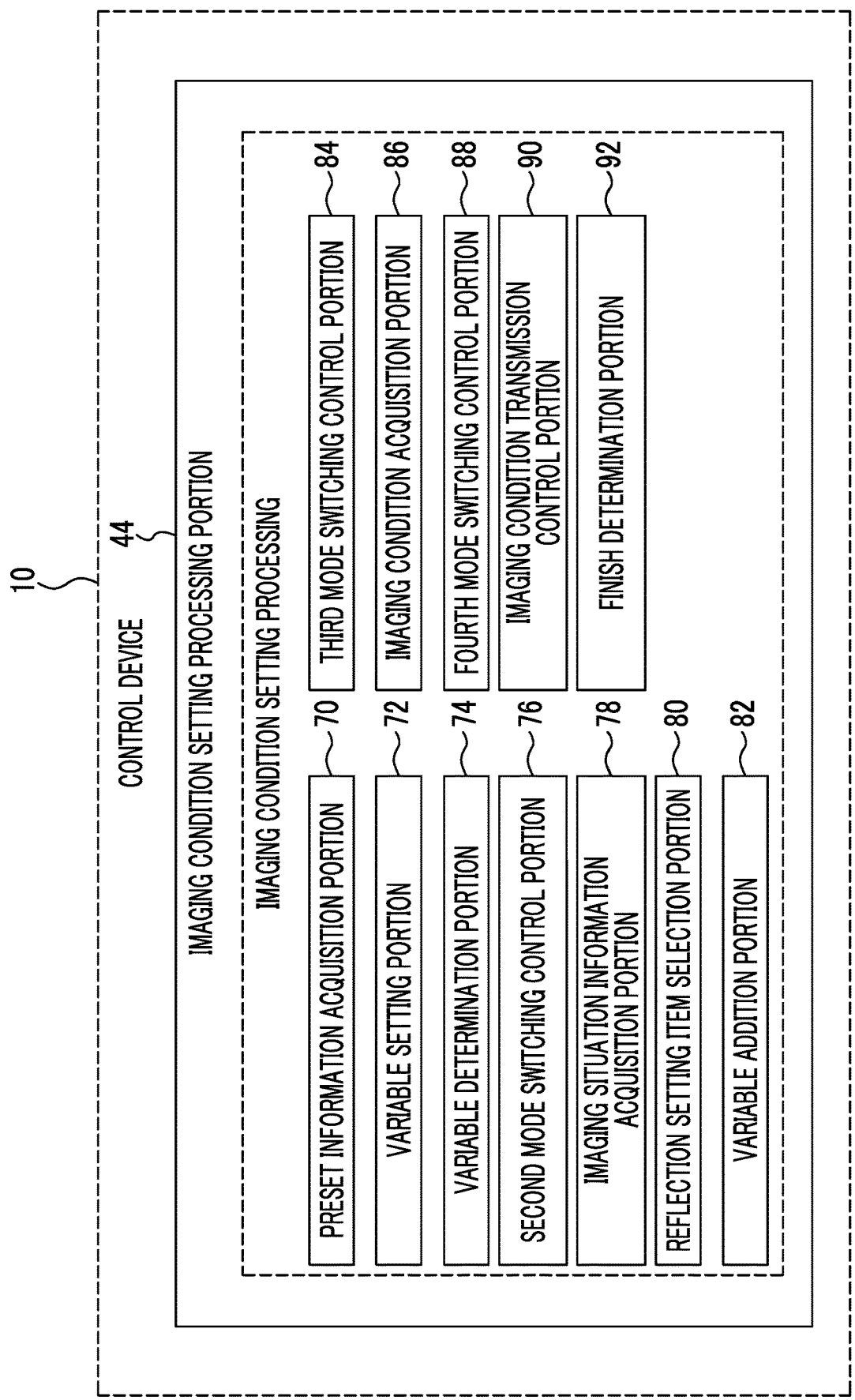
FIG. 7 is a block diagram illustrating an example of a configuration of an imaging condition setting processing portion of the control device according to the first embodiment.

As illustrated in FIG. 7 as an example, the imaging condition setting processing portion 44 performs imaging condition setting processing of setting the imaging condition of each of the plurality of sub-imaging apparatuses 100B. The imaging condition setting processing is processing performed by the imaging condition setting processing portion 44 in a case where the operation mode of the control device 10 is set to the imaging condition setting processing mode. The imaging condition setting processing portion 44 includes a preset information acquisition portion 70, a variable setting portion 72, a variable determination portion 74, a second mode switching control portion 76, an imaging situation information acquisition portion 78, a reflection setting item selection portion 80, a variable addition portion 82, a third mode switching control portion 84, an imaging condition acquisition portion 86, a fourth mode switching control portion 88, an imaging condition transmission control portion 90, and a finish determination portion 92.

Figure 8:
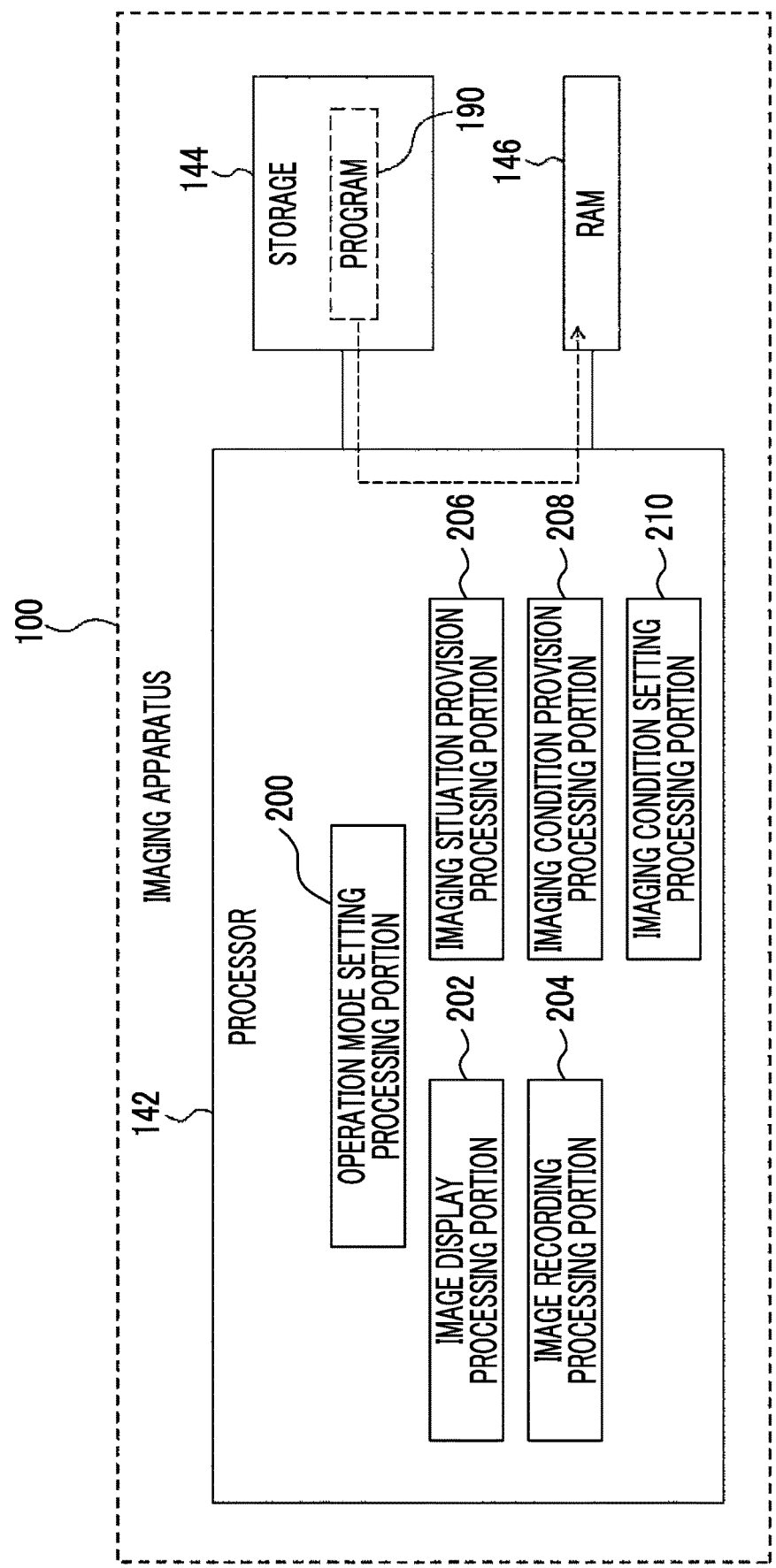
FIG. 8 is a block diagram illustrating an example of a functional configuration of the imaging apparatus according to the first embodiment.

As illustrated in FIG. 8 as an example, the storage 144 of the imaging apparatus 100 stores a program 190. The processor 142 reads out the program 190 from the storage 144 and executes the read program 190 in the RAM 146. The processor 142 operates as an operation mode setting processing portion 200, an image display processing portion 202, an image recording processing portion 204, an imaging situation provision processing portion 206, an imaging condition provision processing portion 208, and an imaging condition setting processing portion 210 by executing the program 190.

The imaging apparatus 100 has an image display processing mode, an image recording processing mode, an imaging situation provision processing mode, an imaging condition provision processing mode, and an imaging condition setting processing mode as an operation mode. The operation mode setting processing portion 200 selectively sets the image display processing mode, the image recording processing mode, the imaging situation provision processing mode, the imaging condition provision processing mode, and the imaging condition setting processing mode as the operation mode of the imaging apparatus 100.

In a case where the operation mode of the imaging apparatus 100 is set to the image display processing mode by the operation mode setting processing portion 200, the processor 142 operates as the image display processing portion 202. In a case where the operation mode of the imaging apparatus 100 is set to the image recording processing mode by the operation mode setting processing portion 200, the processor 142 operates as the image recording processing portion 204. In a case where the operation mode of the imaging apparatus 100 is set to the imaging situation provision processing mode by the operation mode setting processing portion 200, the processor 142 operates as the imaging situation provision processing portion 206. In a case where the operation mode of the imaging apparatus 100 is set to the imaging condition provision processing mode by the operation mode setting processing portion 200, the processor 142 operates as the imaging condition provision processing portion 208. In a case where the operation mode of the imaging apparatus 100 is set to the imaging condition setting processing mode by the operation mode setting processing portion 200, the processor 142 operates as the imaging condition setting processing portion 210.

Figure 9:
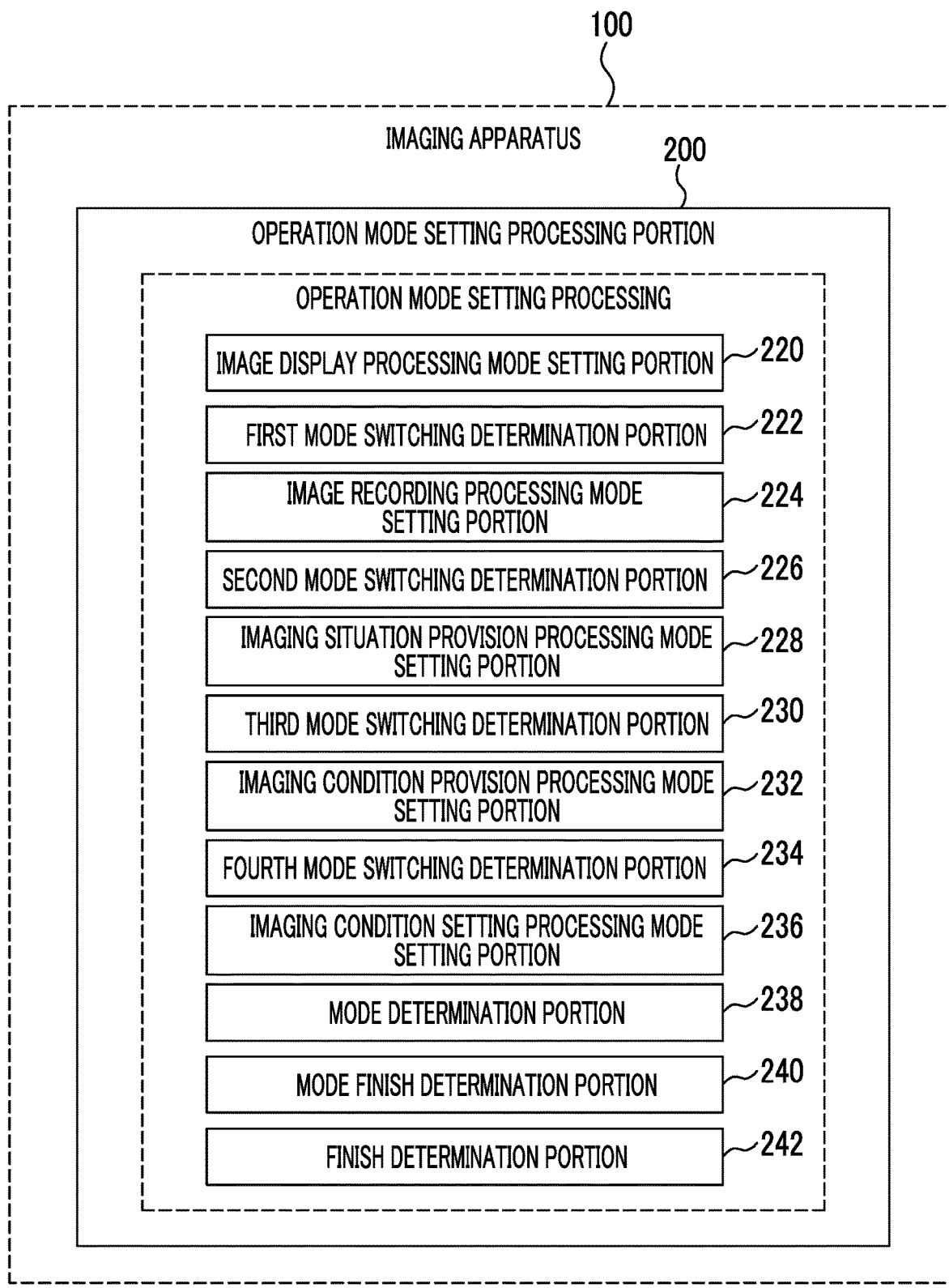
FIG. 9 is a block diagram illustrating an example of a configuration of an operation mode setting processing portion of the imaging apparatus according to the first embodiment.

As illustrated in FIG. 9 as an example, the operation mode setting processing portion 200 performs operation mode setting processing of selectively setting the image display processing mode, the image recording processing mode, the imaging situation provision processing mode, the imaging condition provision processing mode, and the imaging condition setting processing mode as the operation mode of the imaging apparatus 100. The operation mode setting processing portion 200 includes an image display processing mode setting portion 220, a first mode switching determination portion 222, an image recording processing mode setting portion 224, a second mode switching determination portion 226, an imaging situation provision processing mode setting portion 228, a third mode switching determination portion 230, an imaging condition provision processing mode setting portion 232, a fourth mode switching determination portion 234, an imaging condition setting processing mode setting portion 236, a mode determination portion 238, a mode finish determination portion 240, and a finish determination portion 242.

Figure 10:
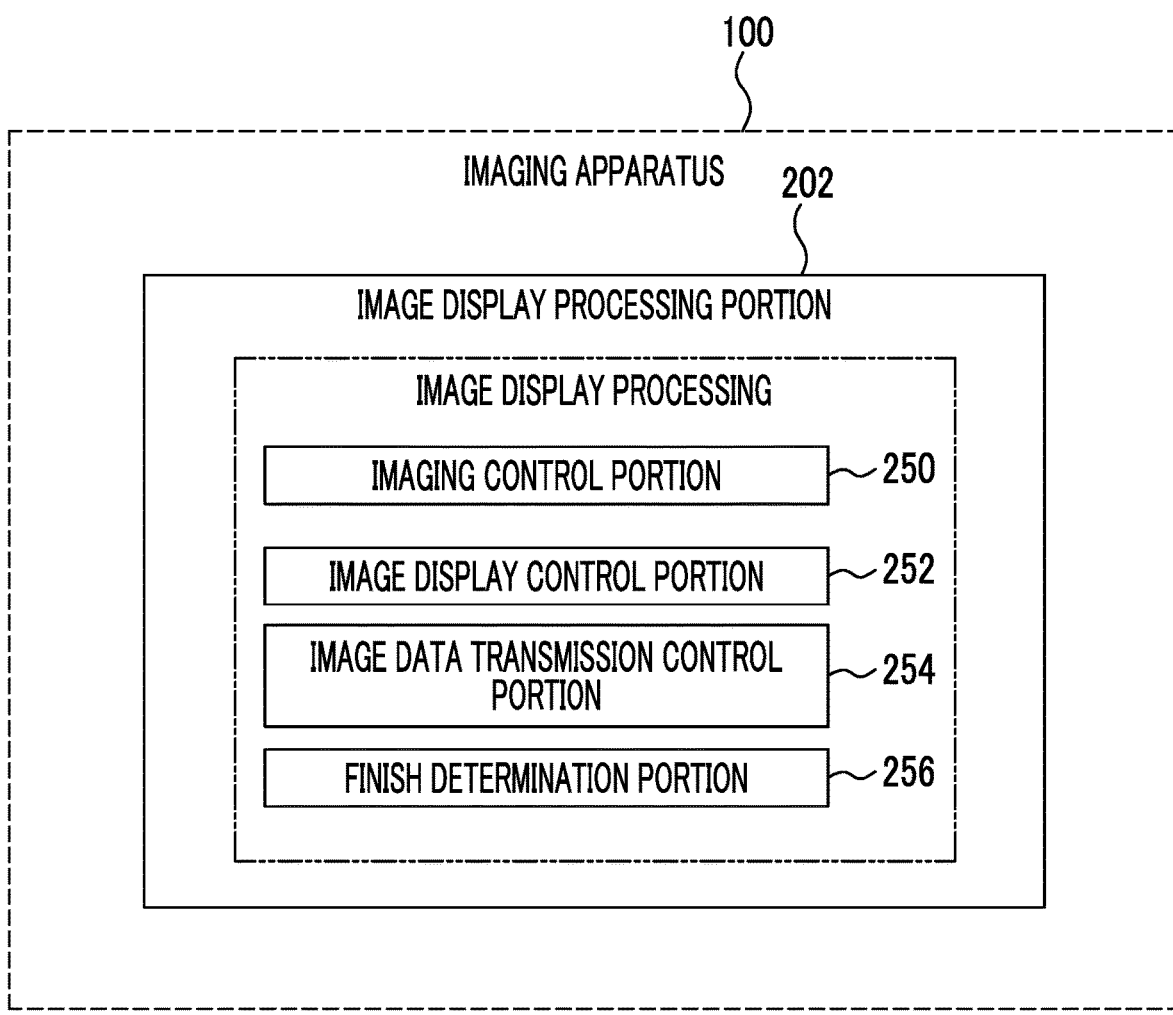
FIG. 10 is a block diagram illustrating an example of a configuration of an image display processing portion of the imaging apparatus according to the first embodiment.

As illustrated in FIG. 10 as an example, the image display processing portion 202 performs image display processing. The image display processing is processing performed by the image display processing portion 202 in a case where the operation mode of the imaging apparatus 100 is set to the image display processing mode. The image display processing portion 202 includes an imaging control portion 250, an image display control portion 252, an image data transmission control portion 254, and a finish determination portion 256.

Figure 11:
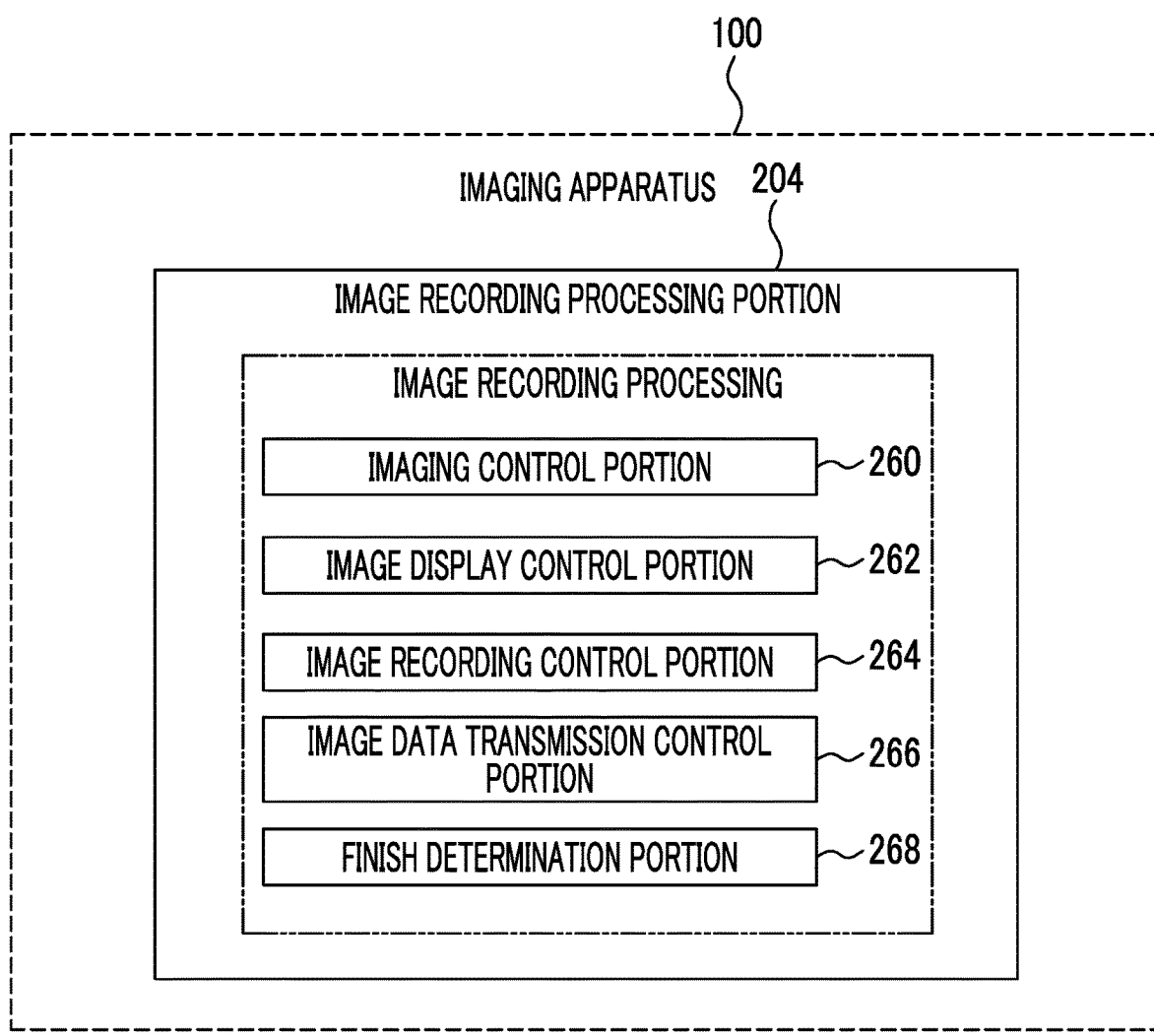
FIG. 11 is a block diagram illustrating an example of a configuration of an image recording processing portion of the imaging apparatus according to the first embodiment.

As illustrated in FIG. 11 as an example, the image recording processing portion 204 performs image recording processing. The image recording processing is processing performed by the image recording processing portion 204 in a case where the operation mode of the imaging apparatus 100 is set to the image recording processing mode. The image recording processing portion 204 includes an imaging control portion 260, an image display control portion 262, an image recording control portion 264, an image data transmission control portion 266, and a finish determination portion 268.

Figure 12:
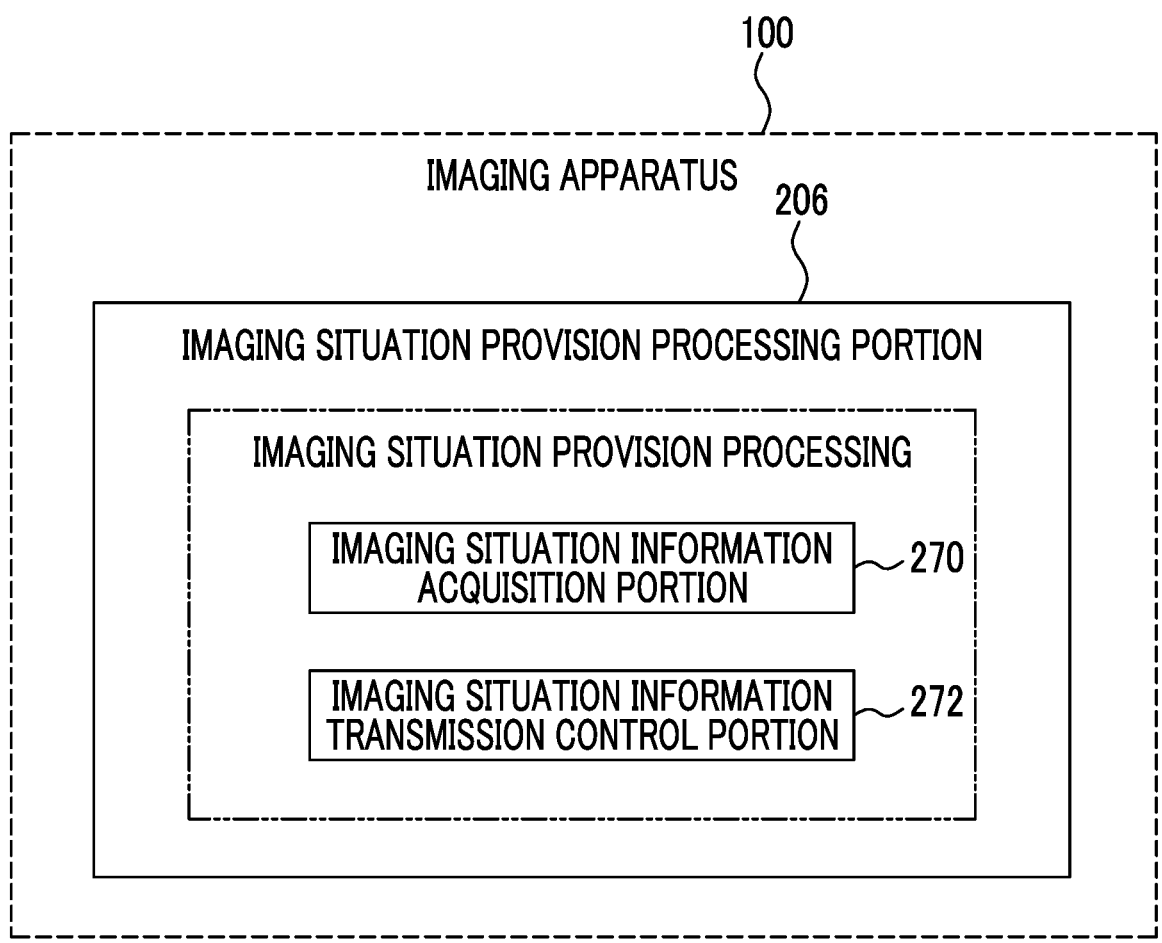
FIG. 12 is a block diagram illustrating an example of a configuration of an imaging situation provision processing portion of the imaging apparatus according to the first embodiment.

As illustrated in FIG. 12 as an example, the imaging situation provision processing portion 206 performs imaging situation provision processing. The imaging situation provision processing is processing performed by the imaging situation provision processing portion 206 in a case where the operation mode of the imaging apparatus 100 is set to the imaging situation provision processing mode. The imaging situation provision processing portion 206 includes an imaging situation information acquisition portion 270 and an imaging situation information transmission control portion 272.

Figure 13:
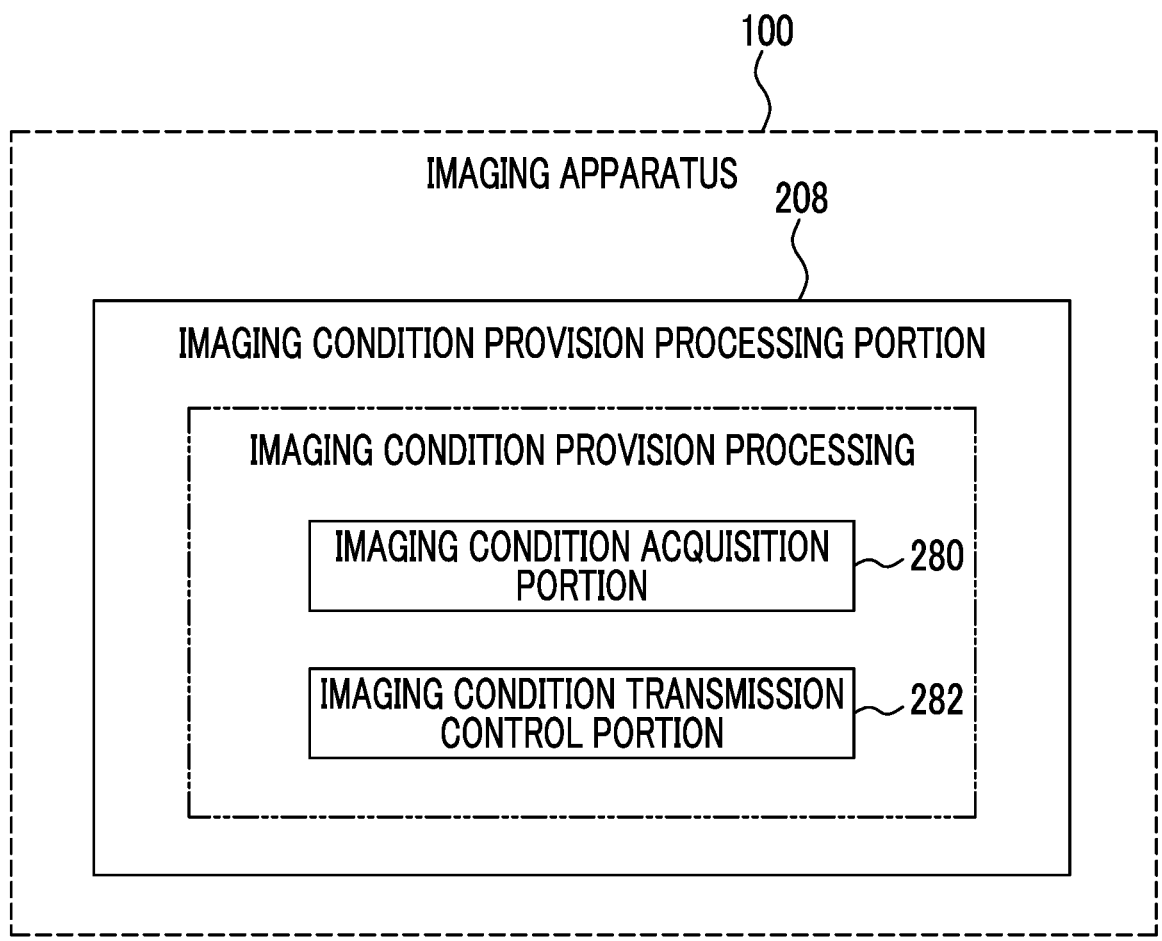
FIG. 13 is a block diagram illustrating an example of a configuration of an imaging condition provision processing portion of the imaging apparatus according to the first embodiment.

As illustrated in FIG. 13 as an example, the imaging condition provision processing portion 208 performs imaging condition provision processing. The imaging condition provision processing is processing performed by the imaging condition provision processing portion 208 in a case where the operation mode of the imaging apparatus 100 is set to the imaging condition provision processing mode. The imaging condition provision processing portion 208 includes an imaging condition acquisition portion 280 and an imaging condition transmission control portion 282.

Figure 14:
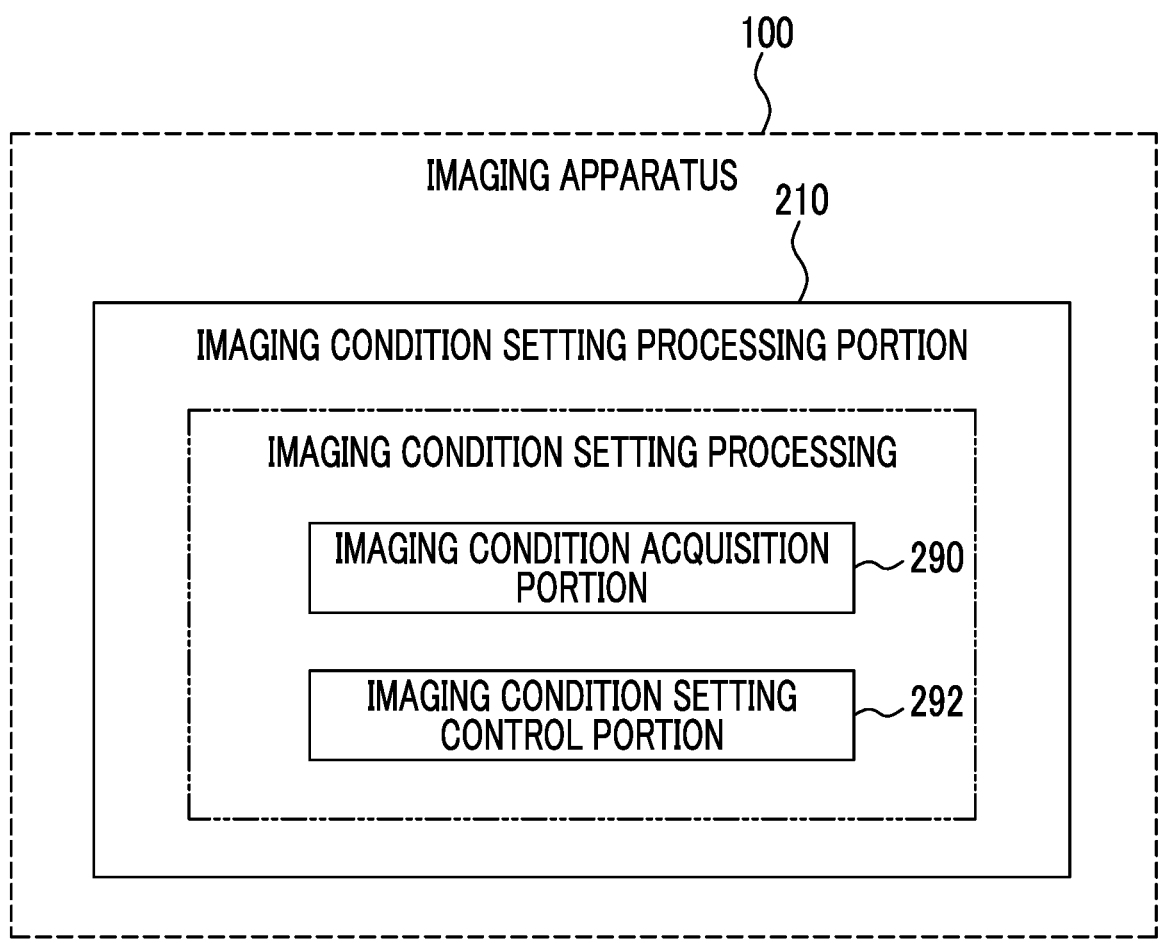
FIG. 14 is a block diagram illustrating an example of a configuration of an imaging condition setting processing portion of the imaging apparatus according to the first embodiment.

As illustrated in FIG. 14 as an example, the imaging condition setting processing portion 210 performs imaging condition setting processing. The imaging condition setting processing is processing performed by the imaging condition setting processing portion 210 in a case where the operation mode of the imaging apparatus 100 is set to the imaging condition setting processing mode. The imaging condition setting processing portion 210 includes an imaging condition acquisition portion 290 and an imaging condition setting control portion 292.

Figure 15:
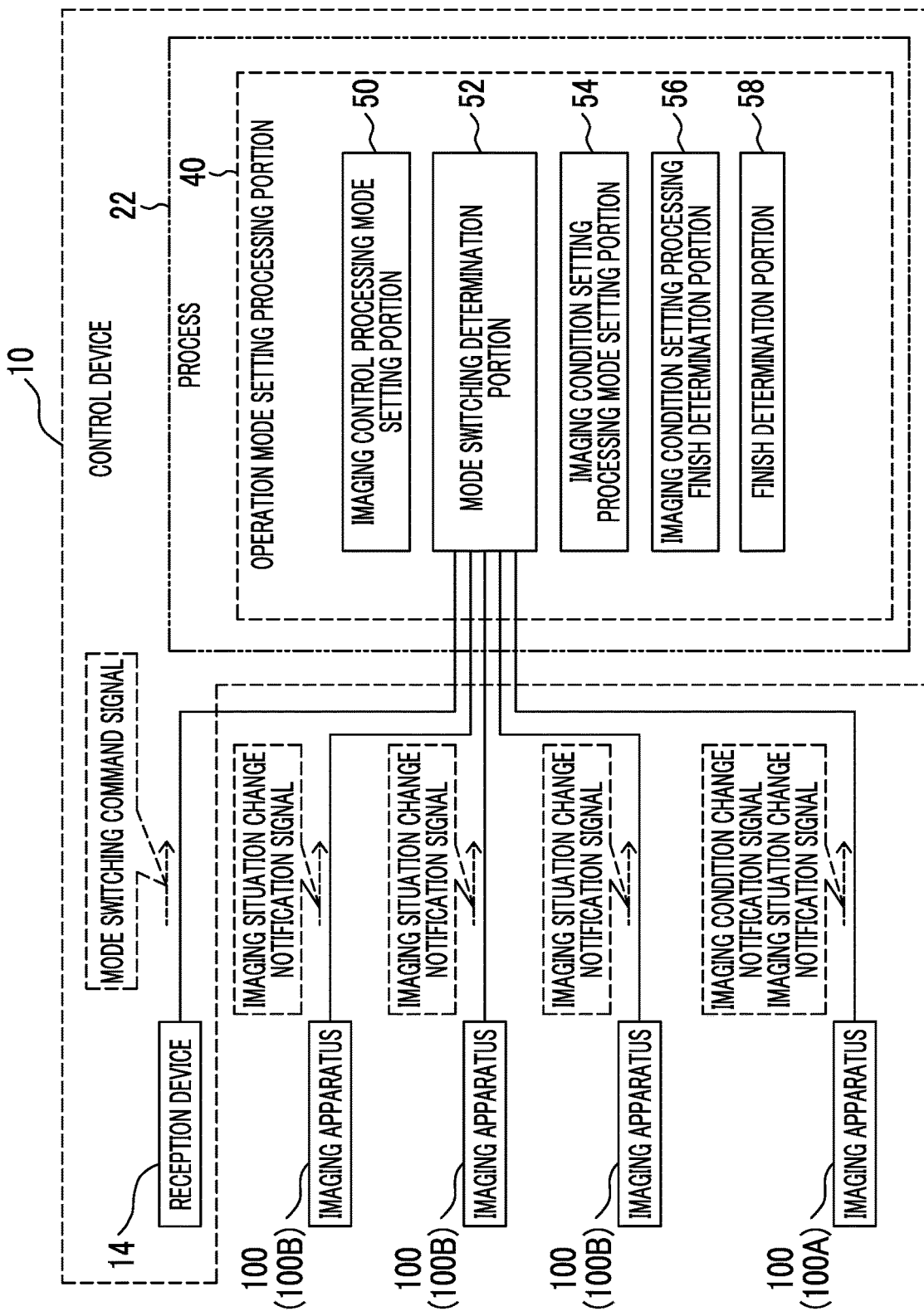
FIG. 15 is a block diagram for describing an example of an operation of the operation mode setting processing portion of the control device according to the first embodiment.

FIG. 15 illustrates an example of a processing content of the operation mode setting processing portion 40. In the operation mode setting processing portion 40 of the control device 10, the imaging control processing mode setting portion 50 sets the imaging control processing mode as initial setting of the operation mode of the control device 10. The mode switching determination portion 52 determines whether or not a mode switching condition for switching the operation mode of the control device 10 from the imaging control processing mode to the imaging condition setting processing mode is established.

Examples of the mode switching condition include a condition that an instruction (hereinafter, referred to as a "mode switching instruction") to switch the operation mode of the control device 10 from the imaging control processing mode to the imaging condition setting processing mode is received by the reception device 14, a condition that the imaging condition of the main imaging apparatus 100A is changed, a condition that an imaging situation of the main imaging apparatus 100A is changed, or a condition that an imaging situation of any sub-imaging apparatus 100B is changed.

The mode switching determination portion 52 may determine that the mode switching condition is established in a case where at least two or more conditions of the plurality of conditions illustrated as the mode switching condition are established. In addition, examples of the mode switching condition may include a condition that a predetermined time (for example, a few tens of minutes) elapses from a start of execution of the imaging control processing. Examples of the predetermined time include a time corresponding to a timing at which reflecting the imaging condition of the main imaging apparatus 100A on the imaging condition of each sub-imaging apparatus 100B is requested.

In a case where the instruction to switch the operation mode of the control device 10 from the imaging control processing mode to the imaging condition setting processing mode is received by the reception device 14 as the mode switching instruction, a mode switching command signal indicating the mode switching instruction is output to the processor 22 from the reception device 14. In a case where the imaging condition of the main imaging apparatus 100A is changed, an imaging condition change notification signal for notifying that the imaging condition of the main imaging apparatus 100A is changed is transmitted to the control device 10 from the main imaging apparatus 100A. In a case where the imaging situation of the main imaging apparatus 100A is changed, an imaging situation change notification signal for notifying that the imaging situation of the main imaging apparatus 100A is changed is transmitted to the control device 10 from the main imaging apparatus 100A. In a case where the imaging situation of the sub-imaging apparatus 100B is changed, the imaging situation change notification signal for notifying that the imaging situation of the sub-imaging apparatus 100B is changed is transmitted to the control device 10 from the sub-imaging apparatus 100B.

In a case where the mode switching command signal is input into the processor 22, the mode switching determination portion 52 determines that the mode switching condition is established. In addition, in a case where any of the imaging condition change notification signal and the imaging situation change notification signal from the main imaging apparatus 100A is received by the control device 10, the mode switching determination portion 52 determines that the mode switching condition is established. In addition, in a case where the imaging situation change notification signal from the sub-imaging apparatus 100B is received by the control device 10, the mode switching determination portion 52 determines that the mode switching condition is established. The mode switching condition may be established in a case where both of the imaging condition and the imaging situation of the main imaging apparatus 100A are changed.

In a case where the mode switching determination portion 52 determines that the mode switching condition is established, the imaging condition setting processing mode setting portion 54 sets the imaging condition setting processing mode as the operation mode of the control device 10. The imaging condition setting processing finish determination portion 56 determines whether or not the imaging condition setting processing is finished. In a case where the imaging condition setting processing finish determination portion 56 determines that the imaging condition setting processing is finished, the finish determination portion 58 determines whether or not a condition under which the operation mode setting processing is finished is established. Examples of the condition under which the operation mode setting processing is finished include a condition that an instruction (for example, an instruction to stop a power supply of the control device 10) to finish the operation mode setting processing is received by the reception device 14.

Figure 16:
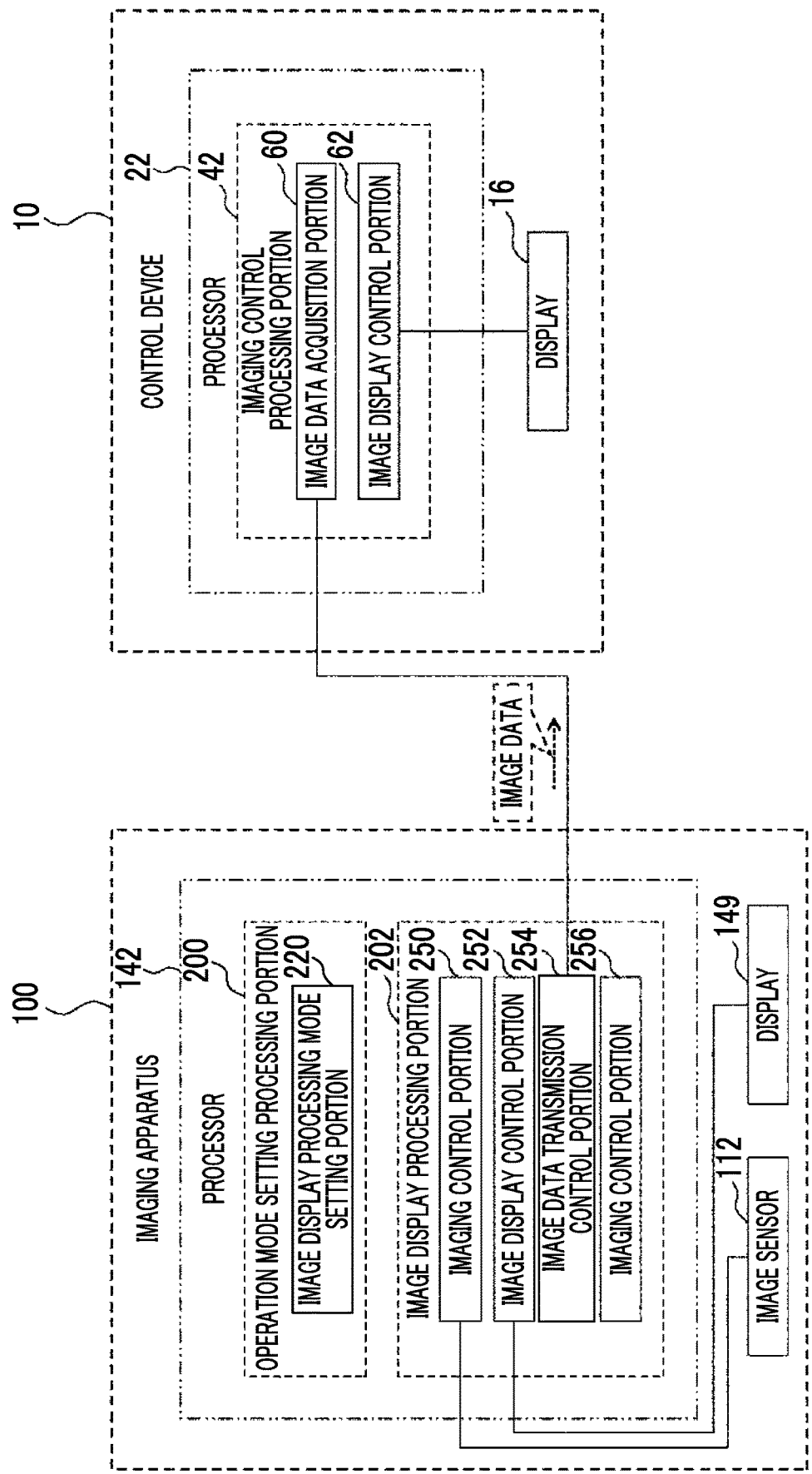
FIG. 16 is a block diagram for describing an example of processing contents of the imaging control processing portion of the control device according to the first embodiment.

FIG. 16 illustrates an example of processing contents of the imaging control processing portion 42, the operation mode setting processing portion 200, and the image display processing portion 202. In the operation mode setting processing portion 200 of the imaging apparatus 100, the image display processing mode setting portion 220 sets the image display processing mode as the operation mode of the imaging apparatus 100. In the image display processing portion 202 of the imaging apparatus 100, the imaging control portion 250 causes the image sensor 112 to image a subject. The image display control portion 252 displays an image on the display 149 based on image data obtained by imaging the subject by the image sensor 112. In this case, the image displayed on the display 149 is a live view image. The image data transmission control portion 254 transmits the image data to the control device 10.

In the imaging control processing portion 42 of the control device 10, the image data acquisition portion 60 acquires the image data received by the control device 10. The image display control portion 62 displays the image on the display 16 based on the image data acquired by the image data acquisition portion 60. In this case, the image displayed on the display 16 is a live view image.

In the image display processing portion 202 of the imaging apparatus 100, the finish determination portion 256 determines whether or not a condition under which the image display processing is finished is established. Examples of the condition under which the image display processing is finished include a condition that a first mode switching command signal, a second mode switching command signal, a third mode switching command signal, or a fourth mode switching command signal described later is received by the imaging apparatus 100.

Figure 17:
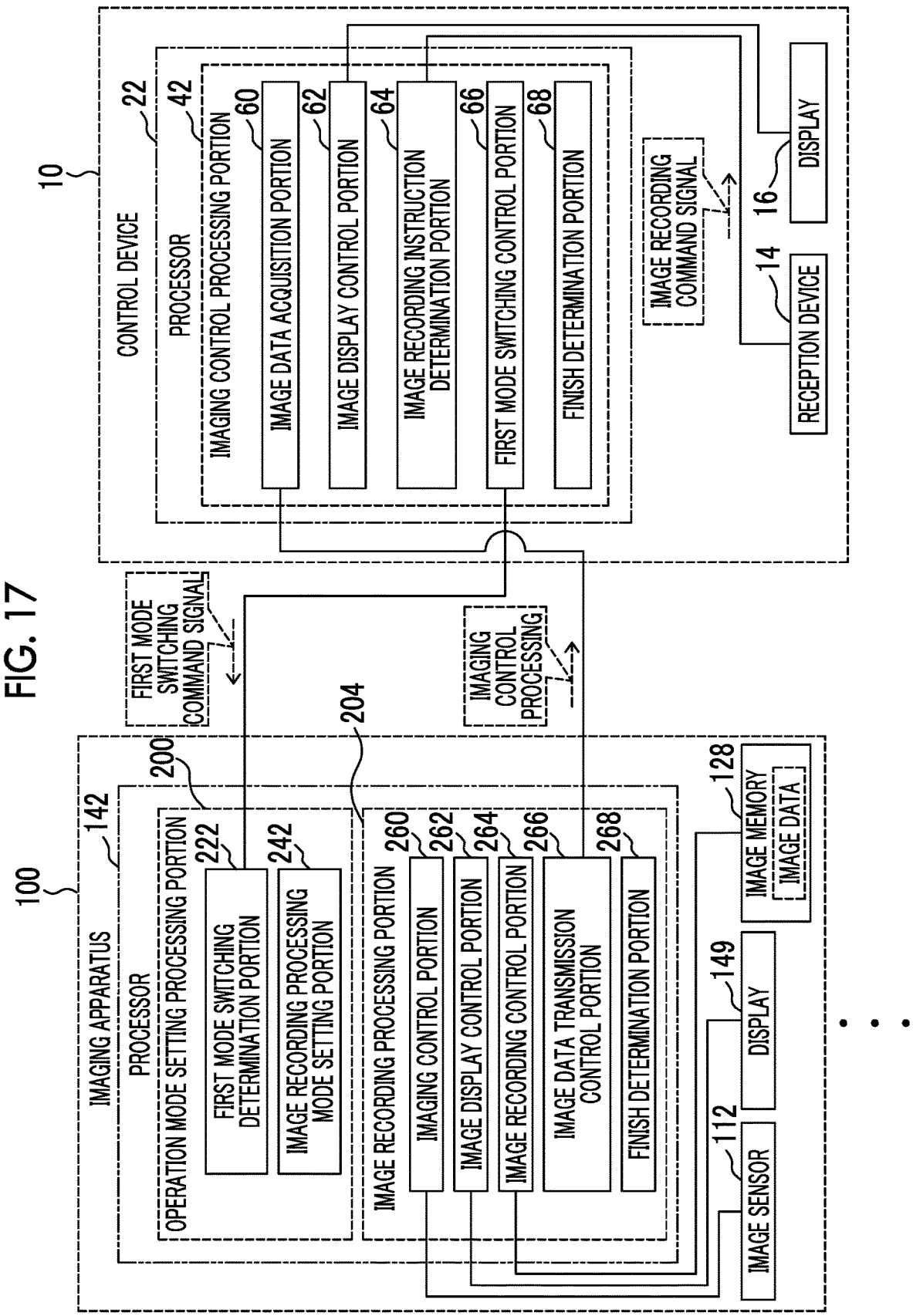
FIG. 17 is a block diagram for describing an example of processing contents of the imaging control processing portion of the control device according to the first embodiment.

FIG. 17 illustrates an example of processing contents of the imaging control processing portion 42, the operation mode setting processing portion 200, and the image recording processing portion 204. In the imaging control processing portion 42 of the control device 10, the image recording instruction determination portion 64 determines whether or not an image recording instruction that is an instruction for any imaging apparatus 100 of the plurality of imaging apparatuses 100 to record the image is received by the reception device 14. In a case where the image recording instruction is received by the reception device 14, an image recording command signal indicating the image recording instruction is output to the processor 22 from the reception device 14.

In a case where the image recording command signal is input into the processor 22 from the reception device 14, the image recording instruction determination portion 64 determines that the image recording instruction is received by the reception device 14. In a case where the image recording instruction determination portion 64 determines that the image recording instruction is received by the reception device 14, the first mode switching control portion 66 transmits the first mode switching command signal indicating an instruction to switch the operation mode of the imaging apparatus 100 for which the instruction is provided by the image recording command signal to the image recording processing mode, to the imaging apparatus 100 for which the instruction is provided by the image recording command signal.

In the operation mode setting processing portion 200 of the imaging apparatus 100 for which the instruction is provided by the image recording command signal, the first mode switching determination portion 222 determines whether or not the first mode switching command signal indicating the instruction to switch the operation mode of the imaging apparatus 100 to the image recording processing mode is received by the imaging apparatus 100. In a case where the first mode switching determination portion 222 determines that the mode switching command signal indicating the instruction to switch the operation mode of the imaging apparatus 100 to the image recording processing mode is received by the imaging apparatus 100, the image recording processing mode setting portion 224 sets the image recording processing mode as the operation mode of the imaging apparatus 100.

In the image recording processing portion 204 of the imaging apparatus 100 for which the instruction is provided by the image recording command signal, the imaging control portion 260 causes the image sensor 112 to image the subject. The image display control portion 262 displays the image on the display 149 based on the image data obtained by imaging the subject by the image sensor 112. In this case, the image displayed on the display 149 is a recording image. The image recording control portion 264 records the image data in the image memory 128. The image data transmission control portion 266 transmits the image data to the control device 10.

In the imaging control processing portion 42 of the control device 10, the image data acquisition portion 60 acquires the image data received by the control device 10. The image display control portion 62 displays the image on the display 16 based on the image data acquired by the image data acquisition portion 60. In this case, the image displayed on the display 16 is a recording image. The finish determination portion 68 determines whether or not a condition under which the imaging control processing is finished is established. Examples of the condition under which the imaging control processing is finished include a condition that the mode switching condition for switching the operation mode of the control device 10 from the imaging control processing mode to the imaging condition setting processing mode is established. In this case, the mode switching condition is the same as described above for the mode switching determination portion 52 (refer to FIG. 15).

In the image recording processing portion 204 of the imaging apparatus 100 for which the instruction is provided by the image recording command signal, the finish determination portion 268 determines whether or not a condition under which the image recording processing is finished is established. Examples of the condition under which the image recording processing is finished include a condition that the second mode switching command signal, the third mode switching command signal, or the fourth mode switching command signal described later is received by the imaging apparatus 100. Examples of the condition under which the image recording processing is finished may include a condition that the mode switching instruction that is an instruction to switch the operation mode of the imaging apparatus 100 from the image recording processing mode to the image display processing mode is received by the reception device 150 (refer to FIG. 3) of the imaging apparatus 100.

Figure 18:
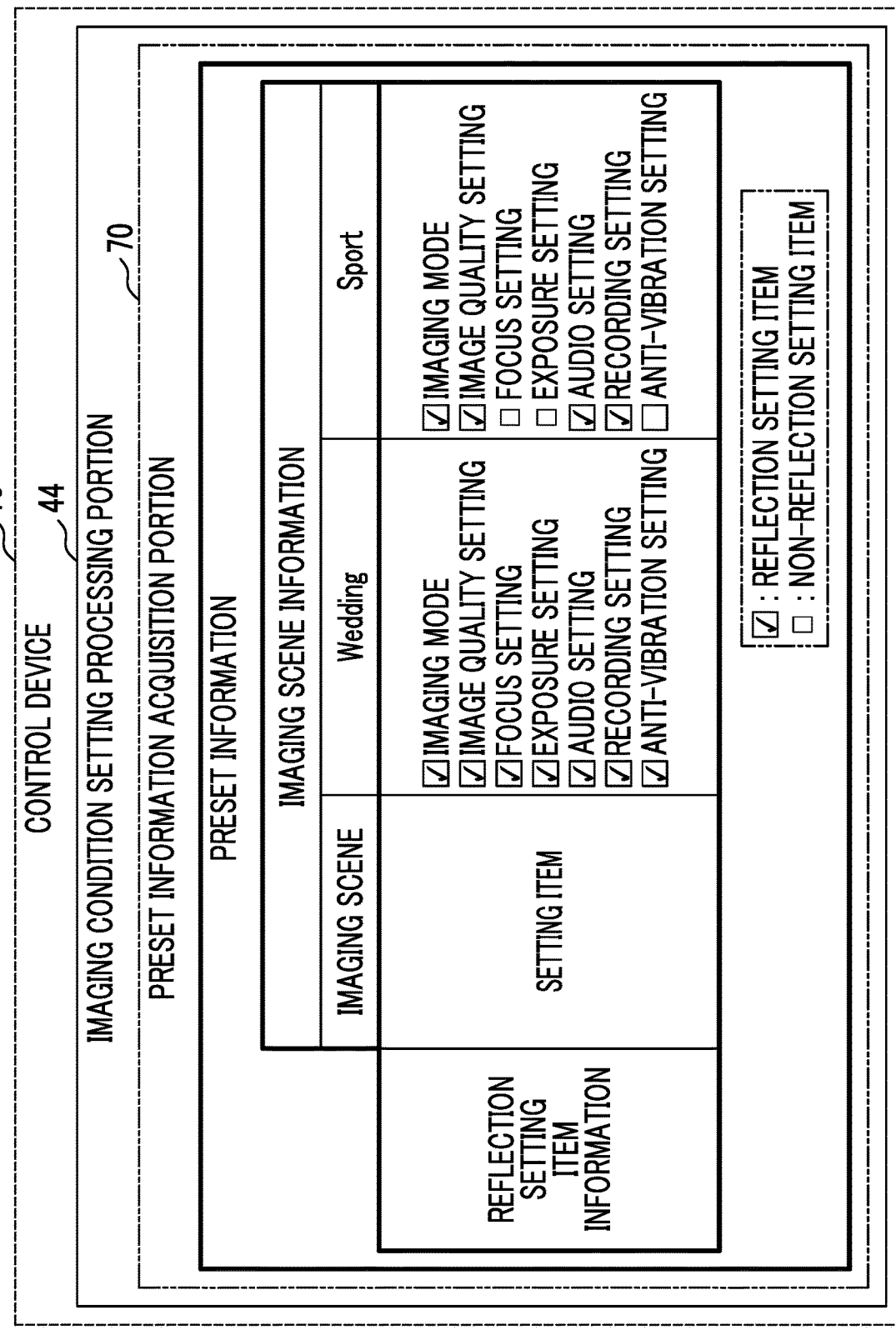
FIG. 18 is a block diagram for describing an example of processing contents of the imaging condition setting processing portion of the control device according to the first embodiment.

FIG. 18 illustrates an example of preset information acquired by the preset information acquisition portion 70. As illustrated in FIG. 18 as an example, in the imaging condition setting processing portion 44 of the control device 10, the preset information acquisition portion 70 acquires the preset information set in the control device 10. The preset information includes imaging scene information and reflection setting item information. The imaging scene information is information related to an imaging scene imaged by the main imaging apparatus 100A and/or the sub-imaging apparatus 100B (refer to FIG. 1).

Examples of the imaging scene include "Wedding" and "Sport". For example, the imaging scene may be selected in accordance with an instruction received by the reception device 14 (refer to FIG. 2) of the control device 10 or may be selected by the control device 10 based on information (for example, information based on a result of analysis of the image obtained by imaging the subject) obtained from the subject.

The reflection setting item information is information indicating a reflection setting item and is assigned for each imaging scene. The reflection setting item is a setting item for reflecting the imaging condition of the main imaging apparatus 100A on the imaging condition of the sub-imaging apparatus 100B among a plurality of setting items included in the imaging condition of the main imaging apparatus 100A. Here, the setting item refers to an item for specifying a type of information that can be set for the imaging apparatus 100. Examples of the information that can be set for the imaging apparatus 100 include various set values (for example, a part of information included in the imaging condition and/or the imaging condition) for controlling the imaging apparatus 100. Information included in the imaging condition is set in the setting item. In the present embodiment, for example, the setting of information in the setting item refers to processing of instructing the imaging apparatus 100 to perform a control based on information attached to the setting item by attaching information to the setting item. Accordingly, in a case where information is set for the setting item, the imaging apparatus 100 is controlled in accordance with the information (for example, a so-called set value) set for the setting item.

As an example, the plurality of setting items included in the imaging condition of the main imaging apparatus 100A are a setting item related to "imaging mode", a setting item related to "image quality setting", a setting item related to "focus setting", a setting item related to "exposure setting", a setting item related to "audio setting", a setting item related to "recording setting", and a setting item related to "anti-vibration setting". In the example illustrated in FIG. 18, as an example of the reflection setting item, the setting item related to "imaging mode", the setting item related to "image quality setting", the setting item related to "focus setting", the setting item related to "exposure setting", the setting item related to "audio setting", the setting item related to "recording setting", and the setting item related to "anti-vibration setting" are assigned to "Wedding" as the imaging scene. In addition, in the example illustrated in FIG. 18, as an example of the reflection setting item, the setting item related to "imaging mode", the setting item related to "image quality setting", the setting item related to "audio setting", and the setting item related to "recording setting" are illustrated in "Sport" as the imaging scene.

The information included in the imaging condition is set in the setting item. Hereinafter, each setting item and an example of the information set in each setting item will be described.

The setting item related to "imaging mode" is a setting item related to an imaging mode of the imaging apparatus 100. For example, information related to "program auto mode" (for example, information used for setting a program auto mode for the imaging apparatus 100), information related to "shutter priority auto mode", information related to "aperture stop priority auto mode", and information related to "manual exposure mode" are selectively used as information set for "imaging mode".

Examples of the information related to "program auto mode" include the information used for setting the program auto mode for the imaging apparatus 100. For example, the information used for setting the program auto mode for the imaging apparatus 100 refers to information used in a case where the imaging apparatus 100 decides an F number and a shutter speed.

Examples of the information related to "shutter priority auto mode" include information used for setting the shutter priority auto mode for the imaging apparatus 100. For example, the information used for setting the shutter priority auto mode for the imaging apparatus 100 refers to information used in a case where the imaging apparatus 100 decides the F number with respect to the shutter speed selected by the user.

Examples of the information related to "aperture stop priority auto mode" include information used for setting the aperture stop priority auto mode for the imaging apparatus 100. For example, the information used for setting the aperture stop priority auto mode for the imaging apparatus 100 refers to information used in a case where the imaging apparatus 100 decides the shutter speed with respect to the F number selected by the user through the reception device 14.

Examples of the information related to "manual exposure mode" include information used for setting the manual exposure mode for the imaging apparatus 100. For example, the information used for setting the manual exposure mode for the imaging apparatus 100 refers to information used in a case where the user decides the F number and the shutter speed.

A setting item related to image quality of the image obtained by imaging the subject by the imaging apparatus 100 is "image quality setting". For example, "white balance ON" and "white balance OFF" are selectively set in "image quality setting" as information. Information used in a case of correcting a tone of the image is "white balance ON". Information used in a case of not correcting the tone of the image is "white balance OFF".

A setting item related to a focus function of the imaging apparatus 100 is "focus setting". For example, "auto focus ON" and "auto focus OFF" are selectively set in "focus setting" as information. Information used in a case of performing auto focus is "auto focus ON". Information used in a case of not performing the auto focus is "auto focus OFF". For example, "auto focus speed" may be set in "focus setting" as information. Information related to a speed of moving the focus lens 168 (refer to FIG. 3) in a case of performing the auto focus is "auto focus speed".

A setting item related to an exposure function of the imaging apparatus 100 is "exposure setting". For example, "automatic exposure ON" and "automatic exposure OFF" are selectively set in "exposure setting" as information. Information used in a case of performing automatic exposure is "automatic exposure ON". Information used in a case of not performing the automatic exposure is "automatic exposure OFF". For example, "automatic exposure correction" may be set in "exposure setting" as information. Information related to exposure correction in a case of performing the automatic exposure is "automatic exposure correction".

A setting item related to an audio function of the imaging apparatus 100 is "audio setting". For example, "audio ON" and "audio OFF" are selectively set in "audio setting" as information. Information used in a case of operating the audio function is "audio ON". Information used in a case of stopping the audio function is "audio OFF". For example, "audio selection" may be set in "audio setting" as information. Information related to an audio function selected from a plurality of types of audio functions in a case of operating the audio function is "audio selection".

A setting item related to an image recording function of the imaging apparatus 100 is "recording setting". For example, "recording ON" and "recording OFF" are selectively set in "recording setting" as information. Information used in a case of recording the image data in the image memory 128 (refer to FIG. 3) by selecting an image recording mode as the operation mode of the imaging apparatus 100 is "recording ON". Information used in a case of not recording the image data in the image memory 128 by selecting an image display mode as the operation mode of the imaging apparatus 100 is "recording OFF". For example, "image size" may be set in "recording setting" as information. Information related to a size of the image recorded in the image memory 128 in a case where the image recording mode is selected as the operation mode of the imaging apparatus 100 is "image size".

A setting item related to the anti-vibration function of the imaging apparatus 100 is "anti-vibration setting". For example, "anti-vibration ON" and "anti-vibration OFF" are selectively set in "anti-vibration setting" as information. Information used in a case of operating the anti-vibration function is "anti-vibration ON". Information used in a case of stopping the anti-vibration function is "anti-vibration OFF". For example, "anti-vibration mode" may be set in "anti-vibration setting" as information. Information related to an anti-vibration mode selected from a plurality of anti-vibration modes in a case of operating the anti-vibration function is "anti-vibration mode".

In the example illustrated in FIG. 18, while "Wedding" and "Sport" are illustrated as an example of the imaging scene, the imaging scene may be other than "Wedding" and "Sport". In addition, the setting item related to "imaging mode", the setting item related to "image quality setting", the setting item related to "focus setting", the setting item related to "exposure setting", the setting item related to "audio setting", the setting item related to "recording setting", and the setting item related to "anti-vibration setting" may be selectively set for the imaging scene other than "Wedding" and "Sport" as the reflection setting item.

In addition, the plurality of setting items included in the imaging condition of the main imaging apparatus 100A are not limited to the above example and may be at least any one of the setting item related to "imaging mode", the setting item related to "image quality setting", the setting item related to "focus setting", the setting item related to "exposure setting", the setting item related to "audio setting", the setting item related to "recording setting", and the setting item related to "anti-vibration setting". In addition, the plurality of setting items included in the imaging condition of the main imaging apparatus 100A may include a setting item other than the setting item related to "imaging mode", the setting item related to "image quality setting", the setting item related to "focus setting", the setting item related to "exposure setting", the setting item related to "audio setting", the setting item related to "recording setting", and the setting item related to "anti-vibration setting".

By acquiring the preset information by the preset information acquisition portion 70, the setting item applied as the imaging condition of the sub-imaging apparatus 100B is selected from the plurality of setting items included in the imaging condition of the main imaging apparatus 100A in accordance with the imaging scene information. The imaging scene information is an example of "first imaging scene information" according to the embodiment of the disclosed technology.

Figure 19:
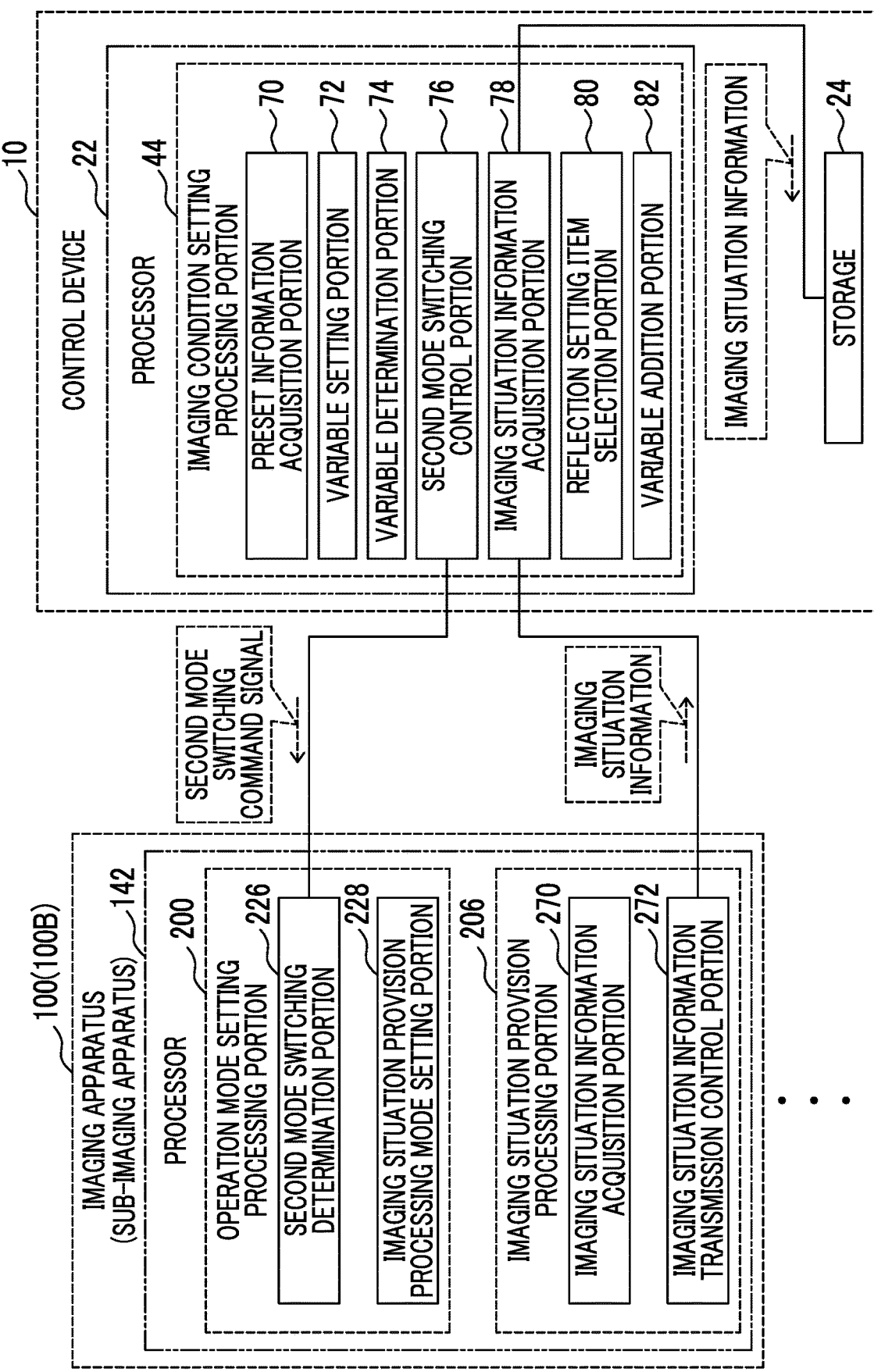
FIG. 19 is a block diagram for describing an example of processing contents of the imaging condition setting processing portion of the control device according to the first embodiment.

FIG. 19 illustrates an example of processing contents of the imaging condition setting processing portion 44, the operation mode setting processing portion 200, and the imaging situation provision processing portion 206. In the imaging condition setting processing portion 44 of the control device 10, the variable setting portion 72 sets n (hereinafter, referred to as the "variable n") that represents a variable set for the plurality of sub-imaging apparatuses 100B to 1. The variable determination portion 74 determines whether or not the variable n is less than or equal to N (hereinafter, referred to as the number N) that represents the number of the plurality of sub-imaging apparatuses 100B.

In a case where the variable determination portion 74 determines that the variable n is less than or equal to the number N, the second mode switching control portion 76 transmits the second mode switching command signal indicating an instruction to switch the operation mode of the sub-imaging apparatus 100B to which a number corresponding to the variable n is assigned (hereinafter, referred to as the sub-imaging apparatus 100B of the number n) to the imaging situation provision processing mode, to the sub-imaging apparatus 100B of the number n.

In the operation mode setting processing portion 200 of the sub-imaging apparatus 100B of the number n, the second mode switching determination portion 226 determines whether or not the second mode switching command signal indicating the instruction to switch the operation mode of the imaging apparatus 100 to the imaging situation provision processing mode is received by the imaging apparatus 100. In a case where the second mode switching determination portion 226 determines that the second mode switching command signal is received by the imaging apparatus 100, the imaging situation provision processing mode setting portion 228 sets the imaging situation provision processing mode as the operation mode of the imaging apparatus 100.

In the imaging situation provision processing portion 206 of the sub-imaging apparatus 100B of the number n, the imaging situation information acquisition portion 270 acquires imaging situation information related to the imaging situation of the sub-imaging apparatus 100B. As an example, the imaging situation information includes at least any one of vibration information, external apparatus connection information, image recording operation information, positional information, subject information, light source information, network connection information, type information, lens information, battery information, or temperature information.

The vibration information is information related to an effect of vibration on the sub-imaging apparatus 100B. Examples of the vibration information include information based on the inertia detection signal output from the inertia sensor 124 (refer to FIG. 3) in accordance with vibration exerted on the sub-imaging apparatus 100B. In addition, the vibration information may be information received by the reception device 150 (refer to FIG. 3). For example, the vibration information provided to the reception device 150 by the user may be information related to whether or not the sub-imaging apparatus 100B is supported by a tripod, or information related to whether or not the sub-imaging apparatus 100B is supported by a hand of the user. The vibration information is an example of "first vibration information" according to the embodiment of the disclosed technology.

The external apparatus connection information is information related to a connection situation of the external apparatus to the sub-imaging apparatus 100B. Examples of the external apparatus connection information include information related to whether or not the external apparatus is connected to the external I/F 136 (refer to FIG. 3), information related to a type of external apparatus connected to the external I/F 136, and information related to an individual external apparatus connected to the external I/F 136.

The external apparatus connection information may be at least any one of information output from the external apparatus, information output from the external I/F 136, or information received by the reception device 150. Examples of the external apparatus connected to the external I/F 136 include a USB memory, an HDMI cable, and an audio device. In addition, the external apparatus connection information may be information related to the connection situation of the external apparatus to a connecting part other than the external I/F 136 in the sub-imaging apparatus 100B. Examples of the connecting part other than the external I/F 136 include a hot shoe. Examples of the external apparatus connected to the hot shoe include a flash and a finder. The external apparatus connection information is an example of "first external apparatus connection information" according to the embodiment of the disclosed technology.

The image recording operation information is information related to an image recording operation of the sub-imaging apparatus 100B. Examples of the image recording operation information include information related to whether or not the operation mode of the sub-imaging apparatus 100B is an image recording operation processing mode, and information related to the size of the image recorded in the image memory 128. The image recording operation information is an example of "first image recording operation information" according to the embodiment of the disclosed technology. In addition, the image recording operation information may be information received by the reception device 150.

The positional information is information related to the position of the sub-imaging apparatus 100B. Examples of the positional information include information based on the position measurement information output from the position measurement unit 132 (refer to FIG. 3) in accordance with the position of the sub-imaging apparatus 100B. In addition, the positional information may be information received by the reception device 150. Examples of the positional information received by the reception device 150 include information related to a region, a country, a location, a building, or the like in which the sub-imaging apparatus 100B is positioned.

In addition, for example, a distance sensor (not illustrated) may be comprised in the sub-imaging apparatus 100B and/or the main imaging apparatus 100A, and the positional information may be acquired based on distance information output from the distance sensor. In addition, the positional information may be information based on measurement information obtained by measurement performed using a measurement function comprised in an apparatus (not illustrated) other than the plurality of imaging apparatuses 100. Furthermore, the positional information may be information related to a distance or a relative position of the sub-imaging apparatus 100B with respect to the main imaging apparatus 100A or information related to an altitude of the sub-imaging apparatus 100B. The positional information is an example of "first positional information" according to the embodiment of the disclosed technology.

The subject information is information related to a subject corresponding to the sub-imaging apparatus 100B. The subject corresponding to the sub-imaging apparatus 100B is a subject (that is, a subject imaged by the sub-imaging apparatus 100B) positioned within an angle of view of the sub-imaging apparatus 100B. Examples of the subject information include information based on the image data obtained by imaging the subject by the image sensor 112 (refer to FIG. 3) of the sub-imaging apparatus 100B.

The subject information may be information related to a detection result of the subject, information related to a blur of the subject, information related to a type of subject, information related to the imaging scene as the subject, or the like. The subject may be an animate object such as a person, a dog, a cat, or a bird or may be a face, an eye, a silhouette, or the like of the animate object. In addition, the subject may be a vehicle such as an electric train, an automobile, a motorcycle, or an airplane or may be a cab seat, a silhouette, or the like of the vehicle. The imaging scene may be a blue sky, a sunset, a night view, a starry sky, a live scene, a backlit scene, or the like. In addition, the subject information may be information received by the reception device 150. The subject information is an example of "first subject information" according to the embodiment of the disclosed technology.

The light source information is information related to a light source corresponding to the sub-imaging apparatus 100B. The light source corresponding to the sub-imaging apparatus 100B is a light source that generates light incident on the lens unit 104 (refer to FIG. 3) of the sub-imaging apparatus 100B. Examples of the light source information include information calculated based on the image data obtained by imaging the subject by the image sensor 112 of the sub-imaging apparatus 100B and information detected based on the image data obtained by imaging the subject by the image sensor 112 of the sub-imaging apparatus 100B. For example, the light source information calculated based on the image data may be information related to a calculation result of auto white balance.

In addition, for example, a flicker detection function that is a function of detecting a flicker of illumination may be comprised in the sub-imaging apparatus 100B, and a result detected by the flicker detection function may be used as the light source information. In addition, the light source information may be information received by the reception device 150. The light source information is an example of "first light source information" according to the embodiment of the disclosed technology.

The network connection information is information related to a connection situation of a network to the sub-imaging apparatus 100B. The network is a communication network connected to the sub-imaging apparatus 100B through the communication I/F 138 (refer to FIG. 3). The network may be a wired network or a wireless network. The network may be the network 1 (refer to FIG. 1) that connects the main imaging apparatus 100A to the sub-imaging apparatus 100B.

Examples of the network connection information include information related to whether or not the sub-imaging apparatus 100B is connected to the network, information related to whether or not a communication failure occurs in the network, information related to a type of network, and information related to a communication speed of the network.

In addition, the network connection information may be information related to an uplink radio wave intensity and/or a downlink radio wave intensity in a case where the network is a wireless network. Furthermore, the network connection information may be at least any of information obtained from the network, information output from the communication I/F 138, or information received by the reception device 150. The network connection information is an example of "first network connection information" according to the embodiment of the disclosed technology.

The type information is information related to a type of the sub-imaging apparatus 100B. Examples of the type information include information related to a model of the sub-imaging apparatus 100B and information related to a version of software installed on the sub-imaging apparatus 100B. The type information may be information stored in the storage 144 (refer to FIG. 3) or information received by the reception device 150. The type information is an example of "first type information" according to the embodiment of the disclosed technology.

The lens information is information related to the lens unit 104 (refer to FIG. 3) mounted in the sub-imaging apparatus 100B. Examples of the lens information include information related to a type of the lens unit 104, information related to a model of the lens unit 104, information related to whether or not the focus lens 168 included in the lens unit 104 is a single focus lens, information related to the zoom lens 170 included in the lens unit 104, information related to a maker of the lens unit 104, and information related to whether or not the lens unit 104 is a stationary lens (that is, a non-electronic contact lens).

The lens information may be information stored in the storage 144 or information received by the reception device 150. The lens unit 104 is an example of a "lens" according to the embodiment of the disclosed technology. The lens information is an example of "first lens information" according to the embodiment of the disclosed technology.

The battery information is information related to the battery 162 (refer to FIG. 3) mounted in the sub-imaging apparatus 100B. Examples of the battery information include information related to the remaining capacity of the battery 162 and information related to whether or not the sub-imaging apparatus 100B is supplied with power by a power source other than the battery 162. The battery information may be information output from the battery unit 134

(refer to FIG. 3) or information provided to the reception device 150 by the user. The battery information is an example of "first battery information" according to the embodiment of the disclosed technology.

The temperature information is information related to a temperature of the sub-imaging apparatus 100B. Examples of the temperature information include information based on the temperature detection signal output from the temperature sensor 122 (refer to FIG. 3) in accordance with the temperature inside the imaging apparatus 100 and information related to a usage rate of a CPU. The temperature information may be information provided to the reception device 150 by the user. In addition, the temperature information may be information related to a temperature outside the sub-imaging apparatus 100B. The temperature information is an example of "first temperature information" according to the embodiment of the disclosed technology.

The imaging situation information illustrated above may include information related to the imaging situation of the sub-imaging apparatus 100B in addition to the vibration information, the external apparatus connection information, the image recording operation information, the positional information, the subject information, the light source information, the network connection information, the type information, the lens information, the battery information, and the temperature information. In addition, the imaging situation information may include information related to the imaging situation of the main imaging apparatus 100A. A type of imaging situation of the main imaging apparatus 100A may be the same as a type of imaging situation of the sub-imaging apparatus 100B. In addition, the imaging situation information may not include a part of the vibration information, the external apparatus connection information, the image recording operation information, the positional information, the subject information, the light source information, the network connection information, the type information, the lens information, the battery information, and the temperature information.

The imaging situation information transmission control portion 272 transmits the imaging situation information related to the sub-imaging apparatus 100B of the number n to the control device 10.

In the imaging condition setting processing portion 44 of the control device 10, the imaging situation information acquisition portion 78 acquires the imaging situation information related to the sub-imaging apparatus 100B of the number n received by the control device 10. The imaging situation information is an example of "first imaging situation information" according to the embodiment of the disclosed technology.

The reflection setting item selection portion 80 selects the reflection setting item to be applied to the sub-imaging apparatus 100B of the number n as the imaging condition from the plurality of setting items included in the imaging condition of the main imaging apparatus 100A in accordance with the preset information and/or the imaging situation information.

For example, the reflection setting item selection portion 80 may select the reflection setting item included in the reflection setting item information of the preset information. In addition, the reflection setting item selection portion 80 may further select the reflection setting item from the reflection setting item included in the reflection setting item information of the preset information in accordance with the imaging situation information. In addition, the reflection setting item selection portion 80 may select the reflection setting item to be added to the reflection setting item included in the reflection setting item information of the preset information from the plurality of setting items in accordance with the imaging situation information.

In addition, for example, the reflection setting item selection portion 80 may decide whether or not to select each reflection setting item in accordance with the imaging situation information in the following manner.

For example, it is desirable that information set for the setting item related to "anti-vibration setting" is set in accordance with a support situation that is a situation in which the imaging apparatus 100 is supported. Therefore, for example, in a case where information indicating that the sub-imaging apparatus 100B is supported by a tripod is obtained as the vibration information related to the sub-imaging apparatus 100B of the number n, the reflection setting item selection portion 80 may select the setting item related to "anti-vibration setting" as the reflection setting item. Accordingly, for example, in a case where the sub-imaging apparatus 100B is supported by a tripod, the information set for the setting item related to "anti-vibration setting" can be reflected on the sub-imaging apparatus 100B from the main imaging apparatus 100A. Consequently, information appropriate for the support situation of the imaging apparatus 100 can be set in the setting item related to "anti-vibration setting" of the sub-imaging apparatus 100B, compared to a case where information is set in the setting item related to "anti-vibration setting" at all times regardless of whether or not the sub-imaging apparatus 100B is supported by a tripod.

In addition, for example, in a case where information indicating that the sub-imaging apparatus 100B is supported by a hand of the user is obtained as the vibration information related to the sub-imaging apparatus 100B of the number n, the reflection setting item selection portion 80 may not select the setting item related to "anti-vibration setting" as the reflection setting item. Accordingly, for example, in a case where the sub-imaging apparatus 100B is supported by a hand of the user, reflection of the information set for the setting item related to "anti-vibration setting" on the sub-imaging apparatus 100B from the main imaging apparatus 100A can be avoided. Consequently, setting of information not appropriate for the support situation of the imaging apparatus 100 as the information set for the setting item related to "anti-vibration setting" of the sub-imaging apparatus 100B can be avoided, compared to a case where the setting item related to "anti-vibration setting" is selected as the reflection setting item at all times.

For example, in a case where the external apparatus is a microphone apparatus, the microphone apparatus needs to be individually tuned. Thus, it is desirable that information set for the setting item related to "audio setting" is set for each microphone apparatus. Therefore, for example, in a case where information indicating that the microphone apparatus as the external apparatus is connected to the sub-imaging apparatus 100B is obtained as the external apparatus connection information related to the sub-imaging apparatus 100B of the number n, the reflection setting item selection portion 80 may not select the setting item related to "audio setting" as the reflection setting item. Accordingly, for example, in a case where the microphone apparatus as the external apparatus is connected to the sub-imaging apparatus 100B, reflection of the information set for the setting item related to "audio setting" on the sub-imaging apparatus 100B from the main imaging apparatus 100A can be avoided. Consequently, setting of information not intended by the user in the setting item related to "audio setting" of the sub-imaging apparatus 100B can be avoided, compared to a case where information is set in the setting item related to "audio setting" at all times regardless of whether or not the microphone apparatus as the external apparatus is connected to the sub-imaging apparatus 100B.

In addition, for example, in a case where information indicating that the microphone apparatus as the external apparatus is not connected to the sub-imaging apparatus 100B is obtained as the external apparatus connection information related to the sub-imaging apparatus 100B of the number n, the reflection setting item selection portion 80 may select the setting item related to "audio setting" as the reflection setting item. Accordingly, for example, in a case where the microphone apparatus as the external apparatus is not connected to the sub-imaging apparatus 100B, the information set for the setting item related to "audio setting" can be reflected on the sub-imaging apparatus 100B from the main imaging apparatus 100A. Consequently, an effort of setting information in the setting item related to "audio setting" of the sub-imaging apparatus 100B by the user can be reduced.

For example, it is desirable that information set for the setting item related to "image quality setting" in the image recording operation processing mode is set for each imaging apparatus 100 in accordance with an imaging environment or the like of the imaging apparatus 100. Therefore, for example, in a case where information indicating that the operation mode of the sub-imaging apparatus 100B is the image recording operation processing mode is obtained as the image recording operation information related to the sub-imaging apparatus 100B of the number n, the reflection setting item selection portion 80 may not select the setting item related to "image quality setting" as the reflection setting item. Accordingly, for example, in a case where the operation mode of the sub-imaging apparatus 100B is the image recording operation processing mode, reflection of the information set for the setting item related to "image quality setting" on the sub-imaging apparatus 100B from the main imaging apparatus 100A can be avoided. Consequently, setting of information not appropriate for the imaging environment or the like in "image quality setting" of the sub-imaging apparatus 100B in the image recording operation processing mode can be avoided, compared to a case where the setting item related to "image quality setting" is selected as the reflection setting item at all times.

In addition, for example, in a case where information indicating that the operation mode of the sub-imaging apparatus 100B is the image display processing mode is obtained as the image recording operation information related to the sub-imaging apparatus 100B of the number n, the reflection setting item selection portion 80 may select the setting item related to "image quality setting" as the reflection setting item. Accordingly, for example, in a case where the operation mode of the sub-imaging apparatus 100B is the image display processing mode, the information set for the setting item related to "image quality setting" can be reflected on the sub-imaging apparatus 100B from the main imaging apparatus 100A. Consequently, an effort of setting information in the setting item related to "image quality setting" of the sub-imaging apparatus 100B in the image display processing mode by the user can be reduced.

For example, as described above, while it is desirable that the information set for the setting item related to "image quality setting" in the image recording operation processing mode is set for each imaging apparatus 100 in accordance with the imaging environment or the like of the imaging apparatus 100, the information set for the setting item related to "image quality setting" in the image display processing mode may also be set for each imaging apparatus 100 in accordance with the imaging environment or the like of the imaging apparatus 100. Therefore, for example, in a case where information indicating that a distance between the main imaging apparatus 100A and the sub-imaging apparatus 100B is less than or equal to a predetermined distance is obtained as the positional information related to the sub-imaging apparatus 100B of the number n, the reflection setting item selection portion 80 may select the setting item related to "image quality setting" as the reflection setting item. For example, the predetermined distance is determined in advance as a distance corresponding to a case where the main imaging apparatus 100A and the sub-imaging apparatus 100B are in the identical imaging environment. Accordingly, for example, in a case where the distance between the main imaging apparatus 100A and the sub-imaging apparatus 100B is less than or equal to the predetermined distance, the information set for the setting item related to "image quality setting" can be reflected on the sub-imaging apparatus 100B from the main imaging apparatus 100A. Consequently, information appropriate for the imaging environment or the like can be set in the setting item related to "image quality setting" of the sub-imaging apparatus 100B, compared to a case where information is set at all times or information is not set in the setting item related to "image quality setting" regardless of whether or not the distance between the main imaging apparatus 100A and the sub-imaging apparatus 100B is less than or equal to the predetermined distance.

In addition, for example, in a case where information indicating that the distance between the main imaging apparatus 100A and the sub-imaging apparatus 100B exceeds the predetermined distance is obtained as the positional information related to the sub-imaging apparatus 100B of the number n, the reflection setting item selection portion 80 may not select the setting item related to "image quality setting" as the reflection setting item. Accordingly, for example, in a case where the distance between the main imaging apparatus 100A and the sub-imaging apparatus 100B exceeds the predetermined distance, reflection of the information set for the setting item related to "image quality setting" on the sub-imaging apparatus 100B from the main imaging apparatus 100A can be avoided. Consequently, setting of information not appropriate for the imaging environment or the like in the setting item related to "image quality setting" of the sub-imaging apparatus 100B can be avoided, compared to a case where the setting item related to "image quality setting" is selected as the reflection setting item at all times.

For example, a motion of the subject is different for each type of subject. Thus, it is desirable that information set for the setting item related to "focus setting" and/or "anti-vibration setting" is set for each type of subject corresponding to the imaging apparatus 100. Therefore, for example, in a case where information indicating that the type of subject corresponding to the sub-imaging apparatus 100B is different from the type of subject corresponding to the main imaging apparatus 100A is obtained as the subject information related to the sub-imaging apparatus 100B of the number n, the reflection setting item selection portion 80 may not select the setting item related to "focus setting" and/or "anti-vibration setting" as the reflection setting item. Accordingly, for example, in a case where the type of subject corresponding to the sub-imaging apparatus 100B is different from the type of subject corresponding to the main imaging apparatus 100A, reflection of the information set for the setting item related to "focus setting" and/or "anti-vibration setting" on the sub-imaging apparatus 100B from the main imaging apparatus 100A can be avoided. Consequently, setting of information not appropriate for the type of subject in the setting item related to "focus setting" and/or "anti-vibration setting" of the sub-imaging apparatus 100B can be avoided, compared to a case where the setting item related to "focus setting" and/or "anti-vibration setting" is selected as the reflection setting item at all times.

In addition, for example, in a case where information indicating that the type of subject corresponding to the sub-imaging apparatus 100B is the same as the type of subject corresponding to the main imaging apparatus 100A is obtained as the subject information related to the sub-imaging apparatus 100B of the number n, the reflection setting item selection portion 80 may select the setting item related to "focus setting" and/or "anti-vibration setting" as the reflection setting item. Accordingly, for example, in a case where the type of subject corresponding to the sub-imaging apparatus 100B is the same as the type of subject corresponding to the main imaging apparatus 100A, the information set for the setting item related to "focus setting" and/or "anti-vibration setting" can be reflected on the sub-imaging apparatus 100B from the main imaging apparatus 100A. Consequently, information appropriate for the type of subject can be set in the setting item related to "focus setting" and/or "anti-vibration setting" of the sub-imaging apparatus 100B, compared to a case where the setting item related to "focus setting" and/or "anti-vibration setting" is selected as the reflection setting item at all times.

For example, it is desirable that tints of the images obtained by imaging performed by each imaging apparatus 100 are similar to each other. Therefore, for example, in a case where information indicating that a difference between a calculation value of the auto white balance calculated for the main imaging apparatus 100A and a calculation value of the auto white balance calculated for the sub-imaging apparatus 100B is less than or equal to a predetermined value is obtained as the light source information related to the sub-imaging apparatus 100B of the number n, the reflection setting item selection portion 80 may select the setting item related to "image quality setting" (for example, setting related to the auto white balance) as the reflection setting item. For example, the predetermined value related to the auto white balance is determined in advance as a value corresponding to a case where a light source corresponding to the main imaging apparatus 100A and a light source corresponding to the sub-imaging apparatus 100B are identical. For example, the calculation of the auto white balance is executed in a case where information related to a type of light source is not known. Accordingly, for example, in a case where the difference between the calculation value of the auto white balance calculated for the main imaging apparatus 100A and the calculation value of the auto white balance calculated for the sub-imaging apparatus 100B is less than or equal to the predetermined value, the information set for the setting item related to "image quality setting" (for example, the setting related to the auto white balance) can be reflected on the sub-imaging apparatus 100B from the main imaging apparatus 100A. Consequently, the tint of the image obtained by imaging performed by the sub-imaging apparatus 100B can be matched to the tint of the image obtained by imaging performed by the main imaging apparatus 100A.

In addition, for example, in a case where information indicating that the difference between the calculation value of the auto white balance calculated for the main imaging apparatus 100A and the calculation value of the auto white balance calculated for the sub-imaging apparatus 100B exceeds the predetermined value is obtained as the light source information related to the sub-imaging apparatus 100B of the number n, the reflection setting item selection portion 80 may not select the setting item related to "image quality setting" as the reflection setting item. Accordingly, for example, in a case where the difference between the calculation value of the auto white balance calculated for the main imaging apparatus 100A and the calculation value of the auto white balance calculated for the sub-imaging apparatus 100B exceeds the predetermined value, reflection of the information set for the setting item related to "image quality setting" (for example, the setting related to the auto white balance) on the sub-imaging apparatus 100B from the main imaging apparatus 100A can be avoided. Consequently, a difference between the tint of the image obtained by imaging performed by the sub-imaging apparatus 100B and the tint of the image obtained by imaging performed by the main imaging apparatus 100A can be suppressed, compared to a case where the setting item related to "image quality setting" is selected as the reflection setting item at all times.

For example, it is desirable that the flicker of the illumination does not glare by reflection in the image obtained by imaging performed by each imaging apparatus 100. Therefore, for example, in a case where information indicating that the flicker of the illumination is detected for the sub-imaging apparatus 100B is obtained as the light source information related to the sub-imaging apparatus 100B of the number n, the reflection setting item selection portion 80 may not select the setting item related to "exposure setting" (for example, setting related to the shutter speed) as the reflection setting item. For example, the detection of the flicker is executed in a case where information related to the type of light source is not known. Accordingly, for example, in a case where the flicker of the illumination is detected for the sub-imaging apparatus 100B, reflection of the information set for the setting item related to "exposure setting" (for example, the setting related to the shutter speed) on the sub-imaging apparatus 100B from the main imaging apparatus 100A can be avoided. Consequently, compared to a case where the setting item related to "exposure setting" is selected at all times, glaring of the flicker of the illumination by reflection in the image obtained by imaging performed by the sub-imaging apparatus 100B can be suppressed.

In addition, for example, in a case where information indicating that the flicker of the illumination is not detected for the sub-imaging apparatus 100B is obtained as the light source information related to the sub-imaging apparatus 100B of the number n, the reflection setting item selection portion 80 may select the setting item related to "exposure setting" as the reflection setting item. Accordingly, for example, in a case where the flicker of the illumination is not detected for the sub-imaging apparatus 100B, the information set for the setting item related to "exposure setting" can be reflected on the sub-imaging apparatus 100B from the main imaging apparatus 100A. Consequently, an effort of setting information in the setting item related to "exposure setting" of the sub-imaging apparatus 100B by the user can be reduced.

For example, it is desirable that the reflection setting item is reflected on the sub-imaging apparatus 100B from the main imaging apparatus 100A without interruption. Therefore, for example, in a case where information indicating that a communication failure occurs in the network 1 (refer to FIG. 1) connected to the sub-imaging apparatus 100B is obtained as the network connection information related to the sub-imaging apparatus 100B of the number n, the reflection setting item selection portion 80 may not select all reflection setting items. Accordingly, for example, in a case where a communication failure occurs in the network 1 connected to the sub-imaging apparatus 100B, execution of processing of reflecting the information related to the reflection setting item on the sub-imaging apparatus 100B from the main imaging apparatus 100A can be avoided. Consequently, a failure of the processing of reflecting the information set in the setting item related to the reflection setting item on the sub-imaging apparatus 100B from the main imaging apparatus 100A can be avoided.

In addition, for example, in a case where information indicating that a communication failure does not occur in the network 1 connected to the sub-imaging apparatus 100B is obtained as the network connection information related to the sub-imaging apparatus 100B of the number n, the reflection setting item selection portion 80 may select all reflection setting items included in the reflection setting item information of the preset information. Accordingly, for example, in a case where a communication failure does not occur in the network 1 connected to the sub-imaging apparatus 100B, the information related to all reflection setting items can be reflected on the sub-imaging apparatus 100B from the main imaging apparatus 100A. Consequently, information intended by the user can be set in the setting item of the sub-imaging apparatus 100B.

For example, in a case where information indicating that a communication speed of the network 1 connected to the sub-imaging apparatus 100B is lower than a predetermined communication speed is obtained as the network connection information related to the sub-imaging apparatus 100B of the number n, the reflection setting item selection portion 80 may not select all reflection setting items. For example, the predetermined communication speed is a speed at which the information set for the setting items related to all reflection setting items may be reflected on the sub-imaging apparatus 100B from the main imaging apparatus 100A.

For example, in a case where information indicating that the communication speed of the network 1 connected to the sub-imaging apparatus 100B is the predetermined communication speed is obtained as the network connection information related to the sub-imaging apparatus 100B of the number n, the reflection setting item selection portion 80 may select all reflection setting items included in the reflection setting item information of the preset information.

In addition, the reflection setting item selection portion 80 may decide whether or not to select the setting item related to "image quality setting" as the reflection setting item in accordance with the network connection information related to the sub-imaging apparatus 100B of the number n.

For example, performance related to the auto focus may be different for each type of the imaging apparatus 100. Therefore, for example, in a case where information indicating that the type of the sub-imaging apparatus 100B is the same as the type of the main imaging apparatus 100A is obtained as the type information related to the sub-imaging apparatus 100B of the number n, the reflection setting item selection portion 80 may select the setting item related to "focus setting" as the reflection setting item. Accordingly, for example, in a case where the type of the sub-imaging apparatus 100B is the same as the type of the main imaging apparatus 100A, the information set for the setting item related to "focus setting" can be reflected on the sub-imaging apparatus 100B from the main imaging apparatus 100A. Consequently, information intended by the user can be set in the setting item related to "focus setting" of the sub-imaging apparatus 100B.

In addition, for example, in a case where information indicating that the type of the sub-imaging apparatus 100B is different from the type of the main imaging apparatus 100A is obtained as the type information related to the sub-imaging apparatus 100B of the number n, the reflection setting item selection portion 80 may not select the setting item related to "focus setting" as the reflection setting item. Accordingly, for example, in a case where the type of the sub-imaging apparatus 100B is different from the type of the main imaging apparatus 100A, reflection of the information set for the setting item related to "focus setting" on the sub-imaging apparatus 100B from the main imaging apparatus 100A can be avoided. Consequently, setting of information not intended by the user in the setting item related to the "focus setting" of the sub-imaging apparatus 100B can be avoided.

For example, performance related to the lens unit 104 (refer to FIG. 3) may be different for each type of the lens unit 104. Therefore, for example, in a case where information indicating that the type of the lens unit 104 mounted in the sub-imaging apparatus 100B is the same as the type of the lens unit 104 mounted in the main imaging apparatus 100A is obtained as the lens information related to the sub-imaging apparatus 100B of the number n, the reflection setting item selection portion 80 may select the setting item related to "focus setting" as the reflection setting item. Accordingly, for example, in a case where the type of the lens unit 104 mounted in the sub-imaging apparatus 100B is the same as the type of the lens unit 104 mounted in the main imaging apparatus 100A, the information set for the setting item related to "focus setting" can be reflected on the sub-imaging apparatus 100B from the main imaging apparatus 100A. Consequently, information intended by the user can be set in the setting item related to "focus setting" of the sub-imaging apparatus 100B.

In addition, for example, in a case where information indicating that the type of the lens unit 104 mounted in the sub-imaging apparatus 100B is different from the type of the lens unit 104 mounted in the main imaging apparatus 100A is obtained as the lens information related to the sub-imaging apparatus 100B of the number n, the reflection setting item selection portion 80 may not select the setting item related to "focus setting" as the reflection setting item. Accordingly, for example, in a case where the type of the lens unit 104 mounted in the sub-imaging apparatus 100B is different from the type of the lens unit 104 mounted in the main imaging apparatus 100A, reflection of the information set for the setting item related to "focus setting" on the sub-imaging apparatus 100B from the main imaging apparatus 100A can be avoided. Consequently, setting of information not intended by the user in the setting item related to the "focus setting" of the sub-imaging apparatus 100B can be avoided.

For example, the remaining capacity of the battery 162 (refer to FIG. 3) may affect the imaging operation of the imaging apparatus 100. Therefore, for example, in a case where information indicating that the remaining capacity of the battery 162 mounted in the sub-imaging apparatus 100B is greater than or equal to a predetermined capacity is obtained as the battery information related to the sub-imaging apparatus 100B of the number n, the reflection setting item selection portion 80 may select the setting item related to "recording setting" as the reflection setting item. The predetermined capacity related to the battery is set in advance to a capacity with which the imaging operation of the sub-imaging apparatus 100B may be secured. Accordingly, for example, in a case where the remaining capacity of the battery 162 mounted in the sub-imaging apparatus 100B is greater than or equal to the predetermined capacity, the information (for example, information related to the image size) set for the setting item related to "recording setting" can be reflected on the sub-imaging apparatus 100B from the main imaging apparatus 100A. Consequently, information intended by the user can be set in the setting item related to "recording setting" of the sub-imaging apparatus 100B.

In addition, for example, in a case where information indicating that the remaining capacity of the battery 162 mounted in the sub-imaging apparatus 100B is less than the predetermined capacity is obtained as the battery information related to the sub-imaging apparatus 100B of the number n, the reflection setting item selection portion 80 may not select the setting item related to "recording setting" as the reflection setting item. Accordingly, for example, in a case where the remaining capacity of the battery 162 mounted in the sub-imaging apparatus 100B is less than the predetermined capacity, the information (for example, reflection of the information related to the image size) set for the setting item related to "recording setting" on the sub-imaging apparatus 100B from the main imaging apparatus 100A can be avoided. Consequently, an effect of the information set for the setting item related to "recording setting" of the sub-imaging apparatus 100B on the imaging operation of the imaging apparatus 100 can be suppressed, compared to a case where the setting item related to "recording setting" is selected at all times regardless of whether or not the remaining capacity of the battery 162 is less than the predetermined capacity.

For example, the temperature inside the imaging apparatus 100 may affect the imaging operation of the imaging apparatus 100. Therefore, for example, in a case where information indicating that the temperature inside the sub-imaging apparatus 100B is less than or equal to a predetermined temperature is obtained as the temperature information related to the sub-imaging apparatus 100B of the number n, the reflection setting item selection portion 80 may select the setting item related to "recording setting" as the reflection setting item. The predetermined temperature related to the temperature inside the sub-imaging apparatus 100B is set in advance to a temperature at which the imaging operation of the sub-imaging apparatus 100B may be secured. Accordingly, for example, in a case where the temperature inside the sub-imaging apparatus 100B is less than or equal to the predetermined temperature, the information (for example, the information related to the image size) set for the setting item related to "recording setting" can be reflected on the sub-imaging apparatus 100B from the main imaging apparatus 100A. Consequently, information intended by the user can be set in the setting item related to "recording setting" of the sub-imaging apparatus 100B.

In addition, for example, in a case where information indicating that the temperature inside the sub-imaging apparatus 100B exceeds the predetermined temperature is obtained as the temperature information related to the sub-imaging apparatus 100B of the number n, the reflection setting item selection portion 80 may not select the setting item related to "recording setting" as the reflection setting item. Accordingly, for example, in a case where the temperature inside the sub-imaging apparatus 100B exceeds the predetermined temperature, reflection of the information set for the setting item related to "recording setting" on the sub-imaging apparatus 100B from the main imaging apparatus 100A can be avoided. Consequently, an effect of the information set for the setting item related to "recording setting" of the sub-imaging apparatus 100B on the imaging operation of the imaging apparatus 100 can be suppressed, compared to a case where the setting item related to "recording setting" is selected as the reflection setting item at all times.

In a case where the reflection setting item included in the reflection setting item information of the preset information is different from the reflection setting item selected in accordance with the imaging situation information of the sub-imaging apparatus 100B, the reflection setting item selection portion 80 may decide whether or not to select each reflection setting item. In addition, the reflection setting item selection portion 80 may preferentially select the reflection setting item included in the reflection setting item information of the preset information over the reflection setting item selected in accordance with the imaging situation information of the sub-imaging apparatus 100B or may preferentially select the reflection setting item selected in accordance with the imaging situation information of the sub-imaging apparatus 100B over the reflection setting item included in the reflection setting item information of the preset information.

In addition, the reflection setting item selection portion 80 may acquire the imaging situation information that is information related to the imaging situation of the main imaging apparatus 100A, and select the setting item (that is, the reflection setting item) to be applied to the sub-imaging apparatus 100B as the imaging condition from the plurality of setting items included in the imaging condition of the main imaging apparatus 100A in accordance with the imaging situation information of the main imaging apparatus 100A.

The variable addition portion 82 adds 1 to the variable n.

Figure 20:
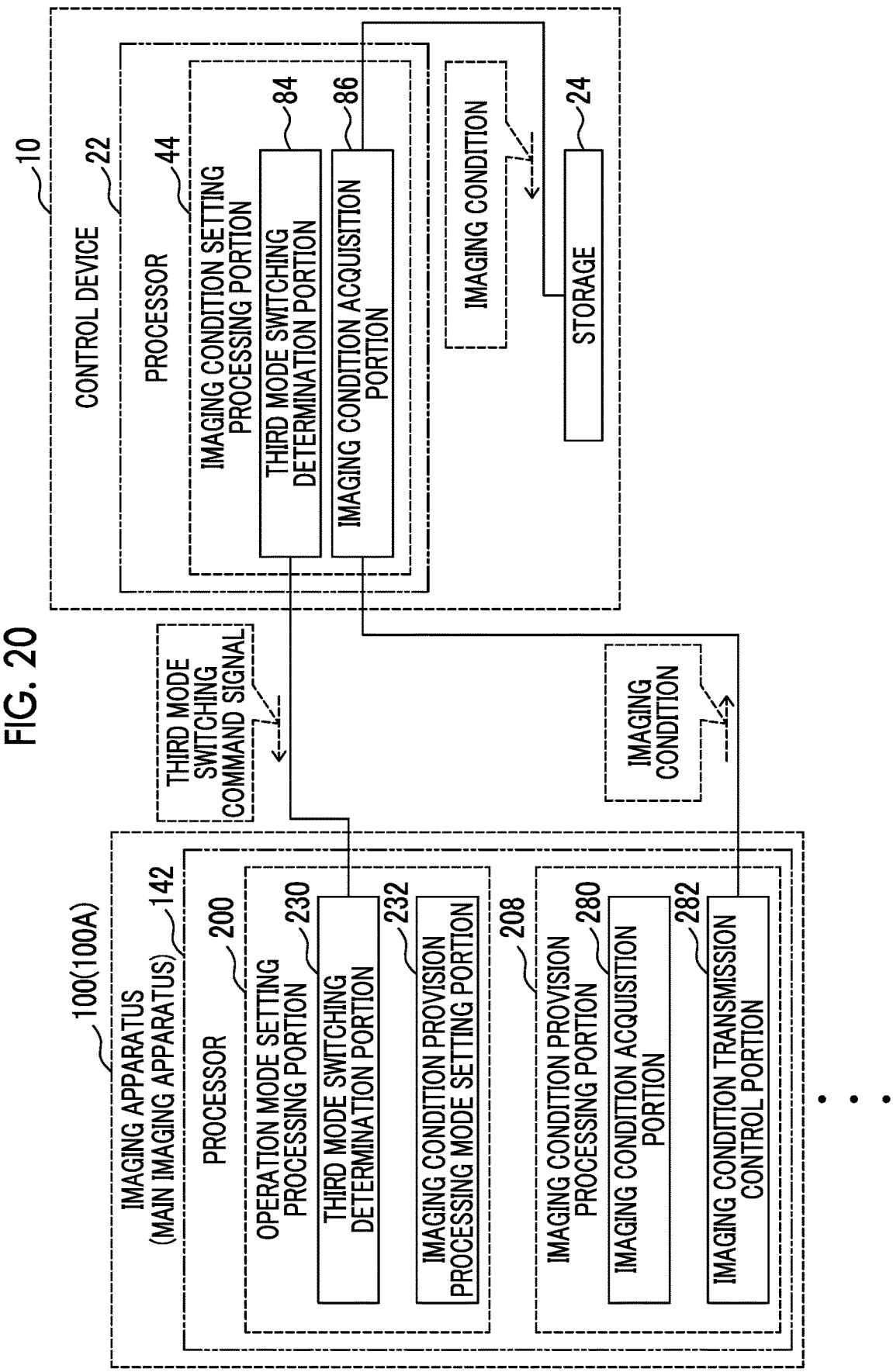
FIG. 20 is a block diagram for describing an example of processing contents of the imaging condition setting processing portion of the control device according to the first embodiment.

FIG. 20 illustrates an example of processing contents of the imaging condition setting processing portion 44, the operation mode setting processing portion 200, and the imaging condition provision processing portion 208. In the imaging condition setting processing portion 44 of the control device 10, the third mode switching control portion 84 transmits the third mode switching command signal indicating an instruction to switch the operation mode of the main imaging apparatus 100A to the imaging condition provision processing mode, to the main imaging apparatus 100A.

In the operation mode setting processing portion 200 of the main imaging apparatus 100A, the third mode switching determination portion 230 determines whether or not the third mode switching command signal indicating the instruction to switch the operation mode of the main imaging apparatus 100A to the imaging condition provision processing mode is received by the main imaging apparatus 100A. In a case where the third mode switching determination portion 230 determines that the third mode switching command signal is received by the main imaging apparatus 100A, the imaging condition provision processing mode setting portion 232 sets the imaging condition provision processing mode as the operation mode of the main imaging apparatus 100A.

In the imaging condition provision processing portion 208 of the main imaging apparatus 100A, the imaging condition acquisition portion 280 acquires the imaging condition of the main imaging apparatus 100A from the main imaging apparatus 100A. As an example, the imaging condition acquisition portion 280 acquires information set for the setting item related to "imaging mode", the setting item related to "image quality setting", the setting item related to "focus setting", the setting item related to "exposure setting", the setting item related to "audio setting", the setting item related to "recording setting", and the setting item related to "anti-vibration setting" for the main imaging apparatus 100A. The imaging condition of the main imaging apparatus 100A is an example of a "first imaging condition" according to the embodiment of the disclosed technology. The plurality of setting items included in the imaging condition of the main imaging apparatus 100A are an example of a "plurality of first setting items", a "plurality of second setting items", and a "plurality of fourth setting items" according to the embodiment of the disclosed technology.

The imaging condition transmission control portion 282 transmits imaging condition information indicating the imaging condition of the main imaging apparatus 100A to the control device 10.

In the imaging condition setting processing portion 44 of the control device 10, the imaging condition acquisition portion 86 acquires the imaging condition information received by the control device 10. The imaging condition acquisition portion 86 may request the main imaging apparatus 100A to transmit only the information set for the reflection setting item selected by the reflection setting item selection portion 80 among the plurality of setting items to the control device 10. The imaging condition acquisition portion 86 may acquire only the information transmitted from the main imaging apparatus 100A in accordance with the request to the main imaging apparatus 100A.

The imaging condition acquisition portion 86 stores the acquired imaging condition information in the storage 24. The imaging condition acquisition portion 86 may store the imaging condition information in only the RAM 26 (refer to FIG. 2) or may store the imaging condition information in a distributed manner between the storage 24 and the RAM 26. In a case of storing the imaging condition in only the RAM 26, the RAM 26 is an example of a "memory" according to the embodiment of the disclosed technology. In a case of storing the imaging condition information in a distributed manner between the storage 24 and the RAM 26, the storage 24 and the RAM 26 are an example of the "memory" according to the embodiment of the disclosed technology.

Figure 21:
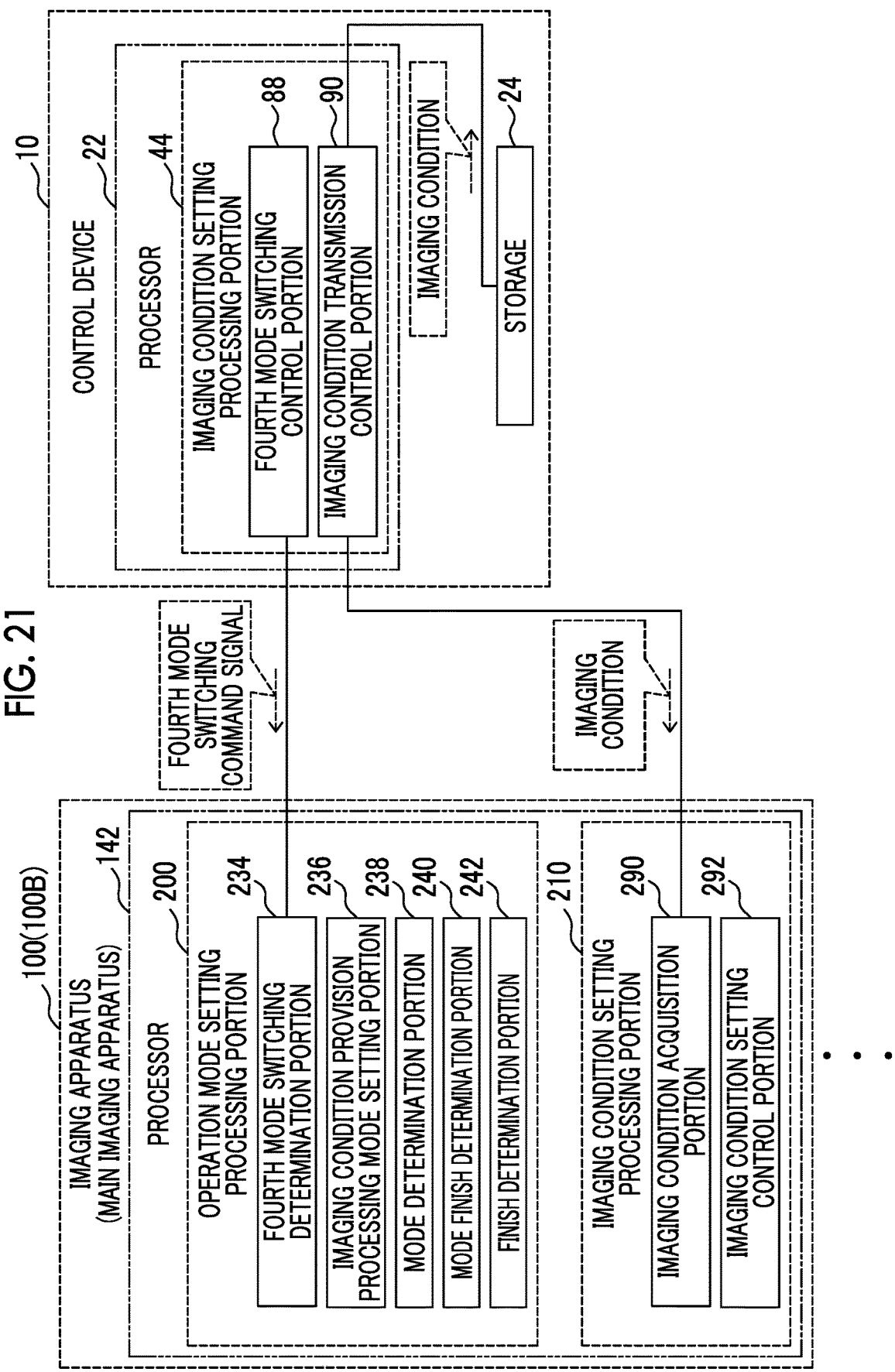
FIG. 21 is a block diagram for describing an example of processing contents of the imaging condition setting processing portion of the control device according to the first embodiment.

FIG. 21 illustrates an example of the processing contents of the imaging condition setting processing portion 44, the operation mode setting processing portion 200, and the imaging condition provision processing portion 208. In the imaging condition setting processing portion 44 of the control device 10, the fourth mode switching control portion 88 transmits the fourth mode switching command signal indicating an instruction to switch the operation mode of the sub-imaging apparatus 100B to the imaging condition setting processing mode, to each sub-imaging apparatus 100B.

In the operation mode setting processing portion 200 of each sub-imaging apparatus 100B, the fourth mode switching determination portion 234 determines whether or not the fourth mode switching command signal indicating the instruction to switch the operation mode of the sub-imaging apparatus 100B to the imaging condition setting processing mode is received by the sub-imaging apparatus 100B. In a case where the fourth mode switching determination portion 234 determines that the fourth mode switching command signal is received by the sub-imaging apparatus 100B, the imaging condition setting processing mode setting portion 236 sets the imaging condition setting processing mode as the operation mode of the sub-imaging apparatus 100B.

In the imaging condition setting processing portion 44 of the control device 10, the imaging condition transmission control portion 90 transmits the imaging condition of the main imaging apparatus 100A to each sub-imaging apparatus 100B based on the reflection setting item selected by the reflection setting item selection portion 80 for each sub-imaging apparatus 100B. That is, the imaging condition transmission control portion 90 acquires information (that is, information set for the reflection setting item selected by the reflection setting item selection portion 80) included in the imaging condition to be reflected on each sub-imaging apparatus 100B from the imaging condition information stored in the storage 24. The imaging condition transmission control portion 90 transmits the acquired imaging condition information to each sub-imaging apparatus 100B.

In the imaging condition setting processing portion 210 of each sub-imaging apparatus 100B, the imaging condition acquisition portion 290 acquires the imaging condition information received by the sub-imaging apparatus 100B. The imaging condition setting control portion 292 sets the imaging condition indicated by the imaging condition information in the sub-imaging apparatus 100B based on the imaging condition information acquired by the imaging condition acquisition portion 290. Accordingly, the imaging condition of the main imaging apparatus 100A is set in each sub-imaging apparatus 100B based on the reflection setting item selected for each sub-imaging apparatus 100B. The imaging condition set in the sub-imaging apparatus 100B is an example of a "third imaging condition" according to the embodiment of the disclosed technology.

In the operation mode setting processing portion 200 of each imaging apparatus 100, the mode determination portion 238 determines whether or not the operation mode of the imaging apparatus 100 is the image display processing mode. In a case where the mode determination portion 238 determines that the operation mode of the imaging apparatus 100 is not the image display processing mode, the mode finish determination portion 240 determines whether or not a mode (as an example, the image recording processing mode, the imaging situation provision processing mode, the imaging condition provision processing mode, or the imaging condition setting processing mode) switched from the image display processing mode is finished.

In a case where the mode finish determination portion 240 determines that a condition under which the mode switched from the image display processing mode is finished is established, the finish determination portion 242 determines whether or not a condition under which the operation mode setting processing is finished is established. Examples of the condition under which the operation mode setting processing is finished include a condition that a finish instruction (for example, an instruction to stop a power supply of the imaging apparatus 100) that is an instruction to finish the operation mode setting processing is received by the reception device 150 (refer to FIG. 3).

Next, an action of the imaging system S according to the first embodiment will be described with reference to FIG. 22 to FIG. 30.

First, an example of a flow of operation mode setting processing performed by the processor 22 (refer to FIG. 15) of the control device 10 will be described with reference to FIG. 22.

Figure 22:
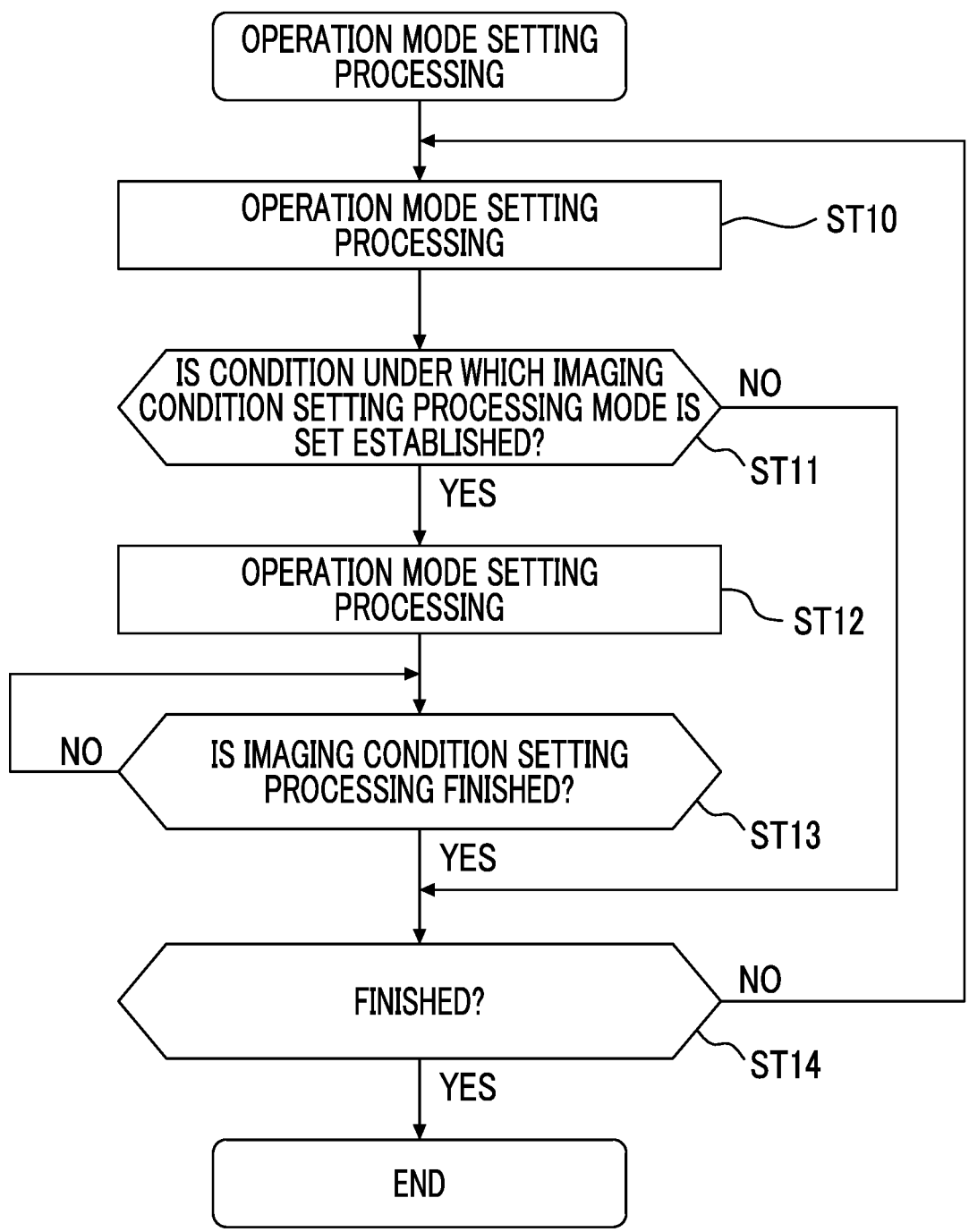
FIG. 22 is a flowchart illustrating an example of a flow of operation mode setting processing of the control device according to the first embodiment.

In the operation mode setting processing illustrated in FIG. 22, first, in step ST10, the imaging control processing mode setting portion 50 sets the imaging control processing mode as the initial setting of the operation mode of the control device 10. After the processing of step ST10 is executed, the operation mode setting processing transitions to step ST11.

In step ST11, the mode switching determination portion 52 determines whether or not the mode switching condition for switching the operation mode of the control device 10 from the imaging control processing mode to the imaging condition setting processing mode is established. Examples of the mode switching condition include the condition that the mode switching instruction that is an instruction to switch the operation mode of the control device 10 from the imaging control processing mode to the imaging condition setting processing mode is received by the reception device 14, the condition that the imaging condition of the main imaging apparatus 100A is changed, the condition that the imaging situation of the main imaging apparatus 100A is changed, or the condition that the imaging situation of any sub-imaging apparatus 100B is changed. In step ST11, in a case where the mode switching condition is established, a positive determination is made, and the operation mode setting processing transitions to step ST12. In step ST11, in a case where the mode switching condition is not established, a negative determination is made, and the operation mode setting processing transitions to step ST14.

In step ST12, the imaging condition setting processing mode setting portion 54 sets the imaging condition setting processing mode as the operation mode of the control device 10. After the processing of step ST12 is executed, the operation mode setting processing transitions to step ST13.

In step ST13, the imaging condition setting processing finish determination portion 56 determines whether or not the imaging condition setting processing is finished. In step ST13, in a case where the imaging condition setting processing is not finished, a negative determination is made, and the determination of step ST13 is performed again. In step ST13, in a case where the imaging condition setting processing is finished, a positive determination is made, and the operation mode setting processing transitions to step ST14.

In step ST14, the finish determination portion 58 determines whether or not the condition under which the operation mode setting processing is finished is established. Examples of the condition under which the operation mode setting processing is finished include a condition that a finish instruction (for example, the instruction to stop the power supply of the control device 10) that is an instruction to finish the operation mode setting processing is received by the reception device 14. In step ST14, in a case where the condition under which the operation mode setting processing is finished is not established, a negative determination is made, and the operation mode setting processing transitions to step ST10. In step ST14, in a case where the condition under which the operation mode setting processing is finished is established, a positive determination is made, and the operation mode setting processing is finished.

Next, an example of a flow of imaging control processing performed by the processor 22 (refer to FIG. 16) of the control device 10 will be described with reference to FIG. 23.

Figure 23:
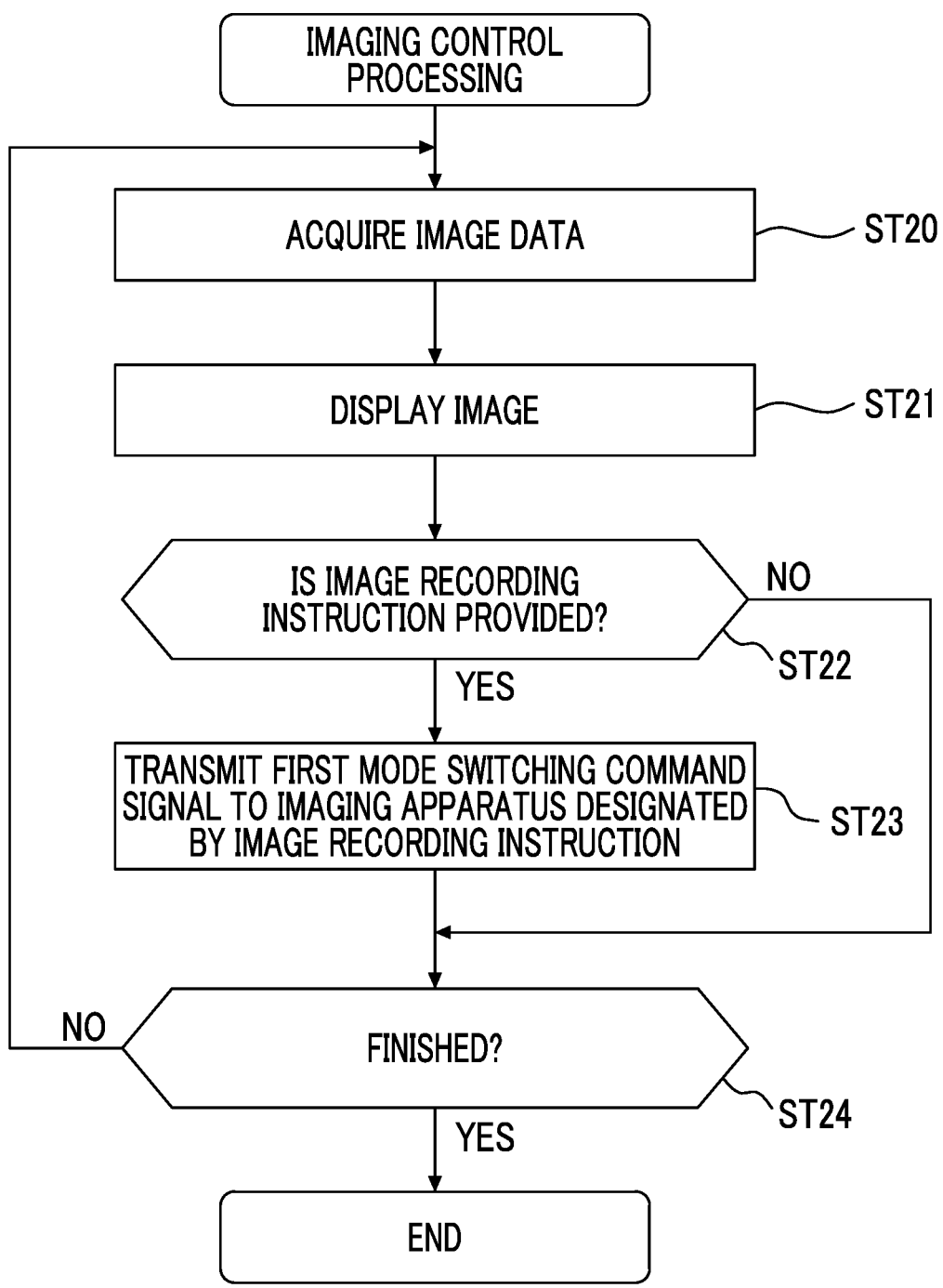
FIG. 23 is a flowchart illustrating an example of a flow of imaging control processing of the control device according to the first embodiment.

In the imaging control processing illustrated in FIG. 23, first, in step ST20, the image data acquisition portion 60 acquires the image data. After the processing of step ST20 is executed, the imaging control processing transitions to step ST21.

In step ST21, the image display control portion 62 displays the image on the display 16 based on the image data acquired by the image data acquisition portion 60. After the processing of step ST21 is executed, the imaging control processing transitions to step ST22.

In step ST22, the image recording instruction determination portion 64 determines whether or not the image recording instruction that is an instruction for any imaging apparatus 100 of the plurality of imaging apparatuses 100 to record the image is received by the reception device 14. In step ST22, in a case where the image recording instruction is not received by the reception device 14, a negative determination is made, and the imaging control processing transitions to step ST24. In step ST22, in a case where the image recording instruction is received by the reception device 14, a positive determination is made, and the imaging control processing transitions to step ST23.

In step ST23, the first mode switching control portion 66 transmits the first mode switching command signal indicating the instruction to switch the operation mode of the imaging apparatus 100 designated by the image recording instruction to the image recording processing mode, to the imaging apparatus 100 designated by the image recording instruction. After the processing of step ST23 is executed, the imaging control processing transitions to step ST24.

In step ST24, the finish determination portion 68 determines whether or not the condition under which the imaging control processing is finished is established. Examples of the condition under which the imaging control processing is finished include the condition that the mode switching condition for switching the operation mode of the control device 10 from the imaging control processing mode to the imaging condition setting processing mode is established. In step ST24, in a case where the condition under which the imaging control processing is finished is not established, a negative determination is made, and the imaging control processing transitions to step ST20. In step ST24, in a case where the condition under which the imaging control processing is finished is established, a positive determination is made, and the imaging control processing is finished.

Next, an example of a flow of imaging condition setting processing performed by the processor 22 (refer to FIG. 17 to FIG. 21) of the control device 10 will be described with reference to FIG. 24.

Figure 24:
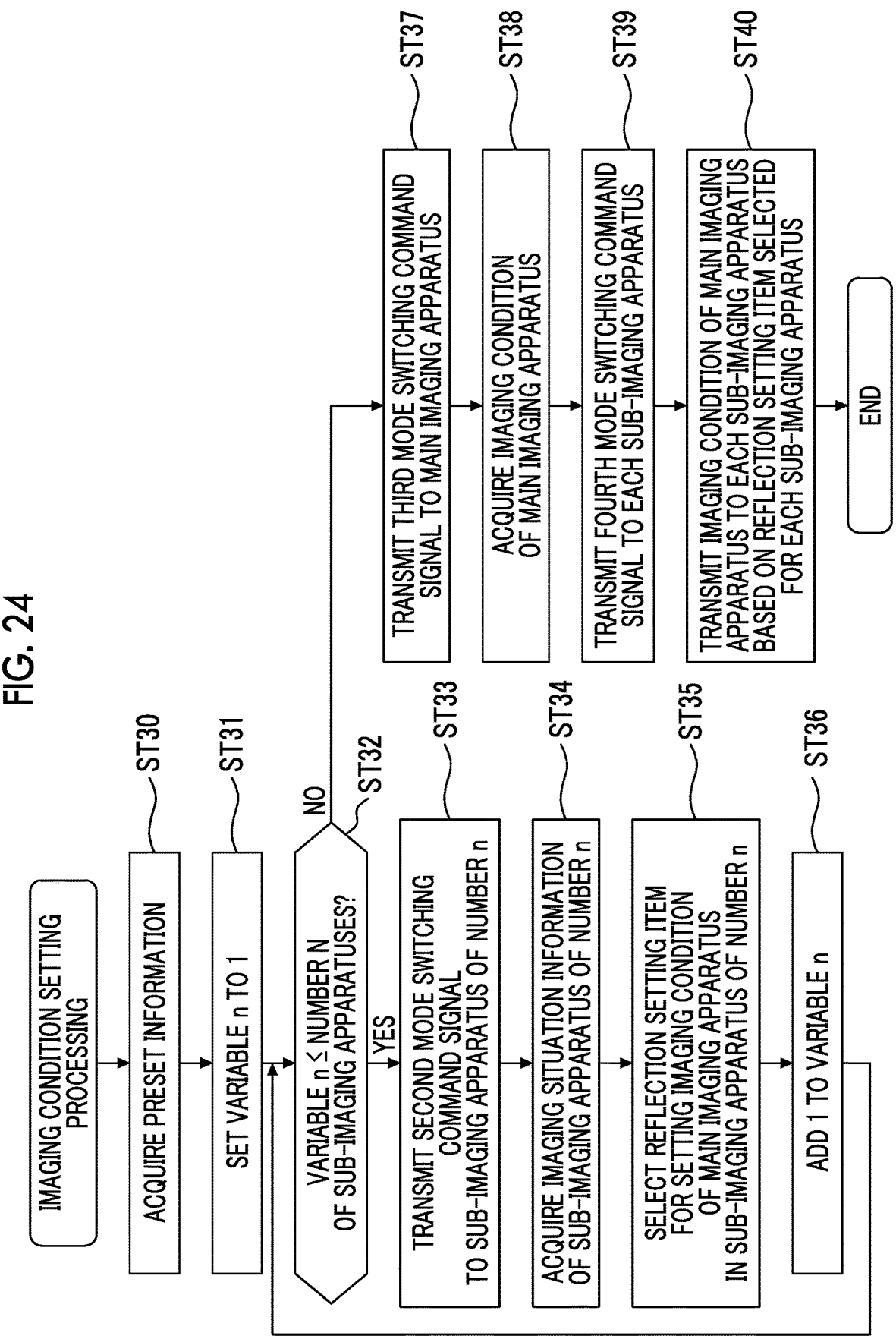
FIG. 24 is a flowchart illustrating an example of a flow of imaging condition setting processing of the control device according to the first embodiment.

In the imaging condition setting processing illustrated in FIG. 24, first, in step ST30, the preset information acquisition portion 70 acquires the preset information set in the control device 10. After the processing of step ST30 is executed, the imaging condition setting processing transitions to step ST31.

In step ST31, the variable setting portion 72 sets the variable n set for the plurality of sub-imaging apparatuses 100B to 1. After the processing of step ST31 is executed, the imaging condition setting processing transitions to step ST32.

In step ST32, the variable determination portion 74 determines whether or not the variable n is less than or equal to the number N of the plurality of sub-imaging apparatuses 100B. In step ST32, in a case where the variable n is less than or equal to the number N of the plurality of sub-imaging apparatuses 100B, a positive determination is made, and the imaging condition setting processing transitions to step ST33. In step ST32, in a case where the variable n exceeds the number N of the plurality of sub-imaging apparatuses 100B, a negative determination is made, and the imaging condition setting processing transitions to step ST37.

In step ST33, the second mode switching control portion 76 transmits the second mode switching command signal indicating the instruction to switch the operation mode of the sub-imaging apparatus 100B of the number n to the imaging situation provision processing mode, to the sub-imaging apparatus 100B of the number n. After the processing of step ST33 is executed, the imaging condition setting processing transitions to step ST34.

In step ST34, the imaging situation information acquisition portion 78 acquires the imaging situation information related to the imaging situation of the sub-imaging apparatus 100B of the number n corresponding to the variable n. After the processing of step ST34 is executed, the imaging condition setting processing transitions to step ST35.

In step ST35, the reflection setting item selection portion 80 selects the reflection setting item to be applied to the sub-imaging apparatus 100B of the number n as the imaging condition from the plurality of setting items included in the imaging condition of the main imaging apparatus 100A in accordance with the preset information and/or the imaging situation information. After the processing of step ST35 is executed, the imaging condition setting processing transitions to step ST36.

In step ST36, the variable addition portion 82 adds 1 to the variable n. After the processing of step ST36 is executed, the imaging condition setting processing transitions to step ST32.

In step ST37, the third mode switching control portion 84 transmits the third mode switching command signal indicating the instruction to switch the operation mode of the main imaging apparatus 100A to the imaging condition provision processing mode, to the main imaging apparatus 100A. After the processing of step ST37 is executed, the imaging condition setting processing transitions to step ST38.

In step ST38, the imaging condition acquisition portion 86 acquires the imaging condition of the main imaging apparatus 100A. After the processing of step ST38 is executed, the imaging condition setting processing transitions to step ST39.

In step ST39, the fourth mode switching control portion 88 transmits the fourth mode switching command signal indicating the instruction to switch the operation mode of the sub-imaging apparatus 100B to the imaging condition setting processing mode, to each sub-imaging apparatus 100B. After the processing of step ST39 is executed, the imaging condition setting processing transitions to step ST40.

In step ST40, the imaging condition transmission control portion 90 transmits the imaging condition of the main imaging apparatus 100A to each sub-imaging apparatus 100B based on the reflection setting item selected by the reflection setting item selection portion 80 for each sub-imaging apparatus 100B. After the processing of step ST40 is executed, the imaging condition setting processing is finished.

The control method described as the action of the control device 10 is an example of a "control method" according to the embodiment of the disclosed technology.

Next, an example of a flow of operation mode setting processing performed by the processor 142 (refer to FIG. 16, FIG. 17, and FIG. 19 to FIG. 21) of each imaging apparatus 100 will be described with reference to FIG. 25.

Figure 25:
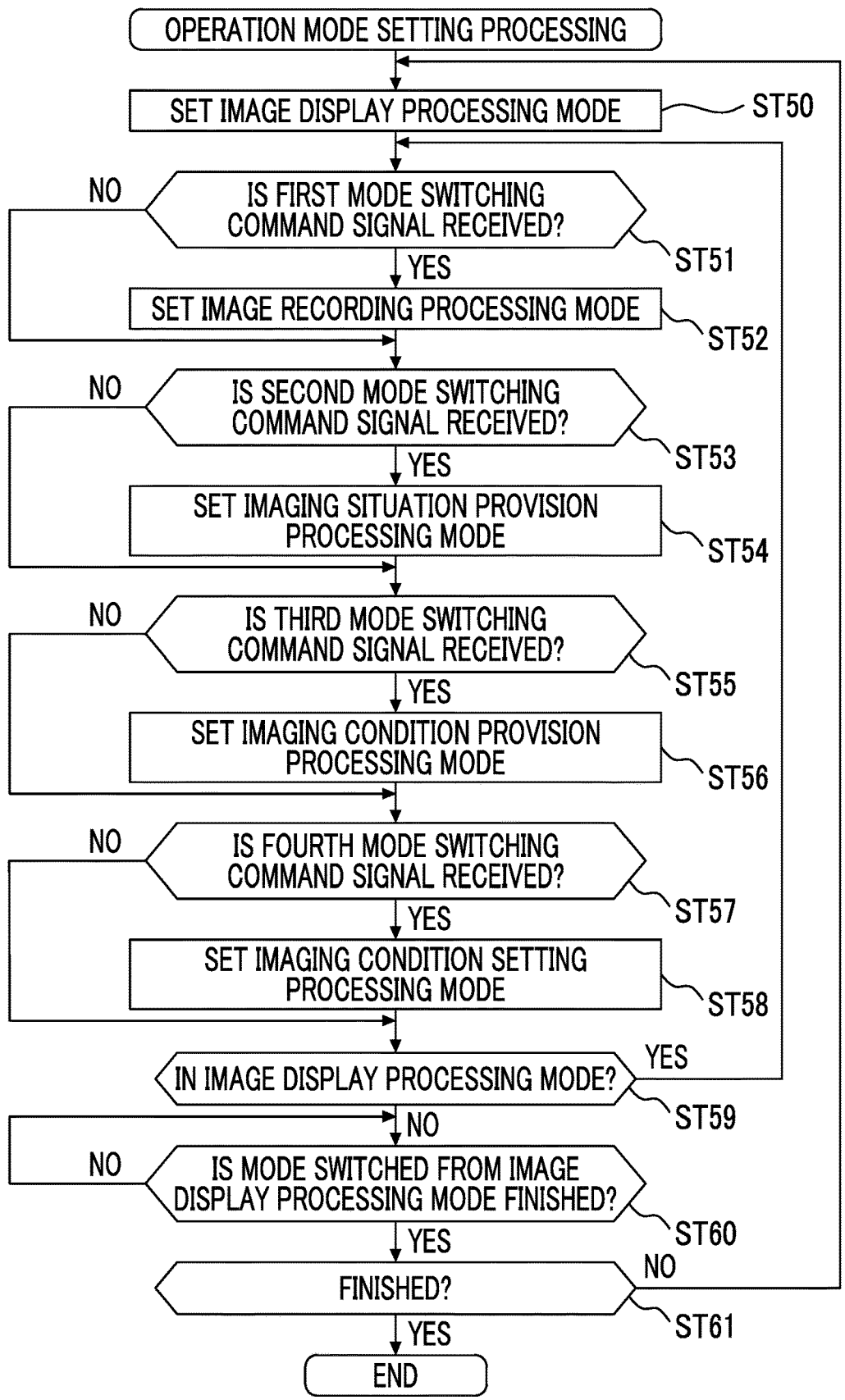
FIG. 25 is a flowchart illustrating an example of a flow of operation mode setting processing of the imaging apparatus according to the first embodiment.

In the operation mode setting processing illustrated in FIG. 25, first, in step ST50, the image display processing mode setting portion 220 sets the image display processing mode as the operation mode of the imaging apparatus 100. After the processing of step ST50 is executed, the operation mode setting processing transitions to step ST51.

In step ST51, the first mode switching determination portion 222 determines whether or not the first mode switching command signal indicating the instruction to switch the operation mode of the imaging apparatus 100 to the image recording processing mode is received by the imaging apparatus 100. In step ST51, in a case where the first mode switching command signal is received by the imaging apparatus 100, a positive determination is made, and the operation mode setting processing transitions to step ST52. In step ST51, in a case where the first mode switching command signal is not received by the imaging apparatus 100, a negative determination is made, and the operation mode setting processing transitions to step ST53.

In step ST52, the image recording processing mode setting portion 224 sets the image recording processing mode as the operation mode of the imaging apparatus 100. After the processing of step ST52 is executed, the operation mode setting processing transitions to step ST53.

In step ST53, the second mode switching determination portion 226 determines whether or not the second mode switching command signal indicating the instruction to switch the operation mode of the imaging apparatus 100 to the imaging situation provision processing mode is received by the imaging apparatus 100. In step ST53, in a case where the second mode switching command signal is received by the imaging apparatus 100, a positive determination is made, and the operation mode setting processing transitions to step ST54. In step ST53, in a case where the second mode switching command signal is not received by the imaging apparatus 100, a negative determination is made, and the operation mode setting processing transitions to step ST55.

In step ST54, the imaging situation provision processing mode setting portion 228 sets the imaging situation provision processing mode as the operation mode of the imaging apparatus 100. After the processing of step ST54 is executed, the operation mode setting processing transitions to step ST55.

In step ST55, the third mode switching determination portion 230 determines whether or not the third mode switching command signal indicating the instruction to switch the operation mode of the main imaging apparatus 100A to the imaging condition provision processing mode is received by the main imaging apparatus 100A. In step ST55, in a case where the third mode switching command signal is received by the imaging apparatus 100, a positive determination is made, and the operation mode setting processing transitions to step ST56. In step ST55, in a case where the third mode switching command signal is not received by the imaging apparatus 100, a negative determination is made, and the operation mode setting processing transitions to step ST57.

In step ST56, the imaging condition provision processing mode setting portion 232 sets the imaging condition provision processing mode as the operation mode of the main imaging apparatus 100A. After the processing of step ST56 is executed, the operation mode setting processing transitions to step ST57.

In step ST57, the fourth mode switching determination portion 234 determines whether or not the fourth mode switching command signal indicating the instruction to switch the operation mode of the sub-imaging apparatus 100B to the imaging condition setting processing mode is received by the sub-imaging apparatus 100B. In step ST57, in a case where the fourth mode switching command signal is received by the sub-imaging apparatus 100B, a positive determination is made, and the operation mode setting processing transitions to step ST58. In step ST57, in a case where the fourth mode switching command signal is not received by the sub-imaging apparatus 100B, a negative determination is made, and the operation mode setting processing transitions to step ST59.

In step ST58, the imaging condition setting processing mode setting portion 236 sets the imaging condition setting processing mode as the operation mode of the sub-imaging apparatus 100B. After the processing of step ST58 is executed, the operation mode setting processing transitions to step ST59.

In step ST59, the mode determination portion 238 determines whether or not the operation mode of the imaging apparatus 100 is the image display processing mode. In step ST59, in a case where the operation mode of the imaging apparatus 100 is not the image display processing mode, a negative determination is made, and the operation mode setting processing transitions to step ST60. In step ST59, in a case where the operation mode of the imaging apparatus 100 is the image display processing mode, a positive determination is made, and the operation mode setting processing transitions to step ST51.

In step ST60, in a case where the mode determination portion 238 determines that the operation mode of the imaging apparatus 100 is not the image display processing mode, the mode finish determination portion 240 determines whether or not the mode (as an example, the image recording processing mode, the imaging situation provision processing mode, the imaging condition provision processing mode, or the imaging condition setting processing mode) switched from the image display processing mode is finished. In step ST60, in a case where the mode switched from the image display processing mode is finished, a positive determination is made, and the operation mode setting processing transitions to step ST61. In step ST60, in a case where the mode switched from the image display processing mode is not finished, a negative determination is made, and the determination of step ST60 is performed again.

In step ST61, in a case where the mode finish determination portion 240 determines that the condition under which the mode switched from the image display processing mode is finished is established, the finish determination portion 242 determines whether or not the condition under which the operation mode setting processing is finished is established. Examples of the condition under which the operation mode setting processing is finished include the condition that the finish instruction (for example, the instruction to stop the power supply of the imaging apparatus 100) that is an instruction to finish the operation mode setting processing is received by the reception device 150. In step ST61, in a case where the condition under which the operation mode setting processing is finished is not established, a negative determination is made, and the operation mode setting processing transitions to step ST50. In step ST61, in a case where the condition under which the operation mode setting processing is finished is established, a positive determination is made, and the operation mode setting processing is finished.

Next, an example of a flow of image display processing performed by the processor 142 (refer to FIG. 16) of each imaging apparatus 100 will be described with reference to FIG. 26.

Figure 26:
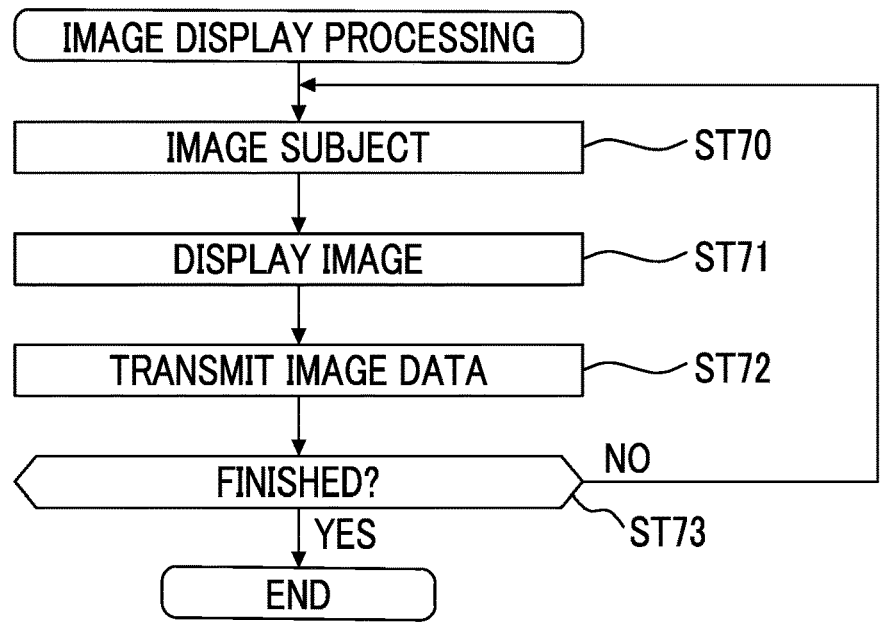
FIG. 26 is a flowchart illustrating an example of a flow of image display processing of the imaging apparatus according to the first embodiment.

In the image display processing illustrated in FIG. 26, first, in step ST70, the imaging control portion 250 causes the image sensor 112 to image the subject. After the processing of step ST70 is executed, the image display processing transitions to step ST71.

In step ST71, the image display control portion 252 displays the image on the display 149 based on the image data obtained by imaging the subject by the image sensor 112. After the processing of step ST71 is executed, the image display processing transitions to step ST72.

In step ST72, the image data transmission control portion 254 transmits the image data to the control device 10. After the processing of step ST72 is executed, the image display processing transitions to step ST73.

In step ST73, the finish determination portion 256 determines whether or not the condition under which the image display processing is finished is established. Examples of the condition under which the image display processing is finished include the condition that the first mode switching command signal, the second mode switching command signal, the third mode switching command signal, or the fourth mode switching command signal is received by the imaging apparatus 100. In step ST73, in a case where the condition under which the image display processing is finished is not established, a negative determination is made, and the image display processing transitions to step ST70. In step ST73, in a case where the condition under which the image display processing is finished is established, a positive determination is made, and the image display processing is finished.

Next, an example of a flow of image recording processing performed by the processor 142 (refer to FIG. 17) of each imaging apparatus 100 will be described with reference to FIG. 27.

Figure 27:
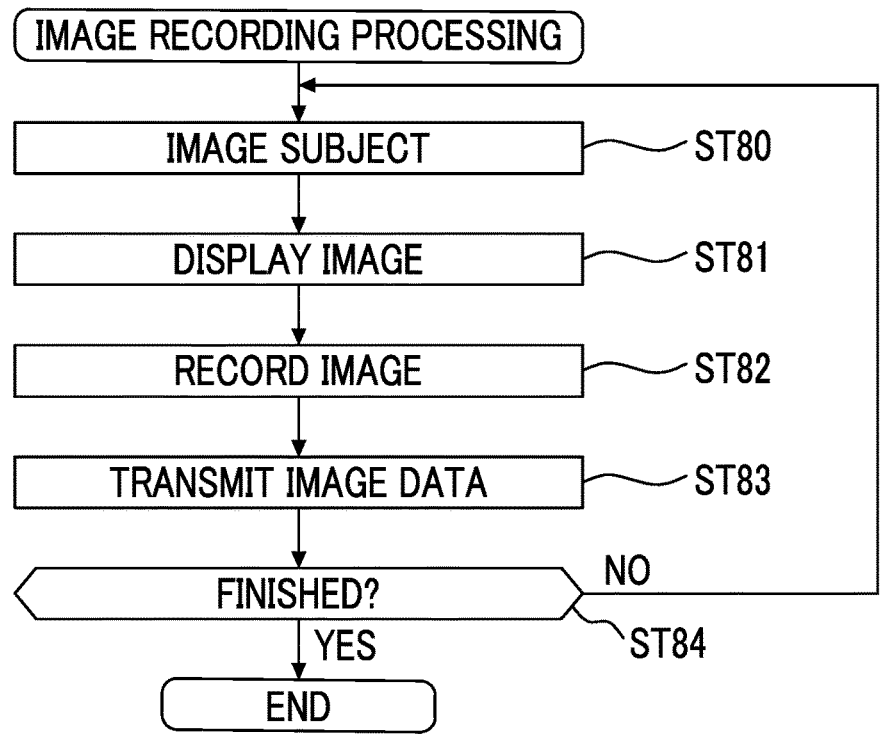
FIG. 27 is a flowchart illustrating an example of a flow of image recording processing of the imaging apparatus according to the first embodiment.

In the image recording processing illustrated in FIG. 27, first, in step ST80, the imaging control portion 260 causes the image sensor 112 to image the subject. After the processing of step ST80 is executed, the image recording processing transitions to step ST81.

In step ST81, the image display control portion 262 displays the image on the display 149 based on the image data obtained by imaging the subject by the image sensor 112. After the processing of step ST81 is executed, the image recording processing transitions to step ST82.

In step ST82, the image recording control portion 264 records the image data in the image memory 128. After the processing of step ST82 is executed, the image recording processing transitions to step ST83.

In step ST83, the image data transmission control portion 266 transmits the image data to the control device 10. After the processing of step ST83 is executed, the image recording processing transitions to step ST84.

In step ST84, the finish determination portion 268 determines whether or not the condition under which the image recording processing is finished is established. Examples of the condition under which the image recording processing is finished include the condition that the mode switching instruction that is an instruction to switch the operation mode of the imaging apparatus 100 from the image recording processing mode to the image display processing mode is received by the reception device 150 of the imaging apparatus 100. In addition, examples of the condition under which the image recording processing is finished include the condition that the second mode switching command signal, the third mode switching command signal, or the fourth mode switching command signal is received by the imaging apparatus 100. In step ST84, in a case where the condition under which the image recording processing is finished is not established, a negative determination is made, and the image recording processing transitions to step ST80. In step ST84, in a case where the condition under which the image recording processing is finished is established, a positive determination is made, and the image recording processing is finished.

Next, an example of a flow of imaging situation provision processing performed by the processor 142 (refer to FIG. 19) of each imaging apparatus 100 will be described with reference to FIG. 28.

Figure 28:
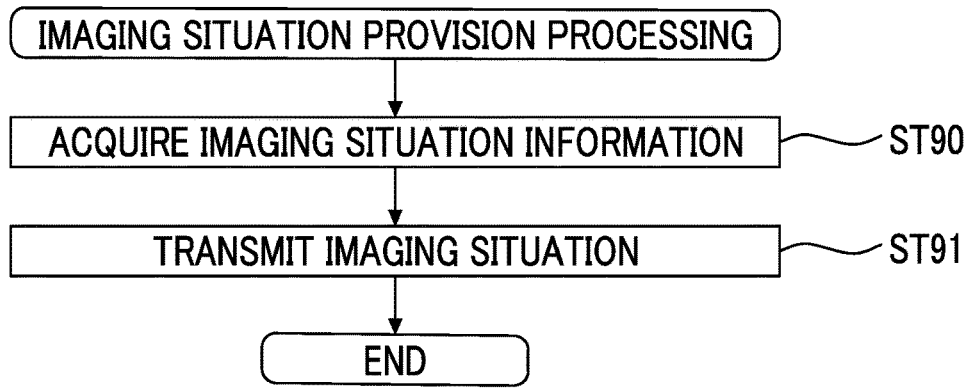
FIG. 28 is a flowchart illustrating an example of a flow of imaging situation provision processing of the imaging apparatus according to the first embodiment.

In the imaging situation provision processing illustrated in FIG. 28, first, in step ST90, the imaging situation information acquisition portion 270 acquires the imaging situation information related to the imaging situation of the imaging apparatus 100. After the processing of step ST90 is executed, the imaging situation provision processing transitions to step ST91.

In step ST91, the imaging situation information transmission control portion 272 transmits the imaging situation information related to the imaging apparatus 100 to the control device 10. After the processing of step ST91 is executed, the imaging situation provision processing is finished.

Next, an example of a flow of imaging condition provision processing performed by the processor 142 (refer to FIG. 20) of each imaging apparatus 100 will be described with reference to FIG. 29.

Figure 29:
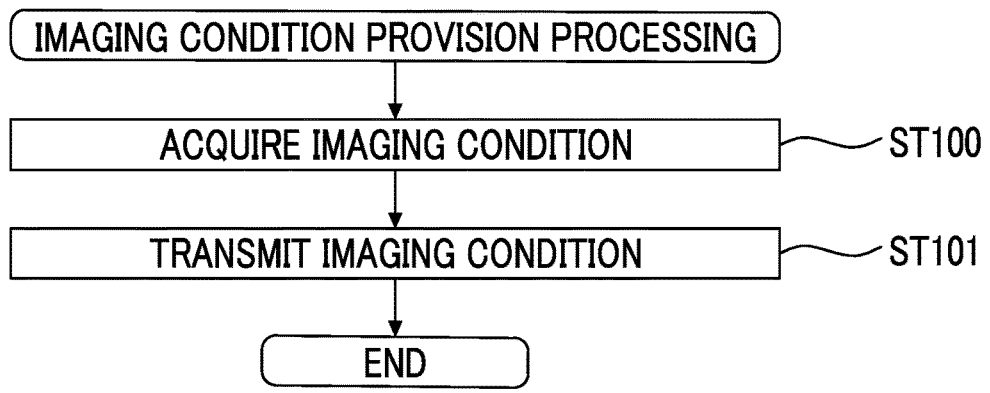
FIG. 29 is a flowchart illustrating an example of a flow of imaging condition provision processing of the imaging apparatus according to the first embodiment.

In the imaging condition provision processing illustrated in FIG. 29, first, in step ST100, the imaging condition acquisition portion 280 acquires the imaging condition of the imaging apparatus 100. After the processing of step ST100 is executed, the imaging condition provision processing transitions to step ST101.

In step ST101, the imaging condition transmission control portion 282 transmits the imaging condition of the imaging apparatus 100 to the control device 10. After the processing of step ST101 is executed, the imaging condition provision processing is finished.

Next, an example of a flow of imaging condition setting processing performed by the processor 142 (refer to FIG. 21) of each imaging apparatus 100 will be described with reference to FIG. 30.

Figure 30:
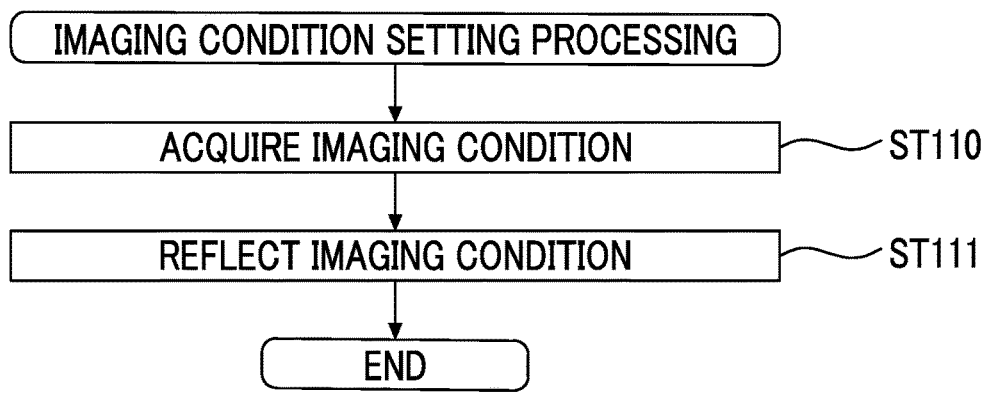
FIG. 30 is a flowchart illustrating an example of a flow of imaging condition setting processing of the imaging apparatus according to the first embodiment.

In the imaging condition setting processing illustrated in FIG. 30, first, in step ST110, the imaging condition acquisition portion 290 acquires the imaging condition to be reflected on the imaging apparatus 100. After the processing of step ST110 is executed, the imaging condition setting processing transitions to step ST111.

In step ST111, the imaging condition is set in the imaging apparatus 100 based on the imaging condition acquired by the imaging condition acquisition portion 290. After the processing of step ST111 is executed, the imaging condition setting processing is finished.

As described above, in the control device 10 according to the first embodiment, the processor 22 acquires the imaging condition set in the main imaging apparatus 100A and stores the acquired imaging condition in the storage 24. The processor 22 sets the imaging condition in the sub-imaging apparatus 100B based on the imaging condition stored in the storage 24. Accordingly, the imaging condition set in the main imaging apparatus 100A can be reflected on the imaging condition to be set in each sub-imaging apparatus 100B.

In addition, since the imaging condition set in the main imaging apparatus 100A can be reflected on the imaging condition to be set in each sub-imaging apparatus 100B, an effort of setting the imaging condition one apparatus at a time for the plurality of sub-imaging apparatuses 100B can be reduced.

In addition, the processor 22 acquires the imaging scene information that is information related to the imaging scene imaged by the sub-imaging apparatus 100B. The processor 22 selects the setting item (that is, the reflection setting item) to be applied to the sub-imaging apparatus 100B as the imaging condition from the plurality of setting items included in the imaging condition of the main imaging apparatus 100A in accordance with the imaging scene information. Accordingly, the imaging condition of the main imaging apparatus 100A can be reflected on the imaging condition to be set in the sub-imaging apparatus 100B for the setting item corresponding to the imaging scene among the plurality of setting items included in the imaging condition of the main imaging apparatus 100A.

In addition, the processor 22 acquires the imaging situation information that is information related to the imaging situation of the sub-imaging apparatus 100B. The processor 22 selects the setting item (that is, the reflection setting item) to be applied to the sub-imaging apparatus 100B as the imaging condition from the plurality of setting items included in the imaging condition of the main imaging apparatus 100A in accordance with the imaging situation information of the sub-imaging apparatus 100B. Accordingly, the imaging condition of the main imaging apparatus 100A can be reflected on the imaging condition to be set in the sub-imaging apparatus 100B for the setting item corresponding to the imaging situation of the sub-imaging apparatus 100B among the plurality of setting items included in the imaging condition of the main imaging apparatus 100A.

In addition, the imaging situation information that is information related to the imaging situation of the sub-imaging apparatus 100B includes at least any of the vibration information that is information related to the effect of vibration on the sub-imaging apparatus 100B, the external apparatus connection information that is information related to the connection situation of the external apparatus to the sub-imaging apparatus 100B, or the image recording operation information that is information related to the image recording operation of the sub-imaging apparatus 100B. Accordingly, the imaging condition of the main imaging apparatus 100A can be reflected on the imaging condition to be set in the sub-imaging apparatus 100B in accordance with the imaging situation of at least any of the effect of vibration on the sub-imaging apparatus 100B, the connection situation of the external apparatus to the sub-imaging apparatus 100B, or the image recording operation of the sub-imaging apparatus 100B.

In addition, the imaging situation information that is information related to the imaging situation of the sub-imaging apparatus 100B includes at least any of the positional information that is information related to the position of the sub-imaging apparatus 100B, the subject information that is information related to the subject corresponding to the sub-imaging apparatus 100B, the light source information that is information related to the light source corresponding to the sub-imaging apparatus 100B, the network connection information that is information related to the connection situation of the network to the sub-imaging apparatus 100B, the type information that is information related to the type of the sub-imaging apparatus 100B, the lens information that is information related to the lens unit 104 mounted in the sub-imaging apparatus 100B, the battery information that is information related to the battery 162 mounted in the sub-imaging apparatus 100B, or the temperature information that is information related to the temperature of the sub-imaging apparatus 100B. Accordingly, the imaging condition of the main imaging apparatus 100A can be reflected on the imaging condition to be set in the sub-imaging apparatus 100B in accordance with the position of the sub-imaging apparatus 100B, the subject corresponding to the sub-imaging apparatus 100B, the light source corresponding to the sub-imaging apparatus 100B, the connection situation of the network to the sub-imaging apparatus 100B, the type of the sub-imaging apparatus 100B, the lens unit 104 mounted in the sub-imaging apparatus 100B, the battery 162 mounted in the sub-imaging apparatus 100B, and the temperature of the sub-imaging apparatus 100B.

In addition, the processor 22 may acquire the imaging situation information that is information related to the imaging situation of the main imaging apparatus 100A, and select the setting item (that is, the reflection setting item) to be applied to the sub-imaging apparatus 100B as the imaging condition from the plurality of setting items included in the imaging condition of the main imaging apparatus 100A in accordance with the imaging situation information of the main imaging apparatus 100A. In this case, the imaging condition of the main imaging apparatus 100A can be reflected on the imaging condition to be set in the sub-imaging apparatus 100B in accordance with the imaging situation of the main imaging apparatus 100A.

In addition, in a case where the imaging situation of the sub-imaging apparatus 100B is changed, the processor 22 switches the operation mode of the control device 10 from the imaging control processing mode to the imaging condition setting processing mode. The processor 22 acquires the imaging situation information of the sub-imaging apparatus 100B in the imaging condition setting processing. Accordingly, for example, a response for acquiring the imaging situation information of the sub-imaging apparatus 100B and a response for reflecting the imaging condition of the main imaging apparatus 100A on the imaging condition to be set in the sub-imaging apparatus 100B can be improved, compared to a case where the operation mode of the control device 10 is switched from the imaging control processing mode to the imaging condition setting processing mode in a case where the mode switching instruction is received by the reception device 14.

In addition, in a case where the imaging condition set in the main imaging apparatus 100A and/or the imaging situation of the main imaging apparatus 100A is changed, the processor 22 switches the operation mode of the control device 10 from the imaging control processing mode to the imaging condition setting processing mode. The processor 22 acquires the imaging condition of the main imaging apparatus 100A in the imaging condition setting processing. Accordingly, for example, a response for acquiring the imaging condition of the main imaging apparatus 100A and a response for reflecting the imaging condition of the main imaging apparatus 100A on the imaging condition to be set in the sub-imaging apparatus 100B can be improved, compared to a case where the operation mode of the control device 10 is switched from the imaging control processing mode to the imaging condition setting processing mode in a case where the mode switching instruction is received by the reception device 14.

In addition, the processor 22 may acquire only the information set for the setting item (that is, the reflection setting item) to be applied to the sub-imaging apparatus 100B as the imaging condition among the plurality of setting items included in the imaging condition of the main imaging apparatus 100A. In this case, for example, the processor 22 can implement reduction of a used capacity of the storage 24 and/or the RAM 26, reduction of power consumption, and/or improvement in processing speed, compared to a case of extracting the information set for the reflection setting item to be applied to the sub-imaging apparatus 100B after acquiring all information set for the plurality of reflection setting items.

In the first embodiment, the processor 22 acquires the imaging condition set in the main imaging apparatus 100A and stores the acquired imaging condition in the storage 24. The imaging condition is set in the sub-imaging apparatus 100B based on the imaging condition stored in the storage 24. However, the processor 22 may set the imaging condition in the sub-imaging apparatus 100B based on the imaging condition stored in advance in the storage 24. In this case, the imaging condition set in advance in the storage 24 can be reflected on the imaging condition to be set in each sub-imaging apparatus 100B. The imaging condition stored in advance in the storage 24 is an example of a "second imaging condition" according to the embodiment of the disclosed technology.

In addition, the imaging condition stored in advance in the storage 24 may be an imaging condition set based on the imaging condition set in the main imaging apparatus 100A. In this case, the imaging condition set in the main imaging apparatus 100A can be reflected on the imaging condition to be set in each sub-imaging apparatus 100B.

In addition, the imaging condition stored in advance in the storage 24 may be set for each imaging situation of the main imaging apparatus 100A and/or the sub-imaging apparatus 100B. The processor 22 may acquire the imaging condition from the storage 24 in accordance with the imaging situation of the main imaging apparatus 100A and/or the sub-imaging apparatus 100B.

In addition, the processor 22 may select the setting item (that is, the reflection setting item) to be applied to the sub-imaging apparatus 100B as the imaging condition from the plurality of setting items included in the imaging condition stored in advance in the storage 24 in accordance with the imaging scene information. In this case, the imaging condition stored in advance in the storage 24 can be reflected on the imaging condition to be set in the sub-imaging apparatus 100B for the setting item corresponding to the imaging scene among the plurality of setting items included in the imaging condition stored in advance in the storage 24. Each of the plurality of setting items included in the imaging condition stored in advance in the storage 24 is an example of a "third setting item" according to the embodiment of the disclosed technology.

In addition, the plurality of setting items (that is, the reflection setting items) included in the imaging condition stored in advance in the storage 24 may be set in accordance with the imaging scene of the sub-imaging apparatus 100B. In this case, the imaging condition stored in advance in the storage 24 can be reflected on the imaging condition to be set in the sub-imaging apparatus 100B for the setting item corresponding to the imaging scene among the plurality of setting items included in the imaging condition stored in advance in the storage 24.

In addition, the processor 22 may select the setting item (that is, the reflection setting item) to be applied to the sub-imaging apparatus 100B as the imaging condition from the plurality of setting items included in the imaging condition stored in advance in the storage 24 in accordance with the imaging situation information of the sub-imaging apparatus 100B. In this case, the imaging condition stored in advance in the storage 24 can be reflected on the imaging condition to be set in the sub-imaging apparatus 100B for the setting item corresponding to the imaging situation of the sub-imaging apparatus 100B among the plurality of setting items included in the imaging condition stored in advance in the storage 24.

Second Embodiment

Next, a second embodiment of the disclosed technology will be described.

Figure 31:
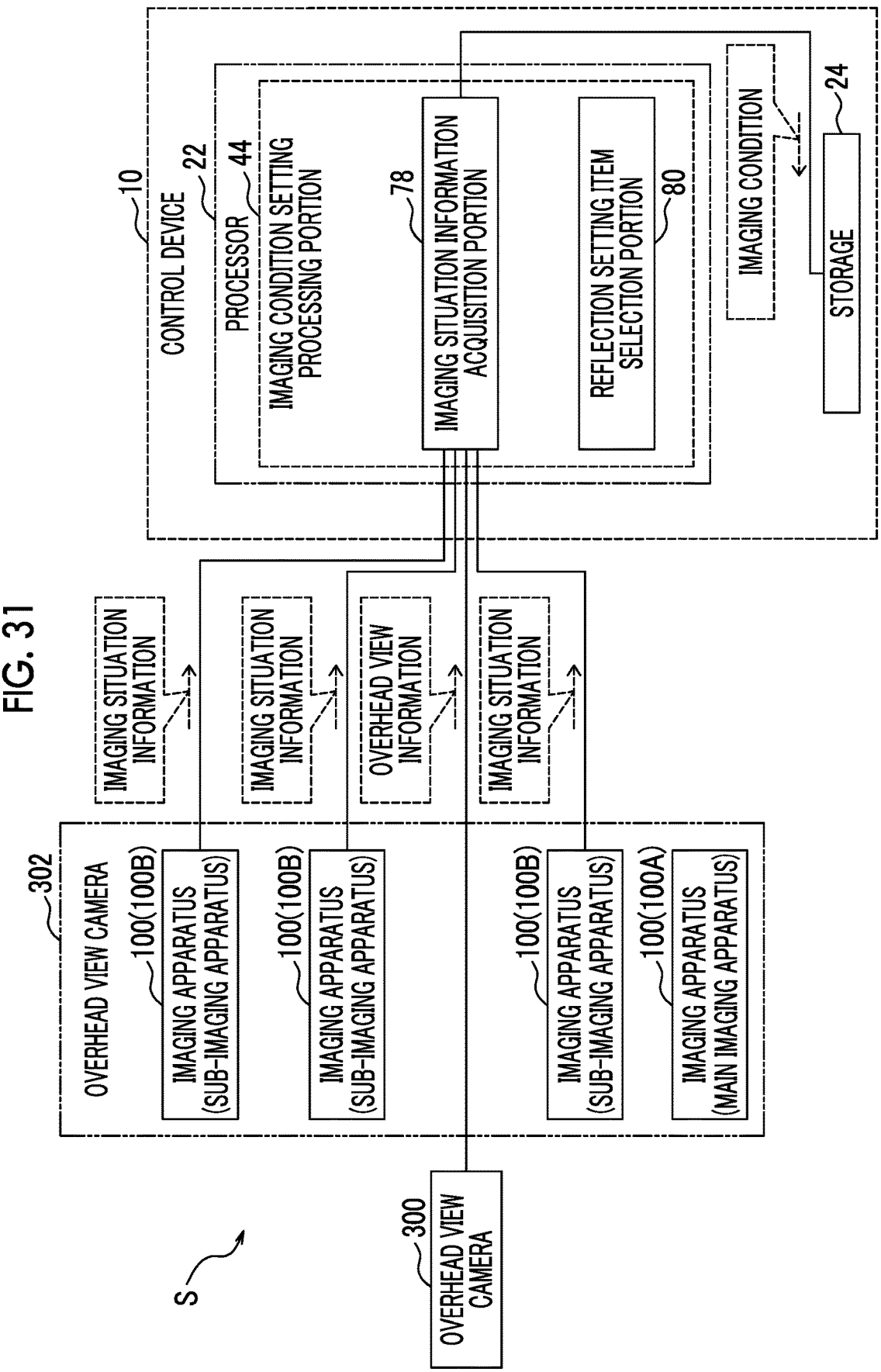
FIG. 31 is a block diagram for describing an example of an imaging system according to a second embodiment.

As illustrated in FIG. 31 as an example, in the second embodiment, a configuration of the imaging system S is changed as follows from the first embodiment.

That is, the imaging system S comprises an overhead view camera 300. The overhead view camera 300 is arranged at a position at which all of the plurality of imaging apparatuses 100 can be imaged. The overhead view camera 300 transmits image data obtained by imaging an entire imaging environment 302 including the plurality of imaging apparatuses 100 to the control device 10 as overhead view information. The overhead view information corresponds to the imaging situation information related to the imaging situation of each of the plurality of imaging apparatuses 100. The overhead view information as the imaging situation information includes imaging environment information related to the imaging environment 302 including the plurality of imaging apparatuses 100, positional relationship information related to a positional relationship between the plurality of sub-imaging apparatuses 100B and the main imaging apparatus 100A, and installation state information related to an installation state of each imaging apparatus 100.

In the imaging condition setting processing portion 44 of the control device 10, the imaging situation information acquisition portion 78 acquires the overhead view information in addition to the imaging situation information related to the imaging situation of each sub-imaging apparatus 100B. By acquiring the overhead view information by the imaging situation information acquisition portion 78, image information that is information based on the image obtained by imaging performed by the overhead view camera 300 is obtained. The overhead view camera 300 is an example of a "third imaging apparatus" according to the embodiment of the disclosed technology. The overhead view information is an example of the "first imaging situation information" according to the embodiment of the disclosed technology. The installation state information included in the overhead view information is an example of "first installation state information" according to the embodiment of the disclosed technology. The image information as the overhead view information is an example of "first image information" according to the embodiment of the disclosed technology.

The imaging situation information may include information related to the imaging situation of the sub-imaging apparatus 100B other than the vibration information, the external apparatus connection information, the image recording operation information, the positional information, the subject information, the light source information, the network connection information, the type information, the lens information, the battery information, the temperature information, and the overhead view information. In addition, the imaging situation information may include information related to the imaging situation of the main imaging apparatus 100A. The type of imaging situation of the main imaging apparatus 100A may be the same as the type of imaging situation of the sub-imaging apparatus 100B. In addition, the imaging situation information may not include at least any of the vibration information, the external apparatus connection information, the image recording operation information, the positional information, the subject information, the light source information, the network connection information, the type information, the lens information, the battery information, or the temperature information.

In addition, the overhead view information may include information other than the imaging environment information, the positional relationship information, and the installation state information. In addition, the overhead view information may not include at least any of the imaging environment information, the positional relationship information, or the installation state information.

As in the first embodiment, the reflection setting item selection portion 80 selects the reflection setting item to be applied to the sub-imaging apparatus 100B of the number n as the imaging condition from the plurality of setting items included in the imaging condition of the main imaging apparatus 100A in accordance with the preset information and/or the imaging situation information.

As described above, in the second embodiment, the imaging situation information includes the overhead view information obtained by imaging the entire imaging environment 302 including the plurality of imaging apparatuses 100. Accordingly, the imaging condition of the main imaging apparatus 100A can be reflected on the imaging condition to be set in the sub-imaging apparatus 100B in accordance with the imaging environment 302 including the plurality of imaging apparatuses 100.

Third Embodiment

Next, a third embodiment of the disclosed technology will be described.

Figure 32:
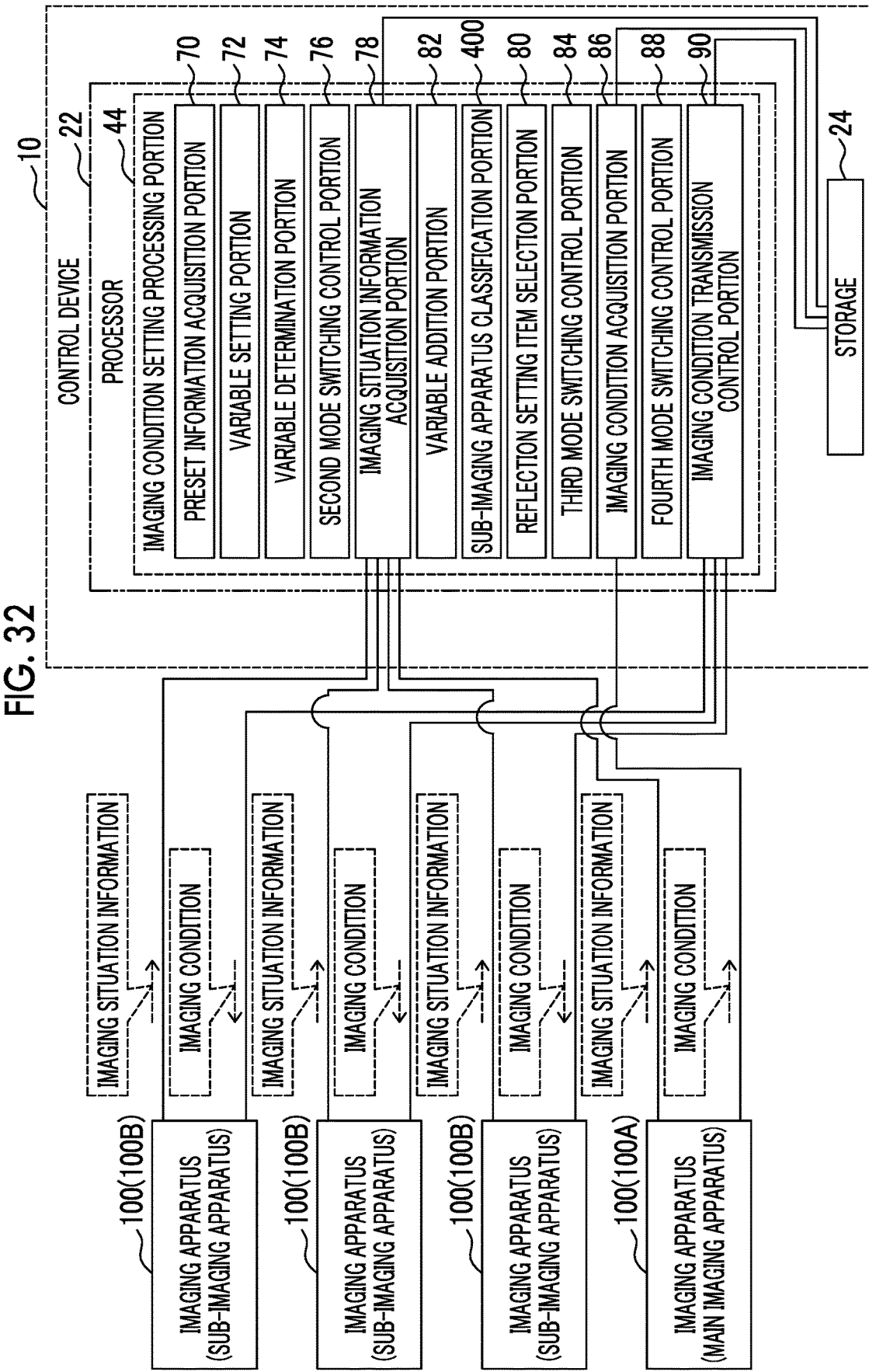
FIG. 32 is a block diagram illustrating an example of a configuration of an imaging condition setting processing portion of a control device according to a third embodiment.

As illustrated in FIG. 32 as an example, in the third embodiment, a configuration of the imaging condition setting processing portion 44 of the control device 10 is changed as follows from the first embodiment.

That is, the imaging condition setting processing portion 44 includes a sub-imaging apparatus classification portion 400 in addition to the preset information acquisition portion 70, the variable setting portion 72, the variable determination portion 74, the second mode switching control portion 76, the imaging situation information acquisition portion 78, the variable addition portion 82, the reflection setting item selection portion 80, the third mode switching control portion 84, the imaging condition acquisition portion 86, the fourth mode switching control portion 88, and the imaging condition transmission control portion 90.

Configurations of the preset information acquisition portion 70, the third mode switching control portion 84, the imaging condition acquisition portion 86, and the fourth mode switching control portion 88 are the same as in the first embodiment.

The variable setting portion 72 sets m (hereinafter, referred to as the variable m) that represents a variable set for the plurality of imaging apparatuses 100 to 1. The variable determination portion 74 determines whether or not the variable m is less than or equal to M (hereinafter, referred to as the number M) that represents the number of the plurality of imaging apparatuses 100. In this case, the plurality of imaging apparatuses 100 include the main imaging apparatus 100A and the plurality of sub-imaging apparatuses 100B.

The second mode switching control portion 76 transmits the second mode switching command signal indicating the instruction to switch the operation mode of the imaging apparatus 100 to which a number corresponding to the variable m is assigned (hereinafter, referred to as the imaging apparatus 100 of the number m) to the imaging situation provision processing mode, to the imaging apparatus 100 of the number m.

The imaging situation information acquisition portion 78 acquires the imaging situation information related to the imaging situation of the imaging apparatus 100 of the number m. In this case, as in the first embodiment, the imaging situation information includes at least any of the vibration information, the external apparatus connection information, the image recording operation information, the positional information, the subject information, the light source information, the network connection information, the type information, the lens information, the battery information, or the temperature information. As in the second embodiment, the overhead view information obtained by the overhead view camera 300 (refer to FIG. 31) may be included in the imaging situation information.

The sub-imaging apparatus classification portion 400 classifies the plurality of imaging apparatuses 100 into two or more groups based on the imaging situation information acquired for each of the plurality of imaging apparatuses 100. Accordingly, the plurality of imaging apparatuses 100 are classified into two or more groups in accordance with the imaging environment, the imaging situation, and/or a timing or the like of each of the plurality of imaging apparatuses 100.

In a case where the number of the plurality of imaging apparatuses 100 is greater than or equal to a predetermined number, the imaging condition setting processing portion 44 classifies the plurality of imaging apparatuses 100 into two or more groups. For example, the predetermined number is set to a number with which setting the imaging condition for each group is more efficient than setting the imaging condition for each of the plurality of sub-imaging apparatuses 100B.

The reflection setting item selection portion 80 selects the reflection setting item to be applied to each group as the imaging condition from the plurality of setting items included in the imaging condition of the main imaging apparatus 100A in accordance with the preset information and/or the imaging situation information.

The imaging condition transmission control portion 90 transmits the imaging condition of the main imaging apparatus 100A to the sub-imaging apparatus 100B of each group based on the reflection setting item selected by the reflection setting item selection portion 80 for each group. That is, the imaging condition transmission control portion 90 transmits the imaging condition (that is, the information set for the reflection setting item selected by the reflection setting item selection portion 80) to be reflected for each group to the sub-imaging apparatus 100B of each group as the imaging condition information.

The imaging situation information is an example of "second imaging situation information" according to the embodiment of the disclosed technology. The imaging condition is an example of a "fourth imaging condition" according to the embodiment of the disclosed technology. The vibration information is an example of "second vibration information" according to the embodiment of the disclosed technology. The external apparatus connection information is an example of "second external apparatus connection information" according to the embodiment of the disclosed technology. The image recording operation information is an example of "second image recording operation information" according to the embodiment of the disclosed technology. The positional information is an example of "second positional information" according to the embodiment of the disclosed technology. The subject information is an example of "second subject information" according to the embodiment of the disclosed technology. The light source information is an example of "second light source information" according to the embodiment of the disclosed technology. The network connection information is an example of "second network connection information" according to the embodiment of the disclosed technology. The type information is an example of "second type information" according to the embodiment of the disclosed technology. The lens information is an example of "second lens information" according to the embodiment of the disclosed technology. The battery information is an example of "second battery information" according to the embodiment of the disclosed technology. The temperature information is an example of "second temperature information" according to the embodiment of the disclosed technology. The overhead view camera 300 is an example of a "fourth imaging apparatus" according to the embodiment of the disclosed technology. The overhead view information is an example of the "second imaging situation information" according to the embodiment of the disclosed technology. The installation state information included in the overhead view information is an example of "second installation state information" according to the embodiment of the disclosed technology. The image information as the overhead view information is an example of "second image information" according to the embodiment of the disclosed technology.

The imaging situation information may include information related to the imaging situation of the imaging apparatus 100 other than the vibration information, the external apparatus connection information, the image recording operation information, the positional information, the subject information, the light source information, the network connection information, the type information, the lens information, the battery information, the temperature information, and the overhead view information. In addition, the imaging situation information may not include at least any of the vibration information, the external apparatus connection information, the image recording operation information, the positional information, the subject information, the light source information, the network connection information, the type information, the lens information, the battery information, the temperature information, or the overhead view information.

Next, an example of a flow of imaging condition setting processing performed by the processor 22 (refer to FIG. 32) of the control device 10 will be described with reference to FIG. 33 as an action of the control device 10 according to the third embodiment.

Figure 33:
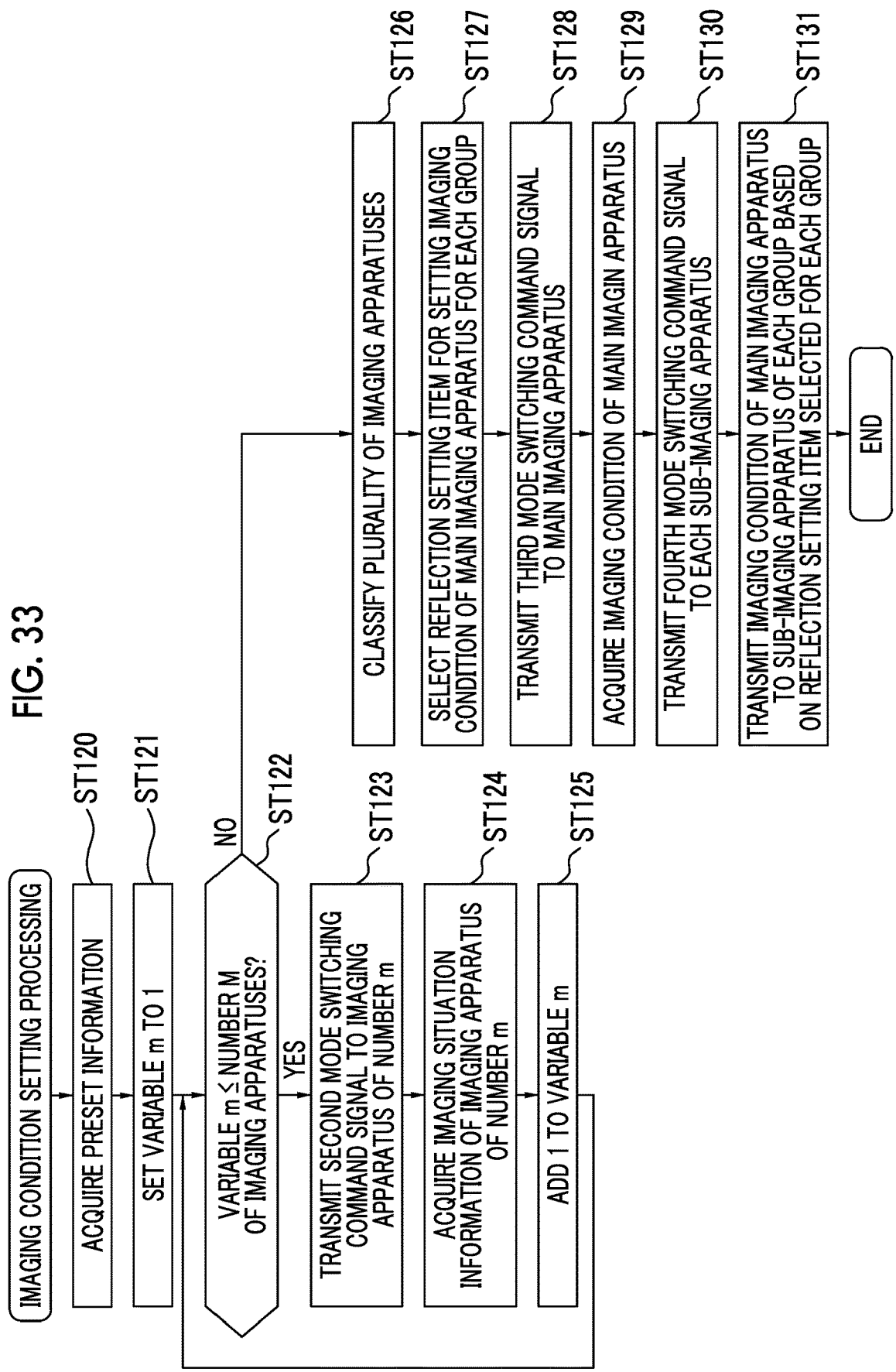
FIG. 33 is a flowchart illustrating an example of a flow of imaging condition setting processing of the control device according to the third embodiment.

In the imaging condition setting processing illustrated in FIG. 33, first, in step ST120, the preset information acquisition portion 70 acquires the preset information set in the control device 10. After the processing of step ST120 is executed, the imaging condition setting processing transitions to step ST121.

In step ST121, the variable setting portion 72 sets the variable m set for the plurality of imaging apparatuses 100 to 1. After the processing of step ST121 is executed, the imaging condition setting processing transitions to step ST122.

In step ST122, the variable determination portion 74 determines whether or not the variable m is less than or equal to the number M of the plurality of imaging apparatuses 100. In step ST122, in a case where the variable m is less than or equal to the number M of the plurality of imaging apparatuses 100, a positive determination is made, and the imaging condition setting processing transitions to step ST123. In step ST122, in a case where the variable m exceeds the number M of the plurality of imaging apparatuses 100, a negative determination is made, and the imaging condition setting processing transitions to step ST126.

In step ST123, the second mode switching control portion 76 transmits the second mode switching command signal indicating the instruction to switch the operation mode of the imaging apparatus 100 of the number m to the imaging situation provision processing mode, to the imaging apparatus 100 of the number m. After the processing of step ST123 is executed, the imaging condition setting processing transitions to step ST124.

In step ST124, the imaging situation information acquisition portion 78 acquires the imaging situation information related to the imaging situation of the imaging apparatus 100 of the number m corresponding to the variable m. After the processing of step ST124 is executed, the imaging condition setting processing transitions to step ST125.

In step ST125, the variable addition portion 82 adds 1 to the variable m. After the processing of step ST125 is executed, the imaging condition setting processing transitions to step ST122.

In step ST126, the sub-imaging apparatus classification portion 400 classifies the plurality of imaging apparatuses 100 into two or more groups based on the imaging situation information acquired for each of the plurality of imaging apparatuses 100. After the processing of step ST126 is executed, the imaging condition setting processing transitions to step ST127.

In step ST127, the reflection setting item selection portion 80 selects the reflection setting item to be applied to each group as the imaging condition from the plurality of setting items included in the imaging condition of the main imaging apparatus 100A in accordance with the preset information and/or the imaging situation information. After the processing of step ST127 is executed, the imaging condition setting processing transitions to step ST128.

In step ST128, the third mode switching control portion 84 transmits the third mode switching command signal indicating the instruction to switch the operation mode of the main imaging apparatus 100A to the imaging condition provision processing mode, to the main imaging apparatus 100A. After the processing of step ST128 is executed, the imaging condition setting processing transitions to step ST129.

In step ST129, the imaging condition acquisition portion 86 acquires the imaging condition of the main imaging apparatus 100A. After the processing of step ST129 is executed, the imaging condition setting processing transitions to step ST130.

In step ST130, the fourth mode switching control portion 88 transmits the fourth mode switching command signal indicating the instruction to switch the operation mode of the sub-imaging apparatus 100B to the imaging condition setting processing mode, to each sub-imaging apparatus 100B. After the processing of step ST130 is executed, the imaging condition setting processing transitions to step ST131.

In step ST131, the imaging condition transmission control portion 90 transmits the imaging condition of the main imaging apparatus 100A to the sub-imaging apparatus 100B of each group based on the reflection setting item selected by the reflection setting item selection portion 80 for each group. After the processing of step ST131 is executed, the imaging condition setting processing is finished.

The control method described as the action of the control device 10 is an example of the "control method" according to the embodiment of the disclosed technology.

As described above, in the control device 10 according to the third embodiment, the processor 22 acquires the imaging situation information that is information related to the imaging situation of each of the plurality of imaging apparatuses 100, and classifies the plurality of imaging apparatuses 100 into two or more groups based on the imaging situation information. The processor 22 sets the imaging condition for each group. Accordingly, for example, the imaging condition can be efficiently set in the plurality of sub-imaging apparatuses 100B, compared to a case of setting the imaging condition for each of the plurality of sub-imaging apparatuses 100B.

Fourth Embodiment

Next, a fourth embodiment of the disclosed technology will be described.

Figure 34:
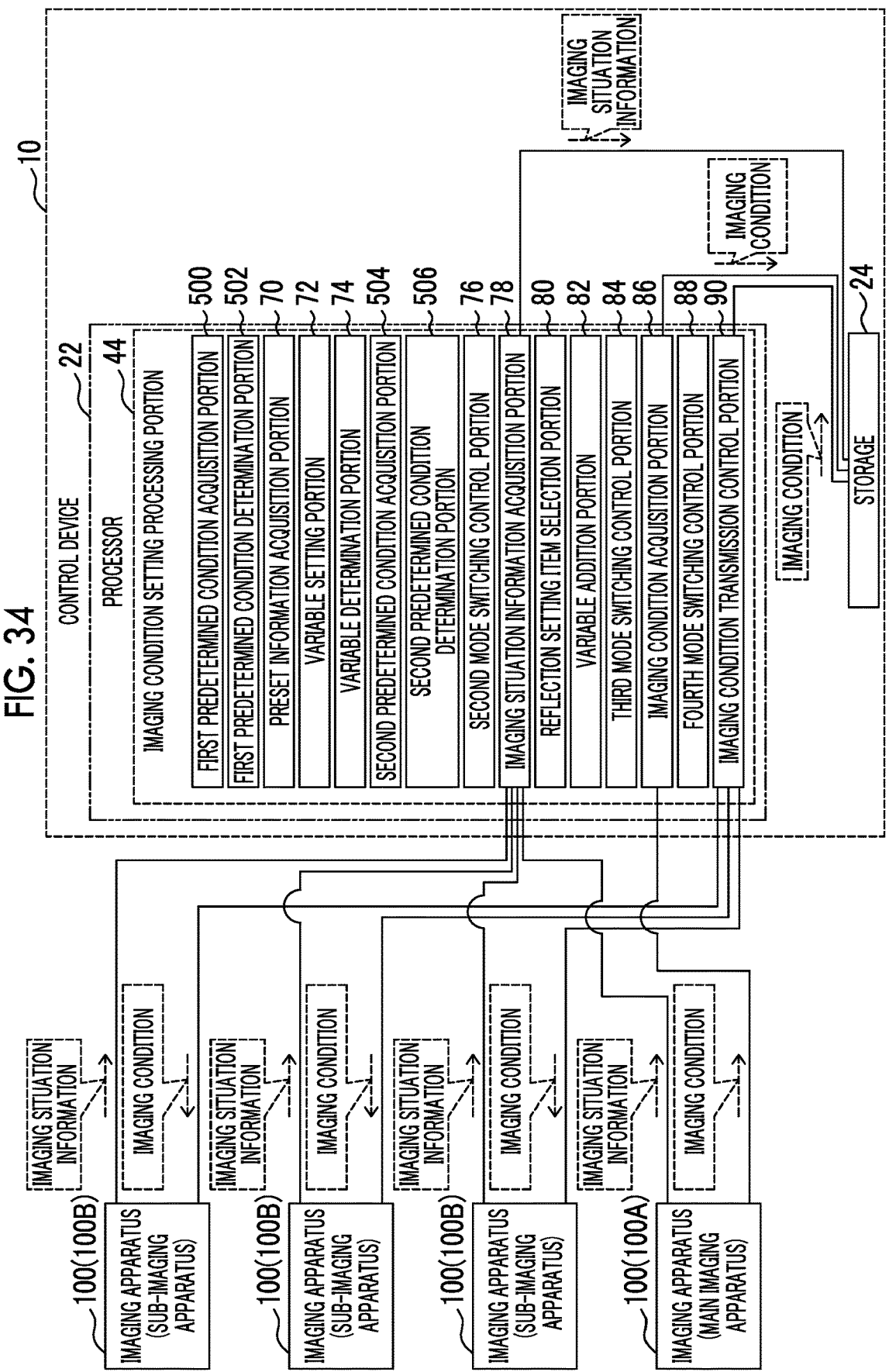
FIG. 34 is a block diagram illustrating an example of a configuration of an imaging condition setting processing portion of a control device according to a fourth embodiment.

As illustrated in FIG. 34 as an example, in the fourth embodiment, the configuration of the imaging condition setting processing portion 44 of the control device 10 is changed as follows from the first embodiment.

That is, the imaging condition setting processing portion 44 includes a first predetermined condition acquisition portion 500, a first predetermined condition determination portion 502, a second predetermined condition acquisition portion 504, and a second predetermined condition determination portion 506 in addition to the preset information acquisition portion 70, the variable setting portion 72, the variable determination portion 74, the second mode switching control portion 76, the imaging situation information acquisition portion 78, the reflection setting item selection portion 80, the variable addition portion 82, the third mode switching control portion 84, the imaging condition acquisition portion 86, the fourth mode switching control portion 88, and the imaging condition transmission control portion 90.

Configurations of the preset information acquisition portion 70, the variable setting portion 72, the variable determination portion 74, the second mode switching control portion 76, the imaging situation information acquisition portion 78, the reflection setting item selection portion 80, the variable addition portion 82, the third mode switching control portion 84, the imaging condition acquisition portion 86, and the fourth mode switching control portion 88 are the same as in the first embodiment.

The first predetermined condition acquisition portion 500 acquires first information that is information related to the main imaging apparatus 100A. Examples of the first information include the imaging environment information related to the imaging environment of the main imaging apparatus 100A, the imaging condition information related to the imaging condition of the main imaging apparatus 100A, and the imaging situation information related to the imaging situation of the main imaging apparatus 100A. The first information is an example of "first information" according to the embodiment of the disclosed technology.

The first predetermined condition determination portion 502 determines whether or not the first information satisfies a first predetermined condition. The first predetermined condition is a condition that prohibits the imaging condition of the main imaging apparatus 100A from being reflected as the imaging condition of the sub-imaging apparatus 100B. For example, the first predetermined condition is set to a condition that is not appropriate for reflecting the imaging condition of the main imaging apparatus 100A as the imaging condition of the sub-imaging apparatus 100B with respect to information of at least any of the imaging environment information, the imaging condition information, or the imaging situation information related to the main imaging apparatus 100A. The first predetermined condition is an example of a "predetermined condition" according to the embodiment of the disclosed technology.

In a case where the first information that is information related to the main imaging apparatus 100A satisfies the first predetermined condition, the imaging condition setting processing portion 44 finishes the imaging condition setting processing.

The second predetermined condition acquisition portion 504 acquires second information that is information related to the sub-imaging apparatus 100B. Examples of the second information include the imaging environment information related to the imaging environment of each sub-imaging apparatus 100B, the imaging condition information related to the imaging condition of each sub-imaging apparatus 100B, and the imaging situation information related to the imaging situation of each sub-imaging apparatus 100B. The second information is an example of "second information" according to the embodiment of the disclosed technology.

The second predetermined condition determination portion 506 determines whether or not the second information satisfies a second predetermined condition. The second predetermined condition is a condition that prohibits the imaging condition of the main imaging apparatus 100A from being reflected as the imaging condition of the sub-imaging apparatus 100B. For example, the second predetermined condition is set to a condition that is not appropriate for reflecting the imaging condition of the main imaging apparatus 100A as the imaging condition of the sub-imaging apparatus 100B with respect to information of at least any of the imaging environment information, the imaging condition information, or the imaging situation information related to each sub-imaging apparatus 100B. The second predetermined condition is an example of the "predetermined condition" according to the embodiment of the disclosed technology.

The imaging condition transmission control portion 90 transmits the imaging condition of the main imaging apparatus 100A to each sub-imaging apparatus 100B based on the reflection setting item selected for the sub-imaging apparatus 100B for which the second information does not satisfy the second predetermined condition. That is, the imaging condition transmission control portion 90 acquires the imaging condition (that is, the information set for the reflection setting item selected by the reflection setting item selection portion 80) to be reflected on the sub-imaging apparatus 100B for which the second information does not satisfy the second predetermined condition, from the imaging condition stored in the storage 24. The imaging condition transmission control portion 90 transmits the acquired imaging condition as the imaging condition information to the sub-imaging apparatus 100B for which the second information does not satisfy the second predetermined condition.

Accordingly, in a case where the first information that is information related to the main imaging apparatus 100A does not satisfy the first predetermined condition, the imaging condition of the main imaging apparatus 100A is set for the sub-imaging apparatus 100B for which the second information does not satisfy the second predetermined condition based on the reflection setting item, and the setting of the imaging condition of the main imaging apparatus 100A is prohibited for the sub-imaging apparatus 100B for which the second information satisfies the second predetermined condition.

Next, an example of a flow of imaging condition setting processing performed by the processor 22 (refer to FIG. 34) of the control device 10 will be described with reference to FIG. 35 as an action of the control device 10 according to the fourth embodiment.

Figure 35:
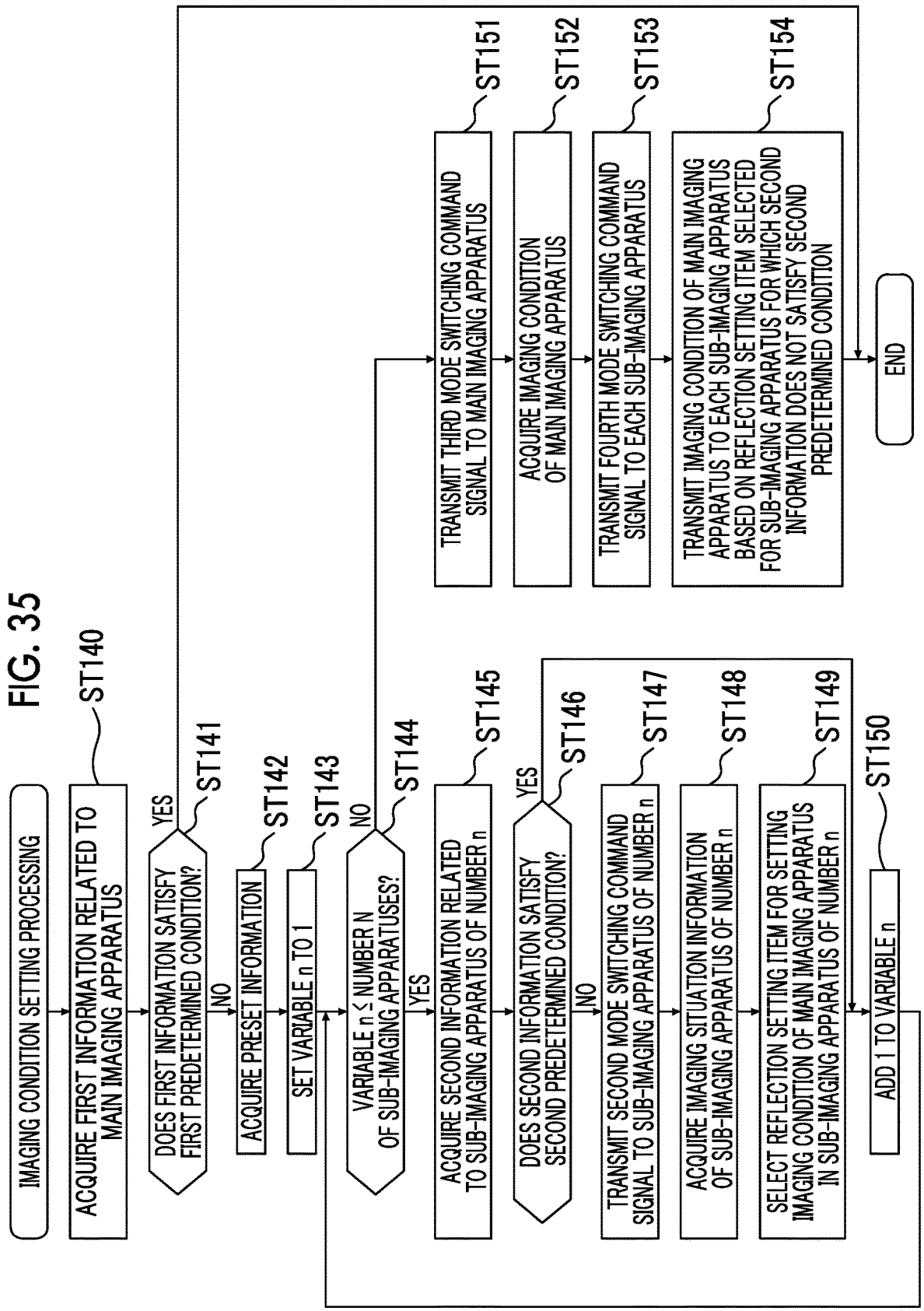
FIG. 35 is a flowchart illustrating an example of a flow of imaging condition setting processing of the control device according to the fourth embodiment.

In the imaging condition setting processing illustrated in FIG. 35, first, in step ST140, the first predetermined condition acquisition portion 500 acquires the first information that is information related to the main imaging apparatus 100A. After the processing of step ST140 is executed, the imaging condition setting processing transitions to step ST141.

In step ST141, the first predetermined condition determination portion 502 determines whether or not the first information satisfies the first predetermined condition. In step ST141, in a case where the first information satisfies the first predetermined condition, a positive determination is made, and the imaging condition setting processing is finished. That is, the setting of the imaging condition for all sub-imaging apparatuses 100B is prohibited. In step ST141, in a case where the first information does not satisfy the first predetermined condition, a negative determination is made, and the imaging condition setting processing transitions to step ST142.

In step ST142, the preset information acquisition portion 70 acquires the preset information set in the control device 10. After the processing of step ST142 is executed, the imaging condition setting processing transitions to step ST143.

In step ST143, the variable setting portion 72 sets the variable n set for the plurality of sub-imaging apparatuses 100B to 1. After the processing of step ST143 is executed, the imaging condition setting processing transitions to step ST144.

In step ST144, the variable determination portion 74 determines whether or not the variable n is less than or equal to the number N of the plurality of sub-imaging apparatuses 100B. In step ST144, in a case where the variable n is less than or equal to the number N of the plurality of sub-imaging apparatuses 100B, a positive determination is made, and the imaging condition setting processing transitions to step ST145. In step ST144, in a case where the variable n exceeds the number N of the plurality of sub-imaging apparatuses 100B, a negative determination is made, and the imaging condition setting processing transitions to step ST151.

In step ST145, the second predetermined condition acquisition portion 504 acquires the second information that is information related to the sub-imaging apparatus 100B. After the processing of step ST145 is executed, the imaging condition setting processing transitions to step ST146.

In step ST146, the second predetermined condition determination portion 506 determines whether or not the second information satisfies the second predetermined condition. In step ST146, in a case where the second information satisfies the second predetermined condition, a positive determination is made, and the imaging condition setting processing transitions to step ST150. In step ST146, in a case where the second information does not satisfy the second predetermined condition, a negative determination is made, and the imaging condition setting processing transitions to step ST147.

In step ST147, the second mode switching control portion 76 transmits the second mode switching command signal indicating the instruction to switch the operation mode of the sub-imaging apparatus 100B of the number n to the imaging situation provision processing mode, to the sub-imaging apparatus 100B of the number n. After the processing of step ST147 is executed, the imaging condition setting processing transitions to step ST148.

In step ST148, the imaging situation information acquisition portion 78 acquires the imaging situation information related to the imaging situation of the sub-imaging apparatus 100B of the number n corresponding to the variable n. After the processing of step ST148 is executed, the imaging condition setting processing transitions to step ST149.

In step ST149, the reflection setting item selection portion 80 selects the reflection setting item to be applied to the sub-imaging apparatus 100B of the number n as the imaging condition from the plurality of setting items included in the imaging condition of the main imaging apparatus 100A in accordance with the preset information and/or the imaging situation information. After the processing of step ST149 is executed, the imaging condition setting processing transitions to step ST150.

In step ST150, the variable addition portion 82 adds 1 to the variable n. After the processing of step ST150 is executed, the imaging condition setting processing transitions to step ST144.

In step ST151, the third mode switching control portion 84 transmits the third mode switching command signal indicating the instruction to switch the operation mode of the main imaging apparatus 100A to the imaging condition provision processing mode, to the main imaging apparatus 100A. After the processing of step ST151 is executed, the imaging condition setting processing transitions to step ST152.

In step ST152, the imaging condition acquisition portion 86 acquires the imaging condition of the main imaging apparatus 100A. After the processing of step ST152 is executed, the imaging condition setting processing transitions to step ST153.

In step ST153, the fourth mode switching control portion 88 transmits the fourth mode switching command signal indicating the instruction to switch the operation mode of the sub-imaging apparatus 100B to the imaging condition setting processing mode, to each sub-imaging apparatus 100B. After the processing of step ST153 is executed, the imaging condition setting processing transitions to step ST154.

In step ST154, the imaging condition transmission control portion 90 transmits the imaging condition of the main imaging apparatus 100A to each sub-imaging apparatus 100B based on the reflection setting item selected for the sub-imaging apparatus 100B for which the second information does not satisfy the second predetermined condition. Accordingly, the setting of the imaging condition of the main imaging apparatus 100A is prohibited for the sub-imaging apparatus 100B for which the second information satisfies the second predetermined condition. After the processing of step ST154 is executed, the imaging condition setting processing is finished.

The control method described as the action of the control device 10 is an example of the "control method" according to the embodiment of the disclosed technology.

As described above, in the control device 10 according to the fourth embodiment, the processor 22 acquires the first information that is information related to the main imaging apparatus 100A. In a case where the first information satisfies the first predetermined condition, the processor 22 prohibits the setting of the imaging condition in the sub-imaging apparatus 100B based on the imaging condition of the main imaging apparatus 100A. Accordingly, for example, the setting of the imaging condition in the sub-imaging apparatus 100B based on the imaging condition of the main imaging apparatus 100A under a situation not appropriate for reflecting the imaging condition of the main imaging apparatus 100A as the imaging condition of the sub-imaging apparatus 100B can be avoided.

In addition, the processor 22 acquires the second information that is information related to each sub-imaging apparatus 100B. The processor 22 prohibits the setting of the imaging condition of the sub-imaging apparatus 100B based on the imaging condition of the main imaging apparatus 100A for the sub-imaging apparatus 100B for which the second information satisfies the second predetermined condition. Accordingly, for example, the setting of the imaging condition in the sub-imaging apparatus 100B based on the imaging condition of the main imaging apparatus 100A for the sub-imaging apparatus 100B not appropriate for reflecting the imaging condition of the main imaging apparatus 100A can be avoided.

The processor 22 may acquire only one of the first information that is information related to the main imaging apparatus 100A and the second information related to each sub-imaging apparatus 100B. In a case where the first information satisfies the first predetermined condition, or in a case where the second information satisfies the second predetermined condition, the processor 22 may prohibit the setting of the imaging condition in the sub-imaging apparatus 100B based on the imaging condition of the main imaging apparatus 100A.

In addition, in a case where the first information satisfies the first predetermined condition, and/or in a case where the second information satisfies the second predetermined condition, the processor 22 may prohibit the setting of the imaging condition in the sub-imaging apparatus 100B based on the imaging condition stored in advance in the storage 24.

While the first embodiment to the fourth embodiment are described above, each embodiment and modification examples can be combined with each other without contradiction. In addition, in a case where a plurality of duplicate steps are present in a combination of each embodiment and the modification examples, priorities may be assigned to the plurality of steps in accordance with various conditions and the like.

In addition, in each embodiment, the image data obtained by imaging performed by each imaging apparatus 100 is transmitted to the control device 10. In the control device 10, an image is displayed based on the image data. However, the control device 10 may display the image on an external display device provided outside the control device 10.

In addition, in each embodiment, while a form example in which the program 30 is stored in the storage 24 of the control device 10 is illustratively described, the disclosed technology is not limited thereto. For example, the program 30 may be stored in a portable storage medium such as an SSD or a USB memory. The storage medium is a non-transitory computer-readable storage medium (that is, a computer-readable storage medium). The program 30 stored in the storage medium is installed on the computer 12 of the control device 10. The processor 22 of the control device 10 executes various processing in accordance with the program 30.

In addition, in each embodiment, while a form example in which the program 190 is stored in the storage 144 of the imaging apparatus 100 is illustratively described, the disclosed technology is not limited thereto. For example, the program 190 may be stored in a portable storage medium such as an SSD or a USB memory. The storage medium is a non-transitory computer-readable storage medium (that is, a computer-readable storage medium). The program 190 stored in the storage medium is installed on the controller 126 of the imaging apparatus 100. The processor 142 of the imaging apparatus 100 executes various processing in accordance with the program 190.

In addition, in each embodiment, the program 30 may be stored in a storage device of another computer, a server apparatus, or the like connected to the control device 10 through a network, and the program 30 may be downloaded and installed on the computer 12 of the control device 10 in accordance with a request of the control device 10.

In addition, the storage device of the other computer, the server apparatus, or the like connected to the control device 10 or the storage 24 of the control device 10 does not need to store the entire program 30 and may store a part of the program 30.

In addition, in each embodiment, the program 190 may be stored in a storage device of another computer, a server apparatus, or the like connected to the imaging apparatus 100 through a network, and the program 190 may be downloaded and installed on the controller 126 of the imaging apparatus 100 in accordance with a request of the imaging apparatus 100.

In addition, the storage device of the other computer, the server apparatus, or the like connected to the imaging apparatus 100 or the storage 144 of the imaging apparatus 100 does not need to store the entire program 190 and may store a part of the program 190.

In addition, in each embodiment, while the computer 12 is incorporated in the control device 10, the disclosed technology is not limited thereto. For example, the computer 12 may be provided outside the control device 10.

In addition, in each embodiment, while the controller 126 is incorporated in the imaging apparatus 100, the disclosed technology is not limited thereto. For example, the controller 126 may be provided outside the imaging apparatus 100.

In addition, in each embodiment, the control device 10 may be composed of the controller 126 of any imaging apparatus 100 of the plurality of imaging apparatuses 100.

In addition, in each embodiment, while the computer 12 is used in the control device 10, the disclosed technology is not limited thereto. A device including an ASIC, an FPGA, and/or a PLD may be applied instead of the computer 12. In addition, a combination of a hardware configuration and a software configuration may be used instead of the computer 12.

In addition, in each embodiment, while the controller 126 that is a computer is used in the imaging apparatus 100, the disclosed technology is not limited thereto. A device including an ASIC, an FPGA, and/or a PLD may be applied instead of the controller 126. In addition, a combination of a hardware configuration and a software configuration may be used instead of the controller 126.

Various processors illustrated below can be used as a hardware resource for executing various processing described in the embodiments. Examples of the processors include a CPU that is a general-purpose processor functioning as the hardware resource for executing the various processing by executing software, that is, a program. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the processing using the memory.

In addition, the hardware resource for executing the various processing may be composed of one of those various processors or may be composed of a combination of two or more processors of the same type or different types (for example, a combination of a plurality of FPGAs or a combination of a CPU and an FPGA). In addition, the hardware resource for executing the processing may be one processor.

Examples of a configuration with one processor include, first, a form in which one processor is composed of a combination of one or more CPUs and software, and the processor functions as the hardware resource for executing the various processing. Second, as represented by an SoC or the like, a form of using a processor that implements, by one IC chip, functions of the entire system including a plurality of hardware resources for executing the various processing is included. Accordingly, the various processing is implemented using one or more of the various processors as the hardware resource.

Furthermore, more specifically, an electric circuit in which circuit elements such as semiconductor elements are combined can be used as a hardware structure of those various processors. In addition, the various processing is merely an example. Accordingly, unnecessary steps may be deleted, new steps may be added, or a processing order may be changed without departing from the gist of the disclosed technology.

Above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

EXPLANATION OF REFERENCES

S: imaging system
1: network
10: control device
12: computer
14: reception device
16: display
18: external I/F
20: communication I/F
22: processor
24: storage 26: RAM
28: bus
30: program
40: operation mode setting processing portion
42: imaging control processing portion
44: imaging condition setting processing portion
50: imaging control processing mode setting portion
52: mode switching determination portion
54: imaging condition setting processing mode setting portion
56: imaging condition setting processing finish determination portion
58: finish determination portion
60: image data acquisition portion
62: image display control portion
64: image recording instruction determination portion
66: first mode switching control portion
68: finish determination portion
70: preset information acquisition portion
72: variable setting portion
74: variable determination portion
76: second mode switching control portion
78: imaging situation information acquisition portion
80: reflection setting item selection portion
82: variable addition portion
84: third mode switching control portion
86: imaging condition acquisition portion
88: fourth mode switching control portion
90: imaging condition transmission control portion
92: finish determination portion
100: imaging apparatus
100A: main imaging apparatus
100B: sub-imaging apparatus
102: imaging apparatus main body
104: lens unit
106: mechanical shutter
106A: front curtain
106B: rear curtain
108: shutter actuator
110: shutter driver
112: image sensor
112A: light-receiving surface
114: image sensor driver
116: signal processing circuit
118: shake correction mechanism
120: shake correction driver
122: temperature sensor
124: inertia sensor
126: controller
128: image memory
130: UI system device
132: position measurement unit
134: battery unit
136: external I/F
138: communication I/F
140: input-output I/F
142: processor
144: storage
146: RAM
148: bus
149: display
150: reception device
152: touch panel
154: hard key portion
156: position sensor
158: shake correction actuator
160: receiver
162: battery
164: imaging lens
166: objective lens
168: focus lens
170: zoom lens
172A: opening
172B: blade
174: controller
176: focus actuator
178: zoom actuator
180: stop actuator
190: program
200: operation mode setting processing portion
202: image display processing portion
204: image recording processing portion
206: imaging situation provision processing portion
208: imaging condition provision processing portion
210: imaging condition setting processing portion
220: image display processing mode setting portion
222: first mode switching determination portion
224: image recording processing mode setting portion
226: second mode switching determination portion
228: imaging situation provision processing mode setting portion
230: third mode switching determination portion
232: imaging condition provision processing mode setting portion
234: fourth mode switching determination portion
236: imaging condition setting processing mode setting portion
238: mode determination portion
240: mode finish determination portion
242: finish determination portion
250: imaging control portion
252: image display control portion
254: image data transmission control portion
256: finish determination portion
260: imaging control portion
262: image display control portion
264: image recording control portion
266: image data transmission control portion
268: finish determination portion
270: imaging situation information acquisition portion
272: imaging situation information transmission control portion
280: imaging condition acquisition portion
282: imaging condition transmission control portion
290: imaging condition acquisition portion
292: imaging condition setting control portion
300: overhead view camera
302: imaging environment
400: sub-imaging apparatus classification portion
500: first predetermined condition acquisition portion
502: first predetermined condition determination portion
504: second predetermined condition acquisition portion
506: second predetermined condition determination portion

What is claimed is:

1. A control device that establishes a communication connection to a plurality of imaging apparatuses, the control device comprising:
a memory; and
a processor,
wherein the memory stores an imaging condition to be set in each of the plurality of imaging apparatuses, wherein the processor is configured to
  acquire a first imaging condition set in a first imaging apparatus, which is an imaging apparatus among the plurality of imaging apparatuses,
  store the first imaging condition in the memory, and
  set a third imaging condition in a second imaging apparatus, which is an imaging apparatus that is different from the first imaging apparatus among the plurality of imaging apparatuses, based on the first imaging condition stored in the memory or a second imaging condition stored in the memory,
wherein the first imaging condition and/or the second imaging condition includes a plurality of first setting items,
wherein the processor is configured to
  acquire first imaging situation information, that is information related to an imaging situation of the second imaging apparatus, from the second imaging apparatus, and
  select a first setting item to be applied to the second imaging apparatus as the third imaging condition from the plurality of first setting items in accordance with the first imaging situation information acquired from the second imaging apparatus, and
wherein the first imaging situation information is subject information that is information related to a subject corresponding to the first imaging apparatus.

2. The control device according to claim 1,
wherein the first imaging situation information includes at least any of first vibration information that is information related to an effect of vibration on the second imaging apparatus, first external apparatus connection information that is information related to a connection situation of an external apparatus to the second imaging apparatus, or first image recording operation information that is information related to an image recording operation of the second imaging apparatus.

3. The control device according to claim 1,
wherein the first imaging situation information includes at least any of
  first positional information that is information related to a position of the second imaging apparatus,
  first subject information that is information related to a subject corresponding to the second imaging apparatus,
  first light source information that is information related to a light source corresponding to the second imaging apparatus,
  first network connection information that is information related to a connection situation of a network to the second imaging apparatus,
  first type information that is information related to a type of the second imaging apparatus,
  first lens information that is information related to a lens mounted in the second imaging apparatus,
  first battery information that is information related to a battery mounted in the second imaging apparatus,
  first temperature information that is information related to a temperature of the second imaging apparatus,
  first installation state information related to an installation state of the second imaging apparatus, or
  first image information that is information based on an image obtained by imaging the first imaging apparatus and the second imaging apparatus by a third imaging apparatus.

4. The control device according to claim 2,
wherein the first imaging situation information includes at least any of
  first positional information that is information related to a position of the second imaging apparatus,
  first subject information that is information related to a subject corresponding to the second imaging apparatus,
  first light source information that is information related to a light source corresponding to the second imaging apparatus,
  first network connection information that is information related to a connection situation of a network to the second imaging apparatus,
  first type information that is information related to a type of the second imaging apparatus,
  first lens information that is information related to a lens mounted in the second imaging apparatus,
  first battery information that is information related to a battery mounted in the second imaging apparatus,
  first temperature information that is information related to a temperature of the second imaging apparatus,
  first installation state information related to an installation state of the second imaging apparatus, or
  first image information that is information based on an image obtained by imaging the first imaging apparatus and the second imaging apparatus by a third imaging apparatus.

5. The control device according to claim 1,
wherein the first imaging situation information includes information related to an imaging situation of the first imaging apparatus.

6. The control device according to claim 2,
wherein the first imaging situation information includes information related to an imaging situation of the first imaging apparatus.

7. The control device according to claim 3,
wherein the first imaging situation information includes information related to an imaging situation of the first imaging apparatus.

8. The control device according to claim 1,
wherein the processor is configured to acquire the first imaging situation information in a case where the imaging situation of the second imaging apparatus is changed.

9. The control device according to claim 1,
wherein the processor is configured to acquire the first imaging condition in a case where the first imaging condition set in the first imaging apparatus and/or an imaging situation of the first imaging apparatus is changed.

10. The control device according to claim 1,
wherein the first imaging condition and/or the second imaging condition includes a plurality of second setting items, and
the processor is configured to
  acquire first imaging scene information that is information related to an imaging scene imaged by the second imaging apparatus, and
  select a second setting item to be applied to the second imaging apparatus as the third imaging condition from the plurality of second setting items in accordance with the first imaging scene information.

11. The control device according to claim 1,
wherein the second imaging condition includes a third setting item set based on an imaging scene imaged by the second imaging apparatus.

12. The control device according to claim 1,
wherein the processor is configured to
acquire second imaging situation information that is information related to an imaging situation of each of the plurality of imaging apparatuses,
classify the plurality of imaging apparatuses into two or more groups based on the second imaging situation information, and
set a fourth imaging condition for each group.

13. The control device according to claim 12,
wherein the second imaging situation information includes at least any of
second vibration information that is information related to an effect of vibration on each of the plurality of imaging apparatuses,
second external apparatus connection information that is information related to a connection situation of an external apparatus to each of the plurality of imaging apparatuses,
second image recording operation information that is information related to an image recording operation of each of the plurality of imaging apparatuses,
second positional information that is information related to a position of each of the plurality of imaging apparatuses,
second subject information that is information related to a subject corresponding to each of the plurality of imaging apparatuses,
second light source information that is information related to a light source corresponding to each of the plurality of imaging apparatuses,
second network connection information that is information related to a connection situation of a network to each of the plurality of imaging apparatuses,
second type information that is information related to a type of each of the plurality of imaging apparatuses,
second lens information that is information related to a lens mounted in each of the plurality of imaging apparatuses,
second battery information that is information related to a battery mounted in each of the plurality of imaging apparatuses,
second temperature information that is information related to a temperature of each of the plurality of imaging apparatuses,
second installation state information related to an installation state of each of the plurality of imaging apparatuses, or
second image information that is information obtained from an image obtained by imaging the plurality of imaging apparatuses by a fourth imaging apparatus.

14. The control device according to claim 1,
wherein the first imaging condition set in the first imaging apparatus includes a plurality of fourth setting items, and
the processor is configured to acquire only information set for a fourth setting item to be applied to the second imaging apparatus as the third imaging condition among the plurality of fourth setting items.

15. The control device according to claim 1,
wherein the second imaging condition is a condition set based on the first imaging condition.

16. The control device according to claim 1,
wherein the processor is configured to
acquire at least one of first information that is information related to the first imaging apparatus, or second information related to the second imaging apparatus, and
prohibit setting of the third imaging condition in the second imaging apparatus based on the first imaging condition stored in the memory or the second imaging condition stored in the memory in a case where at least one of the first information or the second information satisfies a predetermined condition.

17. A control device that establishes a communication connection to a plurality of imaging apparatuses, the control device comprising:
a memory; and
a processor,
wherein the memory stores an imaging condition to be set in each of the plurality of imaging apparatuses,
wherein the processor is configured to
acquire a first imaging condition set in a first imaging apparatus, which is an imaging apparatus among the plurality of imaging apparatuses,
store the first imaging condition in the memory, and set a third imaging condition in a second imaging apparatus, which is an imaging
apparatus that is different from the first imaging apparatus among the plurality of imaging apparatuses, based on at least any first setting item of a plurality of first setting items included in the first imaging condition stored in the memory,
wherein the processor is configured to
acquire first imaging situation information, that is information related to an imaging situation of the second imaging apparatus, from the second imaging apparatus, and
select a first setting item to be applied to the second imaging apparatus as the third imaging condition from the plurality of first setting items in accordance with the first imaging situation information acquired from the second imaging apparatus, and
wherein the first imaging situation information is subject information that is information related to a subject corresponding to the first imaging apparatus.

18. A control method using the control device according to claim 1, the control method comprising:
communicating with the plurality of imaging apparatuses;
acquiring the first imaging condition set in the first imaging apparatus;
storing the first imaging condition in the memory; and
setting the third imaging condition in the second imaging apparatus based on the first imaging condition stored in the memory or the second imaging condition stored in the memory.

19. A non-transitory computer readable recording medium storing a program causing a computer to function as the control device according to claim 1 by executing a process comprising:
communicating with the plurality of imaging apparatuses;
acquiring the first imaging condition set in the first imaging apparatus;
storing the first imaging condition in the memory; and
setting the third imaging condition in the second imaging apparatus based on the first imaging condition stored in the memory or the second imaging condition stored in the memory.

20. The control device according to claim 1,
wherein the subject information includes at least any of information related to a detection result of the subject, information related to a blur of the subject, or information related to a type of the subject.

* * * * *